(12) United States Patent
Auchterlonie

(10) Patent No.: US 10,923,723 B1
(45) Date of Patent: Feb. 16, 2021

(54) ELECTRO-CONDUCTIVE POLYMERS OF HALOGENATED PARA-AMINOPHENOL, AND ELECTROCHEMICAL CELLS EMPLOYING SAME

(71) Applicant: Richard Carl Auchterlonie, Houston, TX (US)

(72) Inventor: Richard Carl Auchterlonie, Houston, TX (US)

(*) Notice: Subject to any disclaimer, the term of this patent is extended or adjusted under 35 U.S.C. 154(b) by 232 days.

(21) Appl. No.: 15/976,799

(22) Filed: May 10, 2018

Related U.S. Application Data

(60) Provisional application No. 62/505,058, filed on May 11, 2017.

(51) Int. Cl.
| | |
|---|---|
| H01M 4/60 | (2006.01) |
| C08G 73/06 | (2006.01) |
| H01M 4/137 | (2010.01) |
| H01M 4/62 | (2006.01) |
| H01M 10/42 | (2006.01) |

(Continued)

(52) U.S. Cl.
CPC ........ H01M 4/606 (2013.01); C08G 73/0266 (2013.01); C08G 73/06 (2013.01); H01M 4/133 (2013.01); H01M 4/137 (2013.01); H01M 4/625 (2013.01); H01M 10/365 (2013.01); H01M 10/425 (2013.01); H01M 10/4242 (2013.01);

(Continued)

(58) Field of Classification Search
None
See application file for complete search history.

(56) References Cited

U.S. PATENT DOCUMENTS

| | | |
|---|---|---|
| 2,176,181 A | 10/1939 | Hunadiecker |
| 2,302,832 A | 11/1942 | Behrman |

(Continued)

FOREIGN PATENT DOCUMENTS

| | | | |
|---|---|---|---|
| EP | 2886537 A1 * | 6/2015 | ............ H01M 4/60 |
| WO | 2016/0144463 A1 | 1/2016 | |

OTHER PUBLICATIONS

Oliveira et al., Nanoscience and its Applications, p. 160, ISBN: 978-0-323-49780-0; originally published in Portuguese (ISBN: 9788535280906, 2015) (Year: 2017).*

(Continued)

*Primary Examiner* — Ula C Ruddock
*Assistant Examiner* — Anna Korovina
(74) *Attorney, Agent, or Firm* — Richard C. Auchterlonie

(57) ABSTRACT

Halogenation of para-aminophenol and polymerization of the halogenation product results in electro-conductive redox polymer. For example, the para-aminophenol is chlorinated or brominated in an acidic solution, and the halogenation product is polymerized upon increasing the pH and upon oxidation. The halogenation product can be polymerized during electro-deposition of a thin film upon an anode current collector from an electrolyte solution to produce a sensor electrode, and the halogenation product can be mixed with electro-conductive carbon material to produce electrode-active material for storage battery electrodes. For example, the sensor electrode has an electrochemical reduction potential and a charge-discharge cycle period inversely proportional to pH, and the storage battery electrodes are positive electrodes in a storage battery having zinc negative electrodes in a zinc salt electrolyte solution.

22 Claims, 34 Drawing Sheets

(51) Int. Cl.
  *H01M 10/36* (2010.01)
  *H01M 4/133* (2010.01)
  *C08G 73/02* (2006.01)
(52) U.S. Cl.
  CPC ............... *H01M 2010/4271* (2013.01); *H01M 2300/0005* (2013.01)

(56) References Cited

U.S. PATENT DOCUMENTS

| | | | |
|---|---|---|---|
| 2,874,078 | A | 2/1959 | Lozier et al. |
| 2,880,122 | A | 3/1959 | Morehouose et al. |
| 3,057,760 | A | 10/1962 | Dereska et al. |
| 3,231,427 | A | 1/1966 | Kirk et al. |
| 3,352,720 | A | 11/1967 | Wilson et al. |
| 3,577,357 | A | 5/1971 | Winkler |
| 4,204,216 | A | 5/1980 | Heeger et al. |
| 4,218,521 | A | 8/1980 | Putt et al. |
| 4,222,903 | A | 9/1980 | Heeger et al. |
| 4,321,114 | A | 3/1982 | MacDiarmid et al. |
| 4,343,868 | A | 8/1982 | Putt |
| 4,442,187 | A | 4/1984 | MacDiarmid et al. |
| 4,540,639 | A | 9/1985 | Grimes |
| 4,820,595 | A | 4/1989 | MacDiarmid et al. |
| 4,889,659 | A | 12/1989 | Genies |
| 5,023,149 | A | 6/1991 | MacDiarmid et al. |
| 5,420,237 | A * | 5/1995 | Zemel ............... C08G 73/0266 524/555 |
| 5,439,757 | A | 8/1995 | Zito |
| 5,459,390 | A | 10/1995 | Tomazie |
| 5,591,538 | A | 1/1997 | Eidler et al. |
| 5,702,842 | A | 12/1997 | Tomazie |
| 5,863,454 | A | 1/1999 | Chen et al. |
| 6,300,015 | B1 | 10/2001 | Nishiyama et al. |
| 6,353,304 | B1 | 3/2002 | Atcitty et al. |
| 6,455,187 | B1 | 9/2002 | Tomazie |
| 6,812,171 | B2 | 11/2004 | Shimazaki et al. |
| 7,081,320 | B2 | 7/2006 | Kawakami et al. |
| 8,137,830 | B2 | 3/2012 | Whiteacre |
| 8,298,701 | B2 | 10/2012 | Whiteacre et al. |
| 8,529,746 | B2 | 9/2013 | Grant et al. |
| 9,073,842 | B2 | 7/2015 | Leitner et al. |
| 9,399,613 | B2 | 7/2016 | Moret et al. |
| 9,481,764 | B1 | 11/2016 | Kinlen et al. |
| 9,548,509 | B2 | 1/2017 | Anderson et al. |
| 9,873,951 | B2 | 1/2018 | Kaczur et al. |
| 9,932,485 | B1 | 4/2018 | Zarras et al. |
| 10,044,076 | B2 | 8/2018 | Hiroki et al. |
| 2002/0076538 | A1* | 6/2002 | St. Lawrence .......... B32B 15/20 428/209 |
| 2008/0048150 | A1 | 2/2008 | Hosoda et al. |
| 2010/0222519 | A1* | 9/2010 | Akhoury ................. C07C 29/76 525/326.6 |

OTHER PUBLICATIONS

Tamaki et al., "High-Surface-Area Three-Dimensional Biofuel Cell Electrode Using Redox-Polymer-Grafted Carbon", Ind. Eng. Chem. Res. 2006, 45, 3050-3058, 10.1021/ie051142a (Year: 2006).*

Konopelnyk et al., Physical and Technological Properties of Sensor Materials Based on Conjugated Polyamioarenes, Physics and Chemistry of Solid-State, vol. 8, No. 4, 2007, pp. 786-790, Vasyl Stefanyk Precarpathian National University, Ivano-Frankivsk, Ukraine.

Salvagione et al., Spectroelectrochemical study of the oxidation of aminophenols on platinum electrode in acid medium, Journal of Electroanalytical Chemistry, 2003, 9 pages, Elsevier B.V., Amsterdam, Netherlands.

Armijo et al., Poly-O-Aminophenol Obtained at High Potentials by Cyclic Voltammetry on SNO2:F Electrodes, Application in Quantitative Determination of Ascorbic Acid, J. Chil. Chem. Soc., vol. 54, No. 2, 2009, pp. 158-162, The Chilean Chemical Society, Concepcion, Chile.

Tanaka, et al., Catalytic Hydrogenation of Carbon Dioxide Using Ir(III)-Pincer Complexes, J. Am. Chem. Soc. (Sep. 2009), vol. 131, pp. 14168-14169, American Chemical Society, Washington, DC.

Orita et al, The impact of pH on side reactions for aqueous redox flow batteries based on nitroxyl radical compounds, Journal of Power Sources, vol. 321 (1016), pp. 126-134, Elsever B.V., Amsterdam, Netherlands.

Peters, et al., Electrochemical Dehalogenation of Organic Pollutants, J. Mex Chem. Soc. vol. 58 No. 3 (2014) pp. 287-302, Sociedad Quimcia de Mexico, Mexico City, Mexico.

LM2575/D, Data sheets, Jun. 2009, 28 pages, ON Semiconductor, Denver. Colorado.

Optimization of a Demanding Buchwald-Hartwig Animation, 2012, 2 pages, CatSci Ltd, Wentloog, United Kingdom.

Chem Player, Synthesis of a piperidine ephedrone analogue, text and chemical formula on web page showing Youtube video 2mtEQnNWpUY, Aug. 26, 2015, 5 pages, Google LLC, Mountain View, California.

Ayla Ozcan and Metin Ogun, Biochemistry of Reactive Oxygen and Nitrogen Species, dx.doi.org/10.5772/61193, Chapter 3 from the book Basic Principles and Clinical Significance of Oxidative Stress, 2015, pp. 37-58, IntechOpen Limited, London, England.

Venkateswaran et al., Electrowinning of Zinc—Effect of Metallic Impurities and Addition Agents, Bulletin of Electrochemistry, vol. 12 No. 5-6, May-Jun. 1996, pp. 349-35, CECRI, Karaikudi, India.

Scott et al., A Mathematical Model of a Zinc Electrowinning Cell, APCOM 87, Proceedings of the Twentieth International Symposium on the Application of Computers and Mathematics in the Mineral Industries, vol. 2: Metallurgy, Johannesburg, South Africa, 1987, pp. 51-62, SAIMM, Johannesburg, South Afruca.

Raigaonkar et al., Modification in polyaniline oxidation state as a consequence of anthracene doping, J. Pure Appl. & Ind. Phys, vol. 1 No. 1, 2010, pp. 53-60, Bhopal, India.

Gvozdenovic et al., Application of Polyaniline in Corrosion Protection of Metals, Scientific paper UDC_620.193.667.28, Zastita Materijala vol. 53 (2012) broj 4 pp. 353-360, Serbian Engineers for Materials Protection, Belgrade, Serbia.

Huang et al., Polyaniline Nanofibers: Facile Synthesis and Chemical Sensors, JACS Communications, Dec. 13, 2002, J. Am. Chem. Soc. vol. 123, pp. 314-315, American Chemical Society, Washington, D.C.

Frank Ellis, Paracetamol—a curriculum resource, 2002, 26 pages, Royal Society of Chemistry, London, England.

Garth P. Corey, An Assessment of the State of the Zinc-Bromine Battery Development Effort, 2010, 14 pages, RedFlow Limited, Brisbane, Queensland, Australia.

Rose et al., Performance Testing of Zinc-Bromine Flow Batteries for Remote Telecom Sites, SAND2013-2818C, 2013, 10 pages, Sandia National Laboratories, Albuquerque, NM.

Jaya Gosain & Pradeep K Sharma, Kinetics and mechanism o the oxidation of formic and oxalic acids by tetrabutylammonium tribromide, Indian Journal of Chemistry, vol. 41A, Feb. 2002, pp. 321-324, Council of Scientific & Industrial Research, New Delhi, India.

Brase et al., Organic Azides: An Exploding Diversity of a Unique Class of Compounds, Angew Chemie Ing. Ed. 2005 vol. 44 No. 44 pp. 5188-5240, Wiley-GMBH & Co. KGaA, Weinheim, Germany.

Emily C. Dooley, California Delays Acetaminophen Cancer Listing Over Coronavirus, Health Law & Business News, Mar. 17, 2020, one page, BloombergLaw.com, The Bureau of National Affairs, Inc., Arlington, VA.

Elmore et al., Proposition 65, Evidence on the Carcinogenicity of Acetaminophen, Sep. 2019, pp. i-xiii and 1-9 (23 pages total), Office of Environmental Health Hazard Assessment, California Environmental Protection Agency, San Francisco, CA.

Thenmozhi et al., Isomers of Poly Aminophenol: Chemical Synthesis, Characterization, and Its Corrosion Protection Aspect on Mild Steel in 1 M HCl, International Journal of Electrochemistry, vol. 2014, article ID 961617, Mar. 17, 2014, 11 pages, Hindawi Publishing Corp., London, United Kingdom.

Christoffer Karlsson, Conductive Redox Polymers for Electrical Energy Storage, PhD Dissertation 230647, Oct. 30, 2014, 74 pages, Uppsala Universitet, Uppsala, Sweeden.

(56) References Cited

OTHER PUBLICATIONS

Pavitt et al., Oxidation Potentials of Phenols and Anilines: Correlation Analysis of Electrochemical and Theoretical Values, Electronic Supplementary Material (ESI) for Environmental Science: Process & Impacts, Feb. 7, 2017, 38 pages, The Royal Society of Chemistry, Cambridge, United Kingdom.

Poloyamine, Wikipedia article, Apr. 18, 2020, 6 pages, Wikimedia Foundation, San Francisco, CA.

Yoshi Okamoto and Eli Pearce, editors, Final Report—The Workshop on Conductive Polymers, Oct. 7-9, 1985, Brookhaven National Laboratory, Upton, Long Island, New York, NY, 63 pages, Division of Material Sciences, Department of Energy, DOE/ER/45185—T1, Washington, DC.

Taj et al., Poly( para-aminophenol); a new soluble, electroactive conducting polymer, J. Electroanal. Chem., 338 (1992) pp. 347-352, Elsevier B.V., Amsterdam, The Netherlands.

Taj et al., Electro-oxidative polymerization of m-chlorophenol and m-bromophenol, Journal of Electroanal. Chem, 356(1-2) (1993), pp. 269-274, Elsevier B.V., Amsterdam, The Netherlands.

Taj et al., Relationship between permselectivity and the acidity of polyphenols pertaining to the pH response of Pt/polyphenol electrode, Journal of Synthetic Metals, 97 (3) (1998), pp. 205-209, Elsevier B.V., Amsterdam, The Netherlands.

Ahmed et al., Electropolymerization of trimethylsilylphenols to silylated polyphenylene oxides and investigation of their properties. Enhanced conductivity of PPO by silyl group, Journal of Applied Polymer Science, 65 (6), (1997), pp. 1121-1126, John Wiley & Sons, Inc., Hoboken, NJ.

Taj et al. Poly(benzimidazole) and Substituted Poly(benzimidazoles): Novel, Electroactive, and Conducting Polymers Possessing High Catalytic and Coordination Properties, Abstract, Journal of Applied Polymer Science, 77 (1) (2000), one page, John Wiley & Sons, Inc., Hoboken, NJ.

Taj et al., Electro-oxidative polymerization of m-aminophenol, Abstract, Journal of Synthetic Metals, 52 (2) (1992), one page, Elsevier B.V., Amsterdam, The Netherlands.

Wikipedia, Polymer, Apr. 13, 2018, 15 pages, Wikimedia Foundation, Inc., San Francisco, CA.

Wikipedia, Diamine, Jul. 17, 2017, 3 pages, Wikimedia Foundation, Inc., San Francisco, CA.

Wikipedia, Radical (chemistry), Feb. 16, 2018, 8 pages, Wikimedia Foundation, Inc., San Francisco.

Wikipedia, Radical initiator, Jul. 7, 2016, 2 pages, Wikimedia Foundation, Inc., San Francisco, CA.

Wikipedia, Azobisisobutyronitile (AIBN), Nov. 16, 2015, 3 pages, Wikimedia Foundation, Inc., San Francisco, CA.

Broggi et al., Organic Electron Donors as Powerful Single-Electron Transfer Reducing Agents in Organic Synthesis, Angewandte Chemie International Edition, 53 (2) (2014), pp. 384-413, Wiley & Sons, Inc., Hoboken, NJ.

Wikipedia, Radical Polymerization, Jul. 15, 2017, 17 pages, Wikimedia Foundation, Inc., San Francisco, CA.

Su, W.F., Radical Chain Polymerization, Chapter 7 In: Principles of Polymer Design and Synthesis, Lecture Notes in Chemistry, vol. 82., Oct. 9, 2013, pp. 137-183, Springer, Berlin, Germany.

Wikipedia,. Acrylate, Nov. 1, 2017, 2 pages, Wikimedia Foundation, Inc., San Francisco, CA.

Wikipedia, Vinyl group, 2 pages, Oct. 18, 2017, Wikimedia Foundation, Inc., San Francisco, CA.

You et al., Dually responsive multiblock copolymers via RAFT polymerization: Synthesis of temperature and redox responsive copolymers of PNIPA and PDMAEMA, Macromolecules, 2007, 40(24), pp. 8617-8624, American Chemical Society, Washington, DC.

Wikipedia, Conductive polymer, Mar. 31, 2018, 8 pages, Wikimedia Foundation, Inc., San Francisco, CA.

Heeler, A.J., Nobel Lecture: Semiconducting and metallic polymers: The fourth generation of polymeric materials, Reviews of Modern Physics, 2001, pp. 681-700, vol. 73, American Physical Society, College Park, MD.

Wikipedia, Carbon Black, Mar. 29, 2018, 6 pages, Wikimedia Foundation, Inc., San Francisco, CA.

Wikipedia, Graphite, Mar. 31, 2018, 13 pages, Wikimedia Foundation, Inc., San Francisco, CA.

Elgrishi et al., A Practical Beginner's Guide to Cyclic Voltammetry, Journal of Chemical Education, Nov. 3, 2017, pp. 197-206, American Chemical Society, Washington, DC.

AKHOURYk, A., Redox-Responsive Polymers for the Reversible Extraction of Butanol from Water, PhD Thesis, Jun. 13, 2011, 316 pages, Massachusetts Institute of Technology, Cambridge, MA.

Wikipedia, Bromine, 15 pages, May 7, 2018, Wikimedia Foundation, Inc., San Francisco, CA.

Britannica Online Encyclopedia, Bromine, Aug. 9, 2017, 4 pages, Encyclopædia Britannica, Inc., Chicago, Il.

4-Amino-2-chlorophenol (CAS 3964-52-1), Sep. 4, 2020, 4 pages, Santa Cruz Biotechnology, Inc., Dallas, TX.

4-Amino-2-bromophenol (CAS 16750-67-7), Sep. 4, 2020, 5 pages, Santa Cruz Biotechnology, Inc., Dallas, TX.

4-Amino-2-chlorophenol Safety Data Sheet, Version 6.1, Sep. 28, 2019, 9 pages, MilliporeSigma, St. Louis, MO.

4-Amino-2-bromophenol Safety Data Sheet, Version 6.0, Oct. 24, 2019, 9 pages, MilliporeSigma, St. Louis, MO.

Wikipedia, Halogenation, Jan. 29, 2017, 4 pages, Wikimedia Foundation, Inc., San Francisco, CA.

Hilgetag et al., Preparative Organic Chemistry, Chapter 3 Formation of Carbon Halogen Bonds, V. formation of Nitrogen-Halogen bond, (1972), pp. 102-272, 597-599, Wiley & Sons, Inc., Hoboken, NJ.

Higins, R.A., Review—A New Class of High Rate, Long Cycle Life, Aqueous Electrolyte Battery Electrodes, Journal of the Electrochemical Society, 164 (1), (2017), A5031-5036, Electrochemical Society, Pennington, NJ.

Orala et al., Stabilization of polyanaline films in the presence of p-aminophenol, Bull. Chem. Soc. Ethiop. 8(1)(1992), pp. 27-31, Addis Ababa Ethiopia.

Kheirabsdi et al., Structure-Radical Scavenging Activity of Some Hydroxyphenols, Phys. Chem. Res., vol. 4 No. 1, Mar. 2016, pp. 73-83, Iranian Chemical Society, Tehran, Iran.

Frackowiak et al., Redox-active electrolyte for supercapacitor application, Faraday Discuss. 2014 vol. 172, pp. 179-198, The Royal Society of Chemistry, London, England.

Wikipedia, Voltammetry, Aug. 1, 2017, 5 pages, Wikimedia Foundation, Inc., San Francisco, CA.

Wikipedia, Potentiostat, Jun. 13, 2016, 5 pages, Wikimedia Foundation, Inc., San Francisco, CA.

Wikipedia, Cyclic Voltammetry, Jan. 10, 2017, 7 pages, Wikimedia Foundation, Inc., San Francisco, CA.

Wikipedia, Activated Carbon, Apr. 28, 2017, 13 pages, Wikimedia Foundation, Inc., San Francisco, CA.

Wikipedia, Reversible addition-fragmentation chain transfer reaction polymerization, Nov. 29, 2015, 8 pages, Wikimeda Foundation, Inc., San Francisco, CA.

* cited by examiner

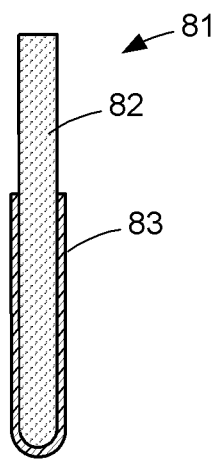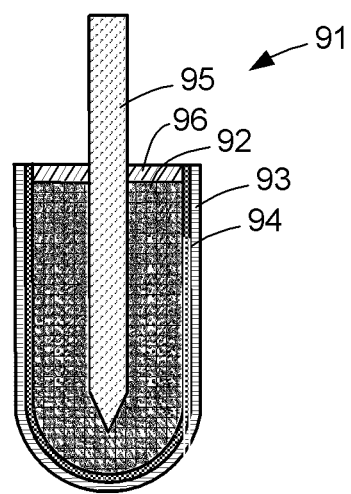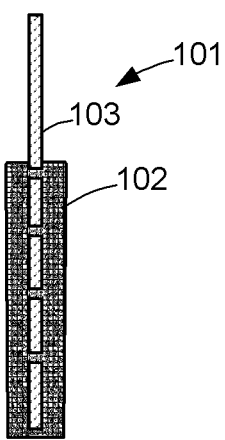
FIG. 8   FIG. 9   FIG. 10
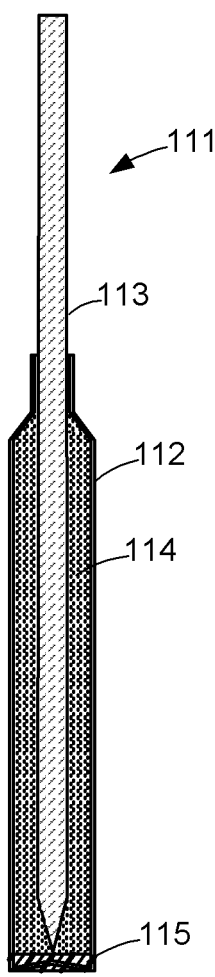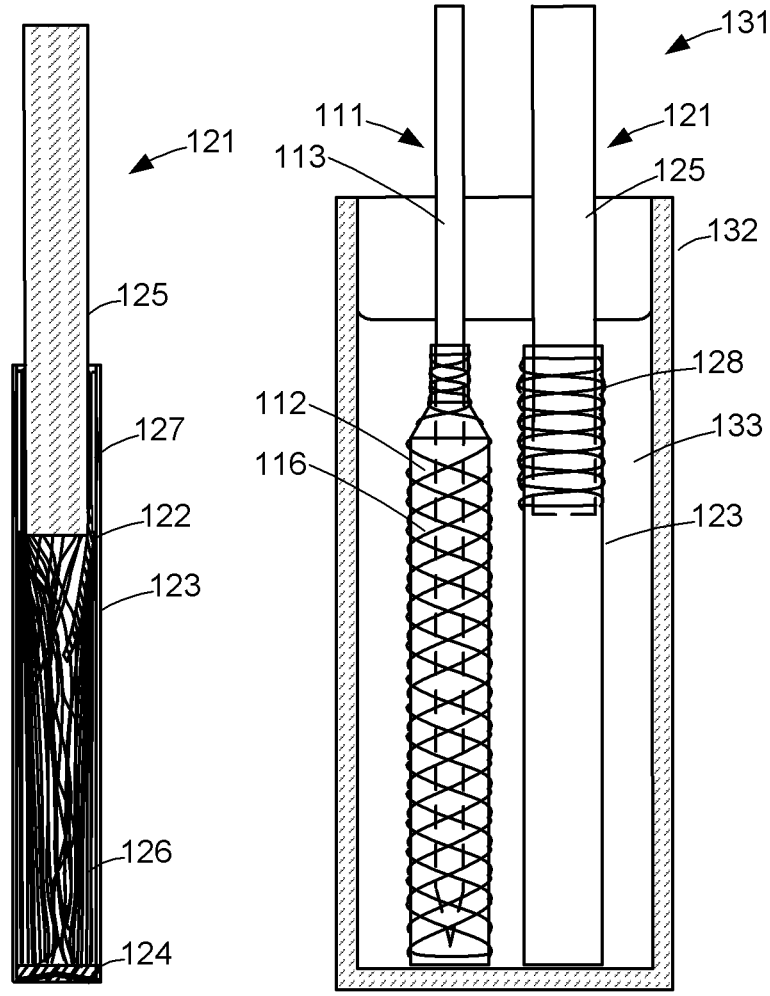
FIG. 11   FIG. 12   FIG. 13

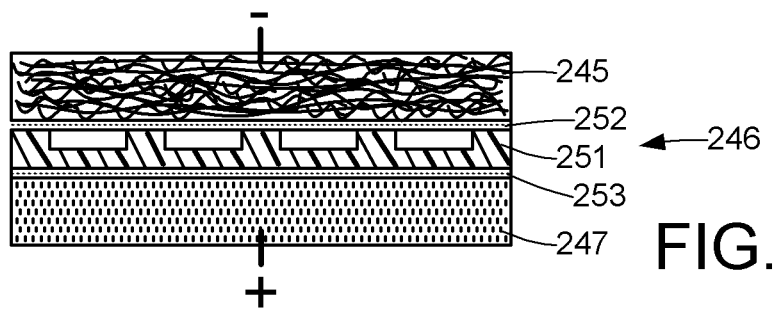
FIG. 18
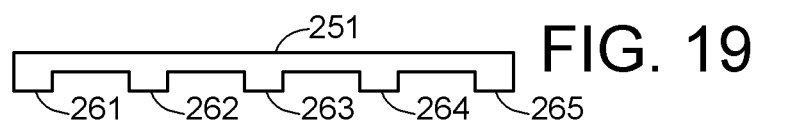
FIG. 19
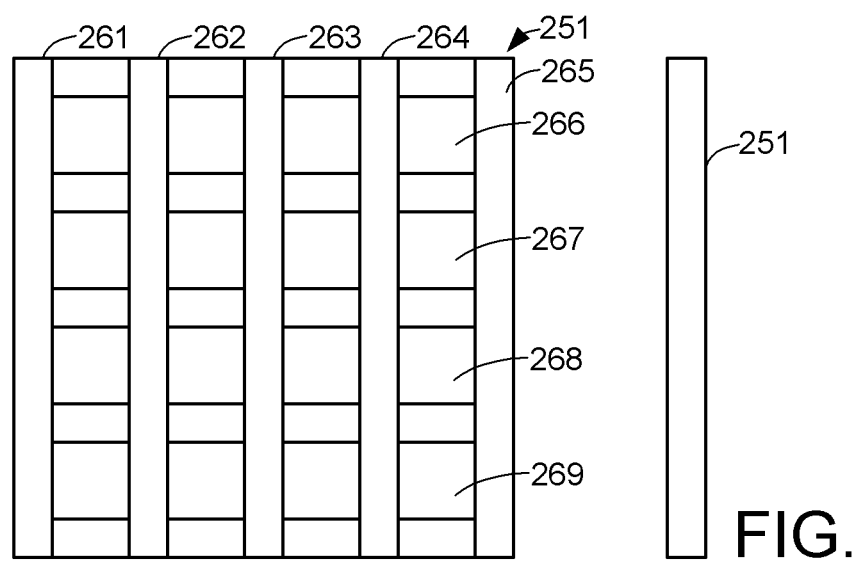
FIG. 20
FIG. 21
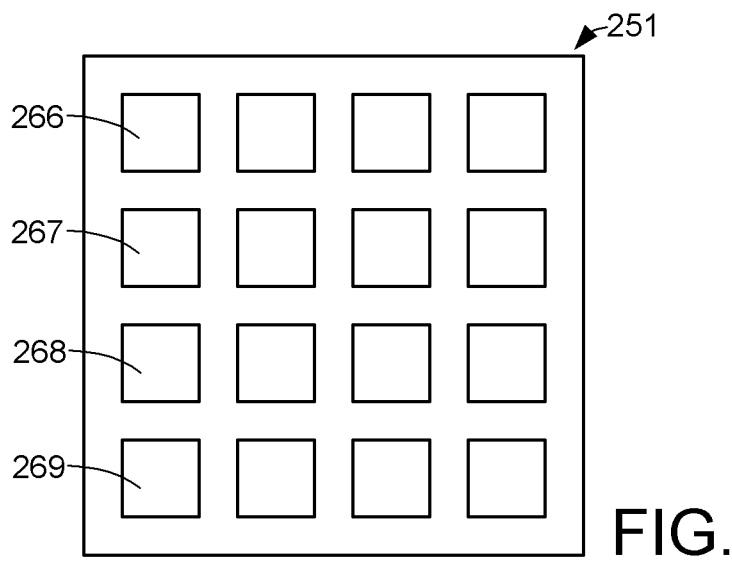
FIG. 22

ELECTRO-CONDUCTIVE POLYMERS OF HALOGENATED PARA-AMINOPHENOL, AND ELECTROCHEMICAL CELLS EMPLOYING SAME

RELATED APPLICATIONS

The present application claims the benefit of U.S. provisional application Ser. 62/505,058 filed May 11, 2017, incorporated herein by reference.

FIELD OF THE INVENTION

The present disclosure relates to electro-conductive polymers of halogenated para-aminophenol, such as poly-2-chloro-4-aminophenol and poly-2-bromo-4-aminophenol, and electrochemical cells employing same.

BACKGROUND OF THE INVENTION

Electro-conductive polymers are organic polymers that conduct electricity. Electro-conductive polymers have been used in electromagnetic shields, sensor electrodes, batteries, super capacitors, fuel cells, electro-chromic displays, and other kinds of electronic devices. Well-known electro-conductive polymers include polyacetylene, polyphenylene vinylene, polyphyrrole, polythiopene, polyanaline, and polyphenylene sulfide.

Some kinds of electro-conductive polymers are capable of reduction-oxidation reactions and have been used as electrode-active materials in batteries as a substitute for more expensive electrode-active materials such as oxides of manganese, nickel, and cobalt. Examples include polyanaline, polyacetylene, and other kinds of polyamines and conjugated electro-conductive polymers. See, for example, Genies U.S. Pat. No. 4,889,659 (nitrogenized electronic conductive polymers), MacDiarmid et al. U.S. Pat. No. 4,820,595 (polyanaline), MacDiarmid et al. U.S. Pat. No. 4,321,114 (conjugated polymers), Wilson et al. U.S. Pat. No. 3,352,720 (polymeric depolarizers), and Dereska et al. U.S. Pat. No. 3,057,760 (polyhalogen depolarizers).

As disclosed in Chen et al. U.S. Pat. No. 5,863,454, columns 1 to 3, polyanaline has superior performance as a positive electrode-active material in a secondary battery due to high energy density, power density, capacity efficiency, long cycle life and low self-discharge. A secondary battery employing polyanaline as positive electrode-active material may be used in secondary batteries containing aqueous electrolyte, secondary batteries containing non-aqueous electrolyte, and secondary batteries containing solid polymeric electrolyte. Polyanaline, however, has complexities in synthesis to a form having a desired high mechanical strength, conductivity, and large specific contact area with the electrolyte.

As disclosed in Konopinyk et al., Physical and Technological Properties of Sensor Materials Based on Conjugated Polyamioarenes, Physics and Chemistry of Solid-State, Vol. 8, No. 4, 2007, pp. 786-790, films of polyaminophenols can be used to define the concentration of organic compounds (such as ascorbic acid and hydroquinone), and the complex $K_3Fe(CN)_6$. For conjugated polymers with hydrocarbon backbone (polyparaphenylene, polyacetylene) both donor (n-type) and acceptor (p-type) doping may be used, but polyaniline and its derivatives achieve high conductivity mainly in the case of strong proton acids used as doping agents. FIG. 1 on page 787 shows the molecular structure of polyanaline, poly-ortho-aminophenol, poly-meta-aminophenol, and poly-ortho-toluide. Table 1 on page 788 provides parameters of charge transport including conductivity for polyanaline, poly-ortho-aminophenol, poly-meta-aminophenol, and poly-ortho-toluide. Table 2 on page 789 provides parameters of X-ray diffraction, size of crystallites, and degree of crystalinity, for polyanaline, poly-ortho-aminophenol, and poly-meta-aminophenol. Page 790 concludes that the high specific resistance observed for polyaminophenols in comparison to polyanaline is caused probably by hydroxyl substitute disturbing the system of conjugation along the polymer chain creating the significant energy barrier for charge transport.

As disclosed in Salvagione et al., Spectroelectrochemical study of the oxidation of aminophenols on platinum electrode in acid medium, Journal of Electroanalytical Chemistry, 2003, electrochemical oxidation of para-aminophenol on platinum electrode did not result in detected polymeric material on the electrode and instead the final oxidation products were p-benzoquinone, $CO_2$, and ammonium ion. Electrochemical oxidation of meta-aminophenol on platinum electrode produced a blocking polymeric film on the platinum surface. Electrochemical oxidation of ortho-aminophenol on platinum electrode produced a conducting redox polymer of phenoxazine units.

As disclosed in Armijo et al., Poly-O-Aminophenol Obtained at High Potentials by Cyclic Voltammetry on $SNO_2$:F Electrodes, Application in Quantitative Determination of Ascorbic Acid, the electrochemical oxidation of o-aminophenol produces electroactive dimmers which polymerize to form an electroactive film of poly-o-aminophenol (POAP) on the surface of an electrode. Common materials for the electrode are glassy carbon, platinum, gold, silver, copper, carbon paste, and tin oxide. POAP films have been successfully employed in the development of hydrogen peroxide, glucose, and uric acid biosensors. Fluorine-doped tin oxide allows the use of a wide potential range in neutral and acid aqueous medium up to about 1.8 volts versus an Ag|AgCl reference. At this highly anodic potential, oxidative degradation of the polymeric film and its irreversible spoilage occurs. In a specific example, electropolymerization was conducted by successive potential cycling at 0.05 volts per second between −0.2 and 1.5 volts, in a 0.1M HCl+0.1 M KCl solution containing $1\times10^{-3}$ M o-aminophenol. After polymerization, the modified electrode was thoroughly washed with water. Then the electropolymerized film was stabilized in a phosphate pH 7.4 buffer solution by successive potential cycling between the potential limits of minus 800 mV and plus 1,400 mV in which ascorbic acid oxidation studies were performed, showing that the modified electrode was very stable and could be used for the quantitative determination of ascorbic acid.

SUMMARY OF THE DISCLOSURE

The disclosure provides a method comprising: (a) halogenating para-aminophenol to produce a para-aminophenol halogenation product; and (b) polymerizing the para-aminophenol halogenation product to produce electro-conductive redox polymer. This method is an economical way of producing a robust electro-conductive redox polymer for sensors and storage batteries from common household chemicals.

For example, para-aminophenol is halogenated by reacting the para-aminophenol with chlorine to produce 2-chloro-4-aminophenol, or by reacting the para-aminophenol with bromine to produce 2-bromo-4-aminophenol. The halogenating of the para-aminophenol reacts the para-aminophenol with halogen when the para-aminophenol is in an acid solution. The polymerizing of the para-aminophenol halogenation product includes increasing pH of the solution in contact with the halogenated para-aminophenol product, or electrochemical oxidation of the para-aminophenol halogenation product in an electrochemical cell.

To make a sensor electrode, the halogenated para-aminophenol product is dissolved in an electrolyte, and a film of the electro-conductive redox polymer is electro-deposited on a current collector immersed in the electrolyte.

To make a storage battery electrode, a mixture of the halogenated para-aminophenol product and electrically conductive carbon material is disposed in electrical contact with a current collector. The storage battery electrode is assembled into a storage battery cell including the electrode as a positive electrode and further including a cell container, a negative electrode, and an auxiliary electrode for oxidation of a component of an electrolyte solution to compensate for hydrogen evolution at the negative electrode during charging.

For example, a carbon-zinc storage battery has a negative electrode including carbon fiber for receiving zinc electrodeposited from the electrolyte solution during charging, a zinc salt electrolyte solution in the cell container, and a controller responsive to voltage between the electrodes for controlling current to the auxiliary electrode for oxidation of the component of the electrolyte solution to compensate for hydrogen evolution at the negative electrode during charging.

In a specific example of a deep-cycle carbon-zinc storage battery for grid storage, load leveling, solar-voltaic and wind farm energy backup, or electric submersible ship applications, the controller is programmed to periodically strip zinc from the negative electrode and to update an auxiliary electrode current set-point in response to the voltage between the electrodes when the negative electrode is partially stripped of zinc. A reactor is coupled to the cell container for regenerating the component of the electrolyte solution by reacting an oxidation product evolved at the auxiliary electrode with hydrogen evolved at the negative electrode during charging. For example, the oxidation product is at least one of oxygen, chlorine, bromine, and carbon dioxide, and the component of the electrolyte solution is at least a corresponding one of water, hydrogen chloride, hydrogen bromide, and formic acid.

BRIEF DESCRIPTION OF THE DRAWINGS

Additional features and advantages of the disclosure will be described below with reference to the drawings, in which:

FIG. 8 is a lateral cross-section view of an electrode having a thin surface film of electro-conductive redox polymer;

FIG. 9 is a lateral cross-section view of a storage battery electrode including electro-conductive redox polymer electrode-active material in a tubular perforated container;

FIG. 10 is a lateral cross-section view of a storage battery electrode including a plate of dimensionally-stabilized electro-conductive redox polymer electrode-active material;

FIG. 11 is a lateral cross-section view of an electrode for testing a small sample of electrode-active material in an electrochemical cell;

FIG. 12 is a lateral cross-section view of a rechargeable zinc electrode for an electrochemical cell;

FIG. 13 is a schematic diagram of an electrochemical cell including the electrodes of FIG. 11 and FIG. 12;

FIG. 18 is a top view cross-section of the storage battery cell of FIG. 17 showing a magnified view of a separator;

FIG. 19 is a top view of the separator grid introduced in FIG. 18;

FIG. 20 is a front view of the separator grid introduced in FIG. 18;

FIG. 21 is a side view of the separator grid introduced in FIG. 18;

FIG. 22 is a back view of the separator grid introduced in FIG. 18;

Figure 1:
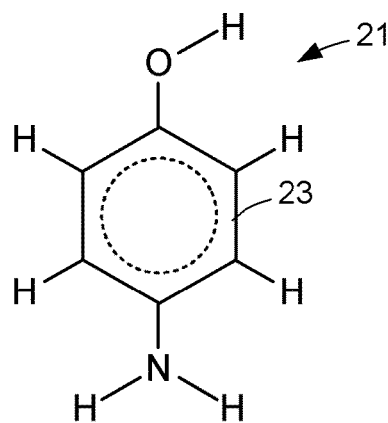
FIG. 1 is a schematic diagram of a molecule of para-aminophenol.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

One aspect of the present disclosure involves producing electro-conductive redox polymer from para-aminophenol. FIG. 1 shows a para-aminophenol molecule 21. The molecule 21 includes a six-carbon ring 23, a hydroxyl group (OH) at a so-called first position on the carbon ring, and a nitrogen atom (N) at the so-called "para" or $4^{th}$ position on the carbon ring. A large quantity of para-aminophenol of high isomeric purity and low cost is being produced presently for the manufacture of the popular pain reliever acetaminophen.

Figure 2:
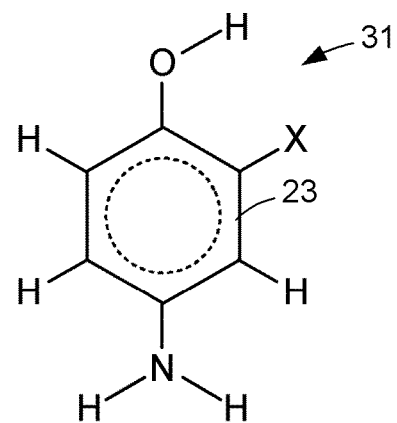
FIG. 2 is a schematic diagram of a molecule of para-aminophenol halogenated with a halogen (X)

Electro-conductive redox polymer can be produced from para-aminophenol that has been halogenated to a degree selected to attach halogen to one and only one of the two ortho positions of the carbon ring in the para-aminophenol. FIG. 2 shows a molecule 31 of such a halogenation product. The halogen atom (X) occupies the so-called "meta" or second position on the carbon ring 23. This "meta" position is also equivalent to the $6^{th}$ position on the carbon ring 23 due to a planar nature of the molecule 31. In one specific example, the halogen (X) is chlorine, and the halogenation product is called "2-chloro-4-aminophenol." In another specific example, the halogen (X) is bromine, and the halogenation product is called "2-bromo-4-aminophenol."

This selected degree of halogenation has been found to facilitate a kind of oxidative polymerization that results in an electro-conductive redox polymer. Without such a selected degree of halogenation, oxidation of para-aminophenol has resulted in the production of polymer that is not electro-conductive, or in the production of quinone by removal of nitrogen from the para-aminophenol.

A possible theoretical explanation for the beneficial effect of the selected degree of halogenation is that the halogen atom attached to one and only one of the two ortho positions of the carbon ring is a preferred "leaving group." Therefore the halogen atom becomes substituted by the nitrogen atom of a neighboring halogenated para-aminophenol molecule during the polymerization process, in a reaction akin to Buchwald-Hartwig amination. In practice a catalyst such as palladium is not needed, apparently due to the activating nature of the hydroxyl (OH) group and the amine (NH2) group on the carbon ring 23. Possibly polymerization of the halogenated para-aminophenol is catalyzed by impurities of transition metal such as iron. In any event, such a reaction mechanism would result in a linear and uniform polymer chain, which should be electro-conductive via resonant tunneling of charge carriers, in contrast to an irregular branched polymer structure, which would not be so electro-conductive.

The electro-conductivity of the polymerization product may also be affected by the presence of para-aminophenol that has not been halogenated and by the presence of para-aminophenol that that has been halogenated to include more than one halogen atom per molecule. Para-aminophenol that has been halogenated to include more than one halogen atom per molecule is likely to have halogen at the $2^{nd}$ and $6^{th}$ meta positions on the carbon ring 23. Such a molecule may become incorporated into the polymer and cause a branch in the polymer, which may cause a branched irregular structure reducing electrical conductivity.

A molecule of un-halogenated para-aminophenol (21 in FIG. 1) may also become incorporated into the polymer, and in this case the molecule of un-halogenated para-aminophenol may act as an end stop to the polymerization process. Short polymer segments may reduce the electrical conductivity of the bulk polymer, due to an increased resistance of more frequent charge carrier hops between polymer segments along the path of electrical conduction. However, short polymer segments may provide a smaller deviation in the distribution of oxidation-reduction potentials than long polymer segments, resulting in a flatter charge and discharge voltage characteristic when the polymer is used as an electrode-active material in a storage battery.

Figure 3:
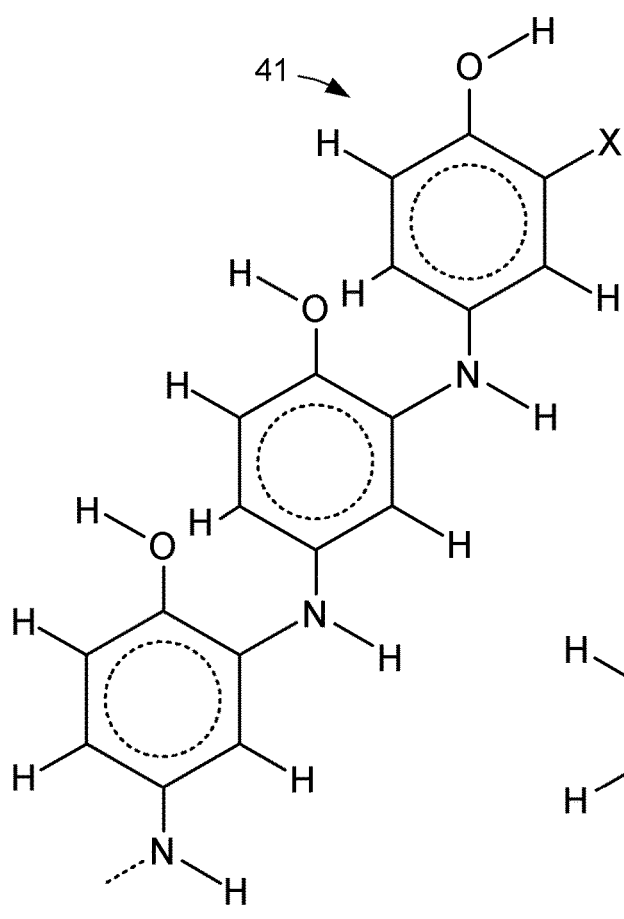
FIG. 3 is a schematic diagram of a first level of polymerization of molecules of the halogenated para-aminophenol of FIG. 2.

FIG. 3 shows a polymer segment 41 resulting from a first level of polymerization of molecules of halogenated para-aminophenol each having one and only one ortho position occupied by an atom of the halogen "X" (as shown in FIG. 2). According to the theory introduced above, polymerization would be most likely to occur by formation of a nitrogen-carbon bond at an ortho position on the carbon ring. In the example of FIG. 3, the ortho position favored for the nitrogen-carbon bond is assumed to be the ortho position occupied by the halogen atom "X", rather than the ortho position occupied by the hydrogen atom "H". Polymerization is driven by oxidizing conditions, and may be accelerated by an increase in temperature. In an aqueous or other kind of ionic solvent, polymerization may be inhibited or retarded by low pH, and driven or enhanced by high pH.

Figure 4:
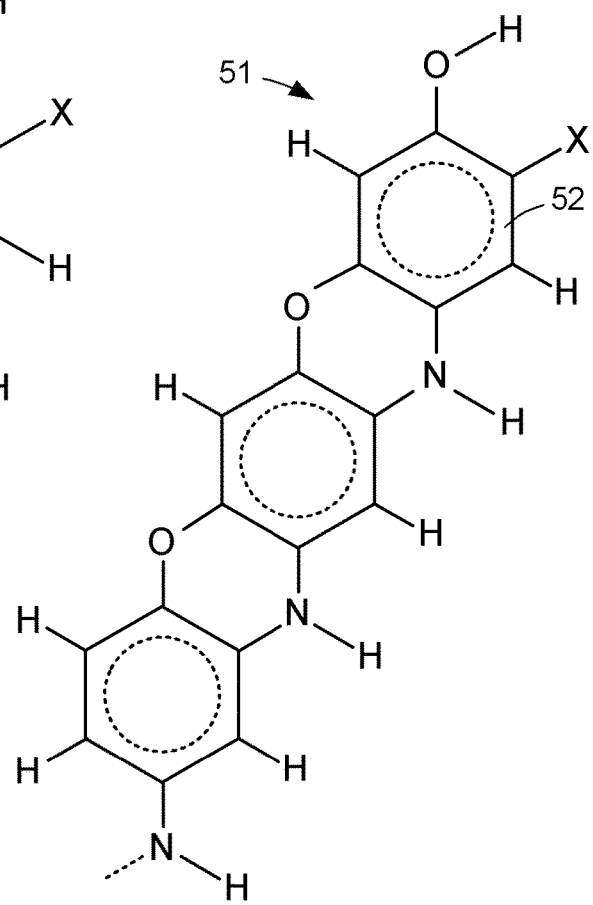
FIG. 4 is a schematic diagram of a second level of polymerization of the halogenated para-aminophenol of FIG. 2.

FIG. 4 shows a polymer segment 51 presumed to result from a second level of polymerization of the polymer segment 41 of FIG. 3, due to the fact that the structure of the segment 41 of FIG. 3 is similar to an intermediate structure in the polymerization of ortho-aminophenol. In this case, the polymer segment 51 is rod shaped and has phenoxazine-like links of neighboring "O" and "N" atoms between neighboring carbon rings. Thus, the polymer segment 51 is similar to a segment of poly ortho-aminophenol except that a halogen atom "X" is disposed at an ortho position on the carbon ring 52 at one end of the segment.

Figure 5:
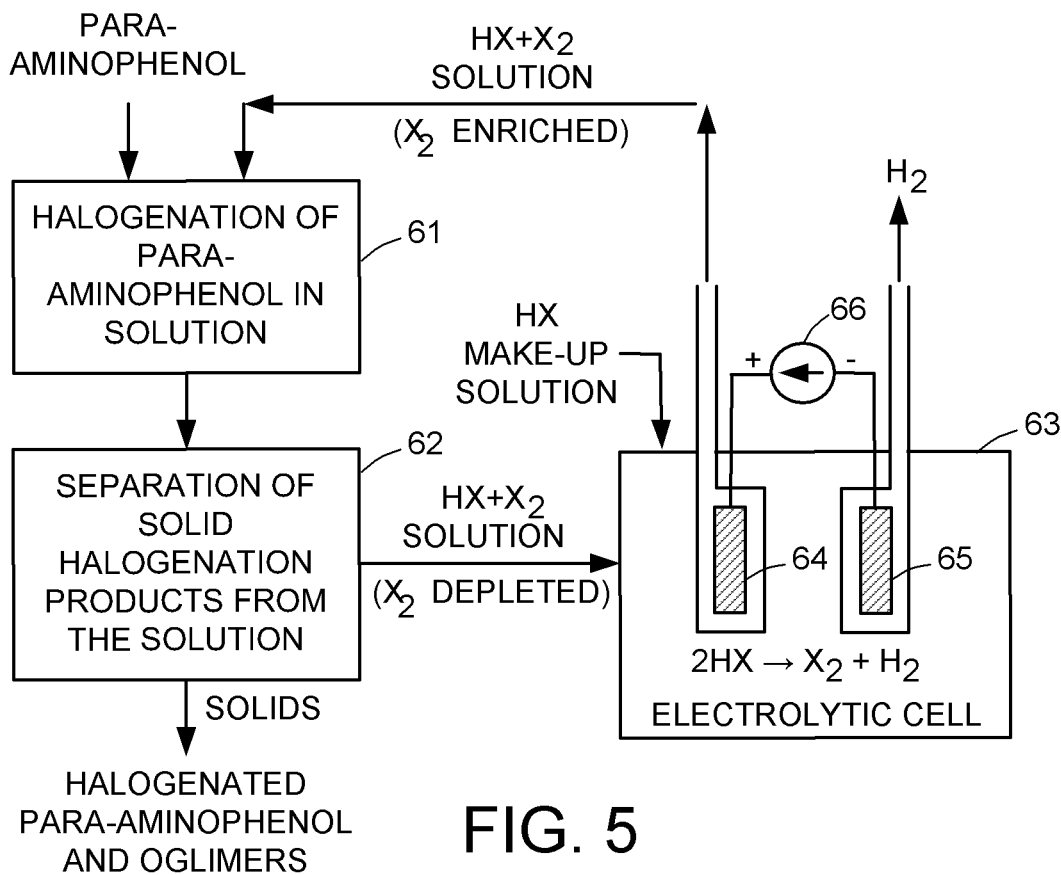
FIG. 5 is a flow diagram of a method of halogenating para-aminophenol.

FIG. 5 shows a method of halogenating para-aminophenol for the production of electro-conductive redox polymer. First, in box 61, the para-aminophenol is dissolved in a solution of halogenic acid (HX) and halogen ($X_2$) having concentrations of halogenic acid (HX) and halogen ($X_2$) selected to attach halogen to one and only one of the two ortho positions of the carbon ring in the para-aminophenol and to induce production of some oglimers. For example, the solute is water, and the halogenic acid is hydrochloric acid or hydrobromic acid, and the halogen is chlorine or bromine. The para-aminophenol is dissolved in a solution of the halogenic acid (e.g., 1 M or more acid concentration), and then the halogen is slowly added to the solution as the solution is agitated. For example, a solution of the halogenic acid (e.g., 1 M or more) and the halogen is added dropwise to the solution as the solution of the para-aminophenol and halogenic acid is stirred.

In cases where the solute is water and the halogen is chlorine or bromine, the reaction product is solid and floats to the surface of the solution. Halogen is added until no further solid is produced, and this requires an amount of halogen in excess of about four moles of halogen atoms (X) for each mole of para-aminophenol. The electrochemical reduction potential of chlorine or bromine in the solution is more positive than the electrochemical oxidation potential of the para-aminophenol to a quinone form in solution. Therefore two moles of halogen atoms are reduced to halide ions in solution in order to oxidize one mole of the para-aminophenol to its quinone form in solution before nucleophilic attack of the halogen produces a significant amount of the solid reaction product. Two more moles of halogen atoms are consumed by the nucleophilic attack of one mole of the quinone form of the para-aminophenol. One mole of the halogen atoms end up on one ortho position of each carbon ring, and one mole of the halogen atoms end up as halide in solution with the hydrogen ions from the hydrogen atoms displaced from the carbon rings.

Next, in box 62, the solid halogenation products are separated from the solution. For example, the solid halogenation products are skimmed from the surface of the solution, or are filtered from the solution. The resulting halogenated amino-phenol and oglimers are in a form suitable for further polymerization when subjected to further oxidation, especially when heated, dried, or placed in an ionic solution having a high pH. Oxidation may occur due to oxygen from air, although a wet acidic product is sufficiently air-stable over many hours to be assembled into battery electrodes without apparent degradation. For a product made with bromine, spontaneous explosive polymerization may occur if the product is dried.

FIG. 5 further shows an electrolytic cell 63 regenerating halogen from the solution resulting from the separation 62 of the solid halogenation products. The electrolytic cell 63 has an anode 64 and a cathode 65 electrically connected to a current source 66. For example, the anode 64 is a rod of graphite or ruthenium plated titanium, and the cathode 65 is a rod of graphite. A flow of electrical current from the current source 66 consumes hydrohalogenic acid (HX) from the solution in the electrolytic cell 63 and liberates molecular halogen ($X_2$) at the anode 64 and liberates hydrogen gas ($H_2$) at the cathode 65. Solution enriched in halogen ($X_2$) from around the anode 64 is withdrawn from the cell for use in halogenating the para-aminophenol in box 61. The molecular hydrogen ($H_2$) bubbles up and out of the electrolytic cell. In effect, this molecular hydrogen was stripped from the para-aminophenol.

Some of the halogen (X) functions as a catalyst, and this halogen is recycled from the anode 63 of the electrolytic cell 63. The rest of the halogen (X) ends up in the solid halogenation products that are separated in box 62. Hydrohalogenic acid (HX) make-up solution is added to the electrolytic cell 63 to make up for the halogen in the solid halogenation products and in the hydrohalogenic acid and solute that is carried away with the solid halogenation products. Some of hydrohalogenic acid (HX) make-up solution may originate from hydrohalogenic acid liberated from the solid halogenation products when the solid halogenation products are processed into electrodes and the electrodes are activated by anodic electro-polymerization.

Figure 6:
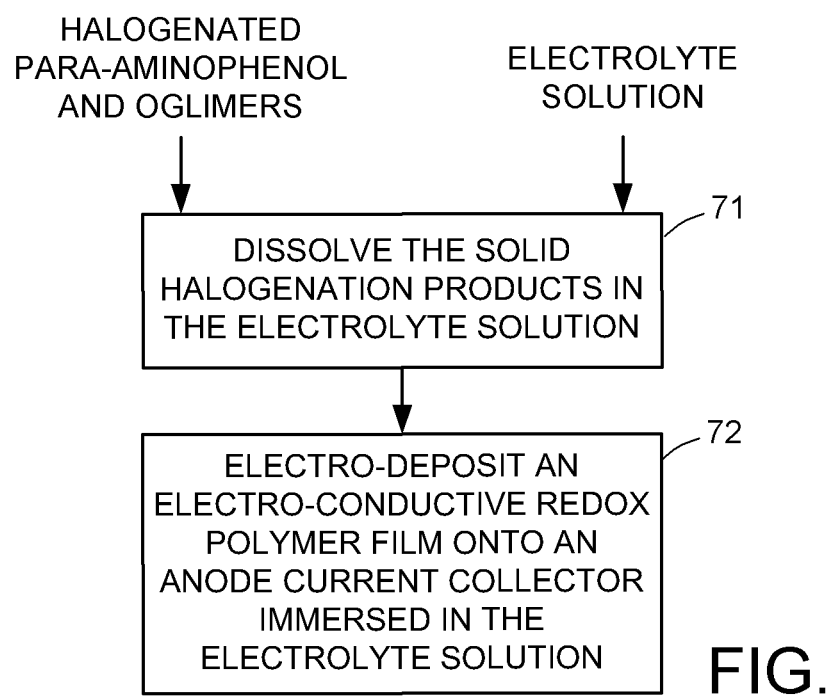
FIG. 6 is a flow diagram of a method of producing an electrode having a thin surface film of electro-conductive redox polymer.

FIG. 6 shows a method of producing an electrode having a thin surface film of electro-conductive redox polymer. First, in box 71, the solid halogenation products (from box 72 of FIG. 5) are dissolved in an electrolyte solution. For example, the electrolyte is an aqueous solution of zinc chloride and methanol. Next, in box 72, an electro-conductive redox polymer film is electro-deposited onto an anode current collector immersed in the electrolyte solution. For example, the anode current collector is a graphite rod, or a ruthenium plated titanium rod, and a graphite cathode and a current source are also used in the electro-deposition process. Specific examples are further described below with reference to FIG. 8 and FIG. 38.

Figure 7:
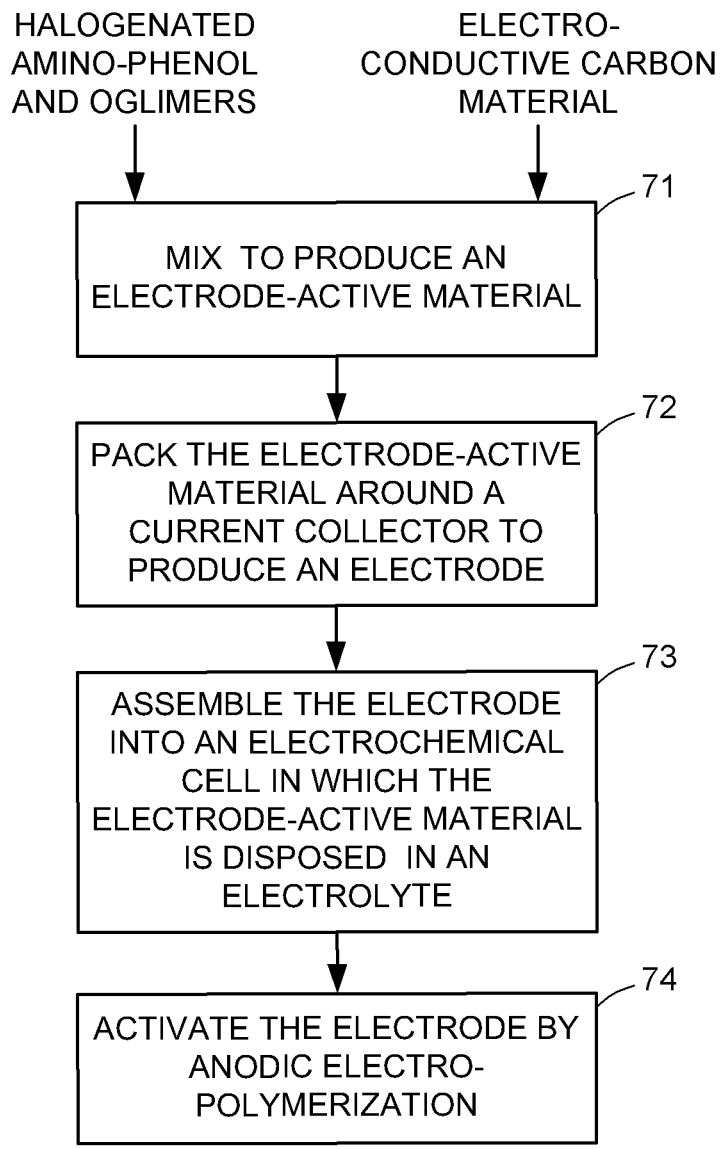
FIG. 7 is a flow diagram of a method of producing a storage battery electrode including electro-conductive redox polymer.

FIG. 7 shows a method of producing a storage battery electrode including electro-conductive redox polymer. First, in box 71, an electroactive material is made by mixing the halogenated amino-phenol and oglimers with electro-conductive carbon material. This results in the halogenated amino-phenol and oglimers being imbedded in an electro-conductive matrix of the carbon material. For example, the electro-conductive carbon material is carbon black, graphite powder, ball-milled activated carbon, graphene flake, chopped carbon fiber or carbon nanofiber (CNF), carbon nanotubes, or a mixture thereof.

The halogenated amino-phenol and oglimers should be very well mixed with the electro-conductive carbon material. The mixing may include grinding, although the grinding need not be aggressive or prolonged. Apparently grinding may catalyze polymerization of the halogenated amino-phenol and oglimers due to oxidation with oxygen from the air, and such oxidation and grinding should not be continued once a substantial amount of polymerization has occurred. Instead, polymerization after assembly of the electrode may be beneficial to structural integrity and conductivity of the polymer chains and their electrical connections to the carbon matrix.

The mixing in box 71 may result in a damp powder or paste. For making a storage battery electrode having a thick layer or large mass of active material, some chopped graphite fiber may be mixed with this damp powder or paste without further grinding. Further grinding may fracture the fiber, which would not be desirable in a thick layer or large mass of active material. Also, instead of grinding, a solvent such as methanol may be added to dissolve the halogenated amino-phenol and oglimers during mixing so that the halogenated amino-phenol and oglimers become infused into the electro-conductive carbon material to produce a homogenous product without grinding.

Next, in box 72, the electrode-active material is packed around a current collector to produce an electrode. When chopped graphite fiber has been mixed in with the active material, it is advantageous for continuous segments of the chopped fiber to provide a direct path of high electrical conductivity from the current collector to the surface of the active material outward from the current collector. For example, the length of the chopped graphite fiber is the length of this direct path.

Next, in box 73, the electrode is assembled into an electrochemical cell in which the electrode-active material is disposed in an electrolyte. The electrolyte can be aqueous or non-aqueous, and solid or liquid. The electrolyte should have a high ionic conductivity, and it should not chemically react with the electrodes in a destructive fashion. The electrode having the poly-aminophenol active material may function as a super-capacitor electrode, due to the very large surface area presented to the electrolyte by the nano-rod structure of the poly-aminophenol. The poly-aminophenol active material may also undergo reversible electrochemical oxidation-reduction reactions with protonic ions in the electrolyte. Such reversible electrochemical oxidation-reduction reactions may occur in an acidic aqueous electrolyte while the poly-aminophenol remains electrically conductive.

For example, the poly-aminophenol electrode is very well matched as a positive electrode in connection with a zinc negative electrode in a storage battery in which the electrolyte is an acidic chloride or sulfate zinc plating solution having a pH in the range of about 3 to 5.5. The poly-aminophenol electrode may also be used as a positive electrode in a hydride storage battery or a lithium or sodium ion storage battery. The lithium or sodium ion battery may use a negative electrode that will intercalate lithium or sodium ions. Such a negative electrode may contain oxides or phosphates of vanadium, titanium, or iron. In this case the electrolyte may be a weakly acidic (e.g., pH=5.5) aqueous salt solution. The poly-aminophenol electrode may also be used as a positive electrode in a storage battery having an acidic aqueous salt solution (e.g., sodium bisulfate) and a pseudo-capacitive negative electrode containing activated carbon or graphene.

Next, in step 74, the electrode containing the aminophenol active material is activated by anodic electro-polymerization. The anodic electro-polymerization increases electrical conductivity of the electrode-active material by creating poly-aminophenol segments extending from the current collector into the mass of active material. The increased conductivity has been observed as a decrease in the electrical resistance between the positive and negative electrodes of the electrochemical cell, and an increase in storage capacity of the electrochemical cell. For the case of poly-aminophenol created from 2-bromo-4-aminophenol, activation has been completed when the electrode is overcharged for less than one-half of its capacity. For the case of electrode-active material created from 2-chloro-4-aminophenol, activation has been completed when the positive electrode has been overcharged for more than one-half of its capacity, and the overcharging has been done over multiple charge and discharge cycles in order to observe saturation in the increase in storage capacity from each cycle to the next cycle. Specific examples are described below.

FIG. 8 shows an electrode 81 having a thin surface film 83 of electro-conductive redox polymer disposed on a current collector 82. For example, the electro-conductive redox polymer is produced from 2-chloro-4-aminophenol, the current collector 82 is a graphite rod, and the film 83 is deposited on the current collector 82 by anodic electro-polymerization from a solution of chlorinated para-aminophenol and zinc chloride in methanol. Another suitable current collector 82 is a titanium rod that has been plated with precious noble metal; for example, ruthenium for use in a chloride or bromide electrolyte, or platinum for use in a sulfate electrolyte.

FIG. 9 shows a storage battery electrode 91 for many hours of energy storage. For example, the number of hours of energy storage is on the order of the outer diameter of the electrode 91 in millimeters. The electrode-active material is electro-conductive redox polymer produced from 2-bromo-4-aminophenol, and this electrode active material is disposed in an electrically conductive carbon matrix 92. For example, the electrically conductive carbon matrix is a mixture of chopped graphite fiber and graphite powder or acetylene black. In this example, the electrode 91 is dimensionally stabilized by an outer tube 93 of porous or perforated plastic. For example, the tube 93 is made of polyvinylchloride, and the tube is perforated when it is injection molded. A micro-porous liner 94 is disposed within the tube 93. For example, the liner 94 is made of filter paper impregnated with a hydrogel, such as silica gel (e.g., Sydney U.S. Pat. No. 2,302,832 issued Nov. 24, 1942) or an organic polymer hydrogel (e.g., Winkler U.S. Pat. No. 3,577,357 issued May 4, 1971). A current collector 95 such as a graphite rod is centrally disposed within the tube 93, and a washer 96 around the current collector 95 seals the carbon matrix 92 within the tube 93. The washer 96, for example, is made from hard wax or thermoplastic resin, which is melted and poured into place, or results from epoxy glue or polyvinylchloride cement poured into place.

FIG. 10 shows a storage battery electrode 101 having a plate 102 of dimensionally-stabilized electro-conductive redox polymer. The plate 102 is molded around a perforated current collector 103 such as perforated graphite foil. In addition to the electro-conductive redox polymer, the plate 102 includes conductive carbon material, such as graphite fiber and powdered graphite or acetylene black, and a binding agent such as epoxy resin and hardener (e.g., triethlenetetramine). The binding agent may improve the mechanical strength of the plate 102 and may also inhibit further growth of the electro-conductive redox polymer chains. The binding agent may be introduced after a selected degree of electro-polymerization of the electro-conductive redox polymer (e.g., after activation of the electrode in step 74 in FIG. 7). For example, epoxy resin and hardener is diluted with acetone, and the solution is sprayed onto the electrode 101, or the electrode is dipped into the solution. The solution may also include hydrogel, such as sulfonated polymer or sulfonated block copolymer, so that a hydrogel film is produced over the surface of the plate 102.

FIG. 11 shows an electrode 111 for testing a small sample of electrode-active material 114 in an electrochemical cell (131 in FIG. 13). The electrode-active material 114 is contained within a cylindrical filter paper tube 112 sealed at a lower end with hard wax 115. An elongated graphite rod 113 is centrally disposed in the tube 112. For example, the tube 112 has an internal diameter of ⅛ inch (3.2 mm) and a length of about one inch (25.4 mm), and the graphite rod 113 is an automatic pencil lead (e.g. PENTEL™ HB hi polymer) having a diameter of 0.9 mm. The tube 112 can be made by winding a rectangular strip of filter paper (26 mm by 76 mm) around a ⅛ inch (3.2 mm) diameter mandrel (e.g. a glass tube, not shown), and gluing down the outer edge of the strip with polyvinyl acetate glue (e.g. ELMER'S GLUE-ALL® multi-purpose glue).

FIG. 12 shows a rechargeable zinc electrode 121 for an electrochemical cell (131 in FIG. 13). A zinc strip 122 is contained within a cylindrical filter paper tube 123 sealed at a lower end with hard wax 124. An upper end of the zinc strip 122 is held in contact with a graphite rod 125 centrally disposed in the upper end of the tube 123. Many strands of structural graphite fiber 126 are also held in contact with the graphite rod 125 and are disposed within the tube 123. For example, the structural graphite fiber 126 has a diameter of five to seven microns, and an open mass of the structural graphite fiber fills the space in the tube 123 below the lower end of the graphite rod 125, and this open mass of structural graphite fiber has a mass density of less than one tenth the mass density of solid graphite, and more than about one hundredth the mass density of solid graphite. In other words, the open mass of the structural graphite fiber 126 occupies a region that is about 90 to 99 percent open space to receive electrolyte.

Structural carbon fiber is commonly manufactured from polyacrylonitrile or mesophase pitch, and sold for use as a reinforcing material in an epoxy or polyester resin matrix. For making the electrode 121, a length of graphite twill (e.g., from Raka, Inc. of Ft. Pierce, Fla.) is cut into segments, and upper ends of the segments, together with the upper end of the zinc strip 122, are secured to the lower end of the graphite rod 125 with a strip of adhesive tape 127 wound around the lower end of the graphite rod 125, and then this assembly is lowered into the tube 123. For example, the tube 123 has an internal diameter of ⅛ inch (3.2 mm) and is similar to the tube 112 in FIG. 11, and the graphite rod 125 has a diameter of 2 mm (e.g., an automatic pencil lead R-3 4B from Pacific Arc, Inc. of Richmond, Tex.).

It has been found that use of a low-density open mass of structural graphite fiber as a negative electrode in an acidic zinc storage battery suppresses zinc dendrite formation because under the acidic conditions (pH within a range of 3 to 5.5, at a current density of about 8 milliamperes per square centimeter in a zinc bromide solution), zinc is electro-deposited in the form of metal balls on the graphite fiber. The zinc metal balls grow to a diameter of about one quarter of a millimeter before they bud smaller zinc metal balls, in a fashion similar to the asexual reproduction of yeast cells.

FIG. 13 shows an electrochemical cell 131 including the electrodes of FIG. 11 and FIG. 12. The paper tube 112 of the positive electrode 111 is wrapped with a rubber band 116 to keep the positive electrode-active material (114 in FIG. 11) in a state of compression in contact with the positive current collector 113. The upper end of the paper tube 123 of the negative electrode 121 is wrapped with a rubber band 128 to keep the zinc strip (123 in FIG. 12) and the graphite fiber (126 in FIG. 12) in contact with the negative current collector 125. The electrodes 111, 112 are placed in a glass vial 132, and the glass vial is filled with an electrolyte solution 133 covering the paper tubes 112, 123. The upper ends of the current collectors 113. 125 protrude from the top of the vial 132, where they can be connected to electrical circuitry, as described below in FIG. 31.

Figure 14:
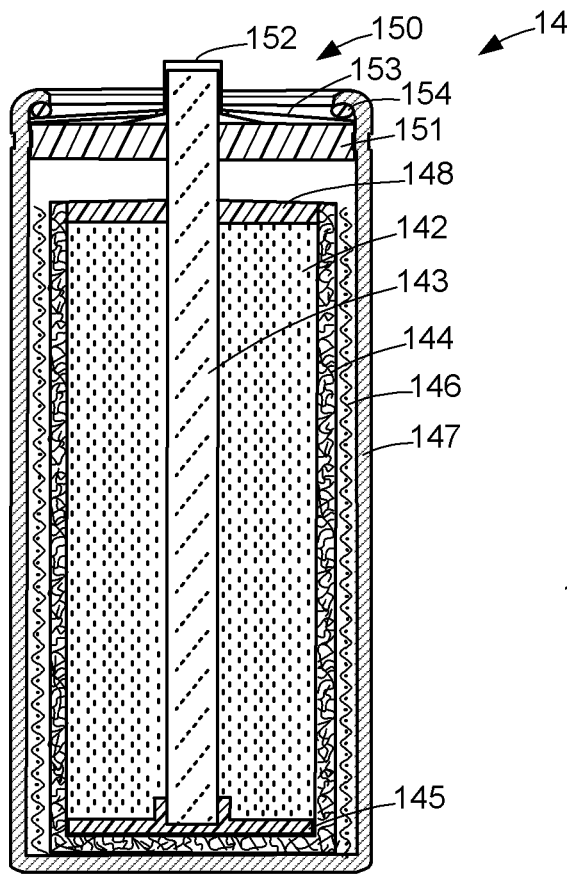
FIG. 14 is a lateral cross-section of a rechargeable zinc dry cell using electro-conductive redox polymer in lieu of manganese dioxide in the positive electrode-active material.

FIG. 14 shows a zinc dry cell 141 using electro-conductive redox polymer in lieu of manganese dioxide in the positive electrode-active material 142. For example, the electro-conductive redox polymer is produced from 2-bromo-4-aminophenol, and this electro-conductive redox polymer is disposed in an electrically conductive carbon matrix to form the positive electrode-active material 142, and the electrically conductive carbon matrix is a mixture of chopped graphite fiber and graphite powder or acetylene black. The positive electrode-active material 142 is packed around a graphite rod current collector 143 and is contained in a paper cup 144. A thermoplastic disk 145 sits in the bottom of the paper cup 144 and centers the bottom of the graphite rod current collector 143 within the paper cup 144 when the positive electrode-active material is added.

A sheet of structural carbon fiber cloth, carbon fiber paper, or carbon fiber felt 146 is wrapped around the paper cup 144, and this assembly of the carbon fiber 146 and the paper cup 144 is seated in a zinc can 147. The top of the paper cup 144 is sealed with a washer 148 of polymeric material such as hard wax or tar, which may be poured into place, over the positive electrode-active material 142. The positive electrode-active material 142, the paper cup 144, and the carbon fiber 146 are filled with an aqueous solution of zinc chloride. The solution of zinc chloride functions as an electrolyte, and the paper cup 144 functions an electrode separator.

The top of the zinc can 147 is sealed with a cap assembly 150. The cap assembly 150 includes a thick polymeric washer 151 fitted onto and around the graphite rod 143, a brass cap 152 fitted over and onto the upper end of the graphite rod 143, a thin polymeric washer 153 fitted over the brass cap and the thick polymeric washer, and an elastomeric O-ring 154 fitted over the thin polymeric washer. The upper end of the zinc can 147 is crimped around the thick polymeric washer 151 while the top of the zinc can is rolled over the O-ring 154 to seal the zinc chloride electrolyte within the dry cell 141.

By using the electro-conductive redox polymer in the positive electrode-active material 142 and using the graphite fiber 146 at the negative electrode, the dry cell 141 can be recharged about ten times, although there is a loss of energy storage capacity of about 5 percent per cycle. The use of zinc for the negative electrode-active material in the dry cell 141, however, has a disadvantage that some hydrogen is evolved at the positive electrode during charging. The hydrogen evolution reduces the current efficiency of the dry cell by about 10 percent, and also increases the pH of the electrolyte. When the pH of the electrolyte is increased above about 5.5, zinc hydroxide is formed. The formation of zinc hydroxide slows down the increase in pH, but the loss of zinc ions from the electrolyte further reduces the power efficiency and will prevent the negative electrode from being fully charged with zinc during the charging cycle. Eventually the conversion of most all of the zinc to zinc hydroxide prevents the plating of zinc at the negative electrode during charging so that the dry cell loses its energy storage capacity.

The increase in pH of the electrolyte during charging of the dry cell 141 can be compensated for by overcharging the electro-conductive redox polymer in the positive electrode-active material 142 at the end of the charging phase of the charge-discharge cycle. Overcharging of the electro-conductive redox polymer occurs when the electro-conductive redox polymer is in its oxidized redox state and the potential of the positive electrode is further increased (relative to the electrolyte) to a voltage level sufficient to cause irreversible electrochemical oxidation of the electro-conductive redox polymer. This irreversible electrochemical oxidation releases hydrogen or hydronium ions that reduce the pH. During this overcharging, the negative electrode can be fully recharged with zinc. However, the irreversible electrochemical oxidation is destructive to the reversible redox capacity of the electro-conductive redox polymer. The pH balance can be maintained so that the performance of the electrolyte and the charging of the zinc negative electrode is preserved, but at the expense of a reduction in capacity of the positive electrode-active material 142. The number of useful charge-discharge cycles can be increased but this number is still limited. Due to this limitation, during the overcharging, rather than fully recharging the negative electrode with zinc, the negative electrode is charged with a slightly lesser amount (about 95 percent) matching the reduction in capacity due to the irreversible electrochemical oxidation of the positive electrode-active material.

The problem of increasing pH in the dry cell 141 during charging could also be addressed by adding a reducing agent to the electrolyte. Formic acid and hydrazine are suitable reducing agents that could be added to the electrolyte. When functioning as a reducing agent, formic acid decomposes by oxidation into hydrogen and carbon dioxide, and hydrazine decomposes by oxidation into hydrogen and nitrogen. In each case the oxidation product, carbon dioxide or nitrogen, is a gas that would be released from the electrolyte so that the oxidation product would not build up in the electrolyte.

For the dry cell 141, formic acid is preferred over hydrazine because hydrazine is more toxic and more expensive than formic acid. Formic acid is soluble in an aqueous zinc chloride solution at a pH of 5, where most of it is converted to formate anions. It would be desirable if the formate anions would undergo oxidation at an electrochemical potential greater than the reversible redox potential of the electro-conductive redox polymer and less than the irreversible reduction potential of the electro-conductive redox polymer. Possibly this would occur if a formate oxidation catalyst operative at this desired redox potential were added to the positive electrode-active material 142.

Bromine is an effective oxidizing agent for oxidizing formate in the electrolyte of a zinc battery cell. The reduction potential of bromine is greater than the irreversible reduction potential of the electro-conductive redox polymer produced from 2-bromo-4-aminophenol. The formate anions can be controllably oxidized by bromine produced at an auxiliary electrode in a zinc battery cell filled with electrolyte including bromide as well as formate anions.

Figure 15:
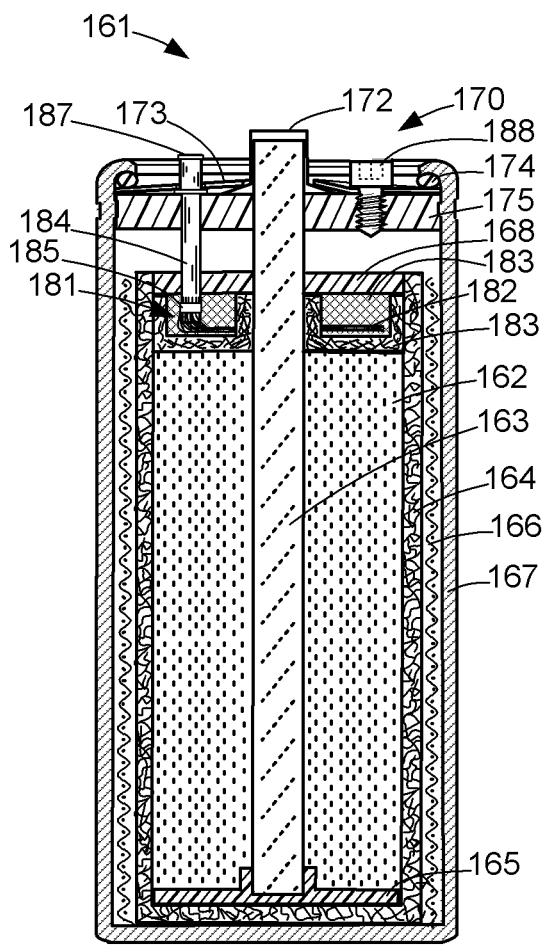
FIG. 15 is a lateral cross-section of a rechargeable zinc dry cell having an auxiliary electrode.

FIG. 15 shows a zinc dry cell 161 having an auxiliary electrode 181 in addition to components similar to the ones found in FIG. 14. The components similar to the ones found in FIG. 13 include positive electrode-active material 162, a graphite rod current collector 163, a paper cup separator 164, a thermoplastic disk 165, carbon fiber 166, a zinc can 167, a washer 168 of polymeric material, and a cap assembly 160 including a thick polymeric washer 161, a brass cap 162 on the graphite rod 163, a thin polymeric washer 173, and an elastomeric O-ring 174.

The auxiliary electrode 181 includes a ring of carbon fiber twill 182 disposed in a paper cup 183 seated on the positive electrode-active material 162. The paper cup 183 and the ring 182 of carbon fiber twill encircle the graphite rod current collector 163. The auxiliary electrode 181 further includes a graphite rod current collector 184. An elastic band 185 around a lower end of the graphite rod 184 secures the ends of the carbon fiber twill of the ring 182 to the graphite rod 184 so that the ring 182 is electrically connected to the graphite rod 184. The paper cup 183 is also filled with electrolyte absorbent material 186 such as cotton or tissue paper, and the paper cup 183 is sealed by the polymeric washer 168. The graphite rod 184 extends through the polymeric washer 175 and the polymeric washer 168. The upper end of the graphite rod 184 is covered with a brass cap 187 providing a terminal for connection of the auxiliary electrode 181 to an external charging circuit, as further described below. The thick polymeric washer 175 is drilled and taped to receive a threaded plug 188 extending through a hole in the thin polymeric washer 173. The plug 188 is removable to permit electrolyte or reducing agent to be injected into the dry cell 161.

A storage battery cell employing an auxiliary electrode may have other configurations selected in accordance with a desired duty cycle or to facilitate circulation of the electrolyte and reducing agent within the cell or among a group of cells.

Figure 16:
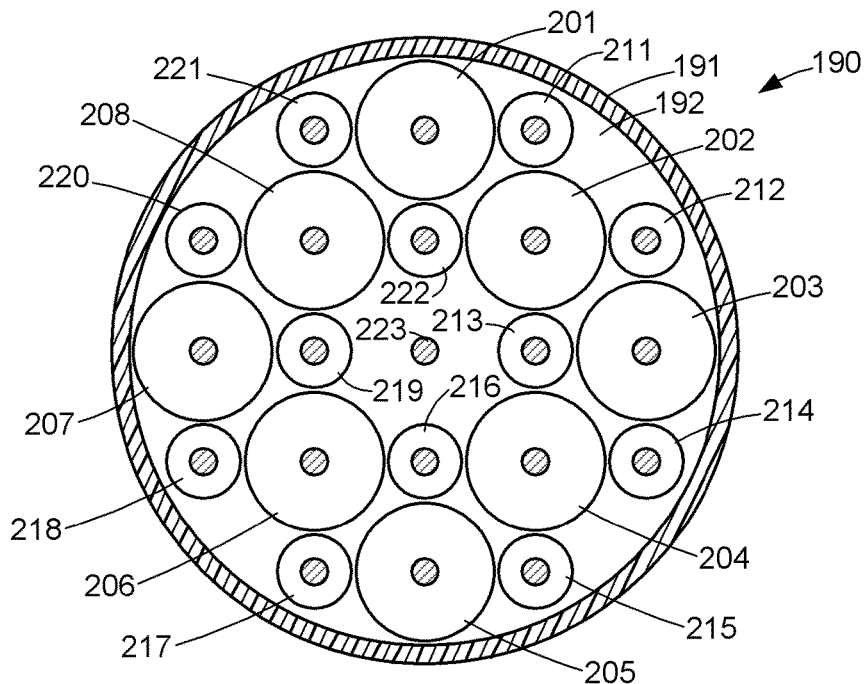
FIG. 16 is a top view cross-section of a storage battery cell using the positive electrode construction introduced in FIG. 9.

FIG. 16 shows a storage battery cell having a circular battery jar 191 containing electrolyte 192, eight positive electrodes 201, 202, 203, 204, 205, 206, 207, 208, twelve negative electrodes 211, 212, 213, 214, 215, 216, 217, 218, 219, 220, 221, 222, and one auxiliary electrode 223. The positive electrodes, for example, are similar to the positive electrode 91 in FIG. 9. The negative electrodes, for example, are similar to the negative electrode 121 in FIGS. 12 and 13. The auxiliary electrode 223 is centrally located in the battery jar 191, and the other electrodes are regularly spaced around the auxiliary electrode. The auxiliary electrode 223, for example, is a graphite rod.

Figure 17:
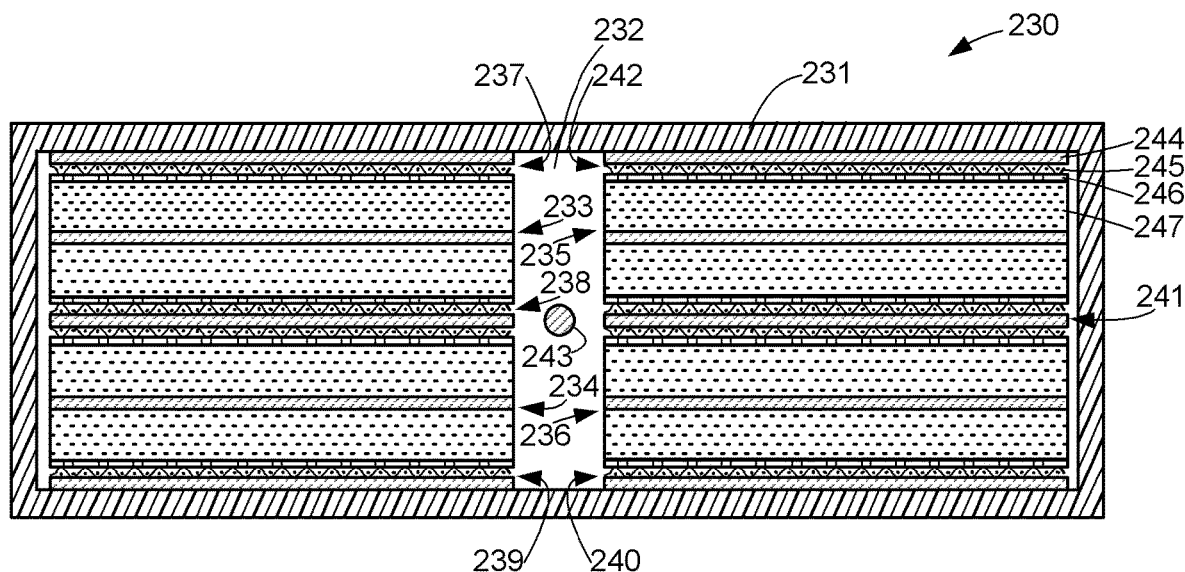
FIG. 17 is a top view cross-section of a storage battery cell using the positive electrode construction introduced in FIG. 10.

FIG. 17 shows a storage battery cell 230 having a rectangular prismatic case 231 containing electrolyte 232, four positive electrodes 233, 234, 235, 236, six negative electrodes 237, 238, 239, 240, 241, 242, and one central auxiliary electrode 243. Each positive electrode, for example, is similar to the positive electrode 101 in FIG. 10. Each negative electrode has a current collector that is a sheet of graphite, and each negative electrode has at least one sheet of carbon fiber material disposed parallel to and in contact with the sheet of graphite. The sheet of carbon fiber material is immersed in the electrolyte for zinc plating when the storage battery cell is being charged. The sheet of carbon fiber material, for example, is a sheet of carbon fiber cloth, carbon fiber paper, or carbon fiber felt. The sheet of carbon fiber material is disposed between the sheet of graphite and a separator sheet that separates the sheet of carbon fiber material from positive electrode-active material of a neighboring positive electrode in the case 231.

For example, the negative electrode 242 has a sheet of graphite 244 and a sheet of carbon fiber cloth 245. The sheet of carbon fiber cloth 245 is disposed between the sheet of graphite 244 and a separator sheet 246 that separates the sheet of carbon fiber material from positive electrode-active material 247 of the neighboring positive electrode 235.

FIG. 18 shows the separator sheet 246 in greater detail. The separator sheet 246 includes a separator grid 251 sandwiched between a pair of microporous or nanoporous separator sheets 252 and 253.

The separator grid 251 is further shown in FIGS. 19 to 22. The separator grid is constructed to provide spacing between adjacent positive and negative electrodes of a cell in a zinc storage battery, and to provide vertical channels for removal of hydrogen gas evolved at the negative electrode during charging. The separator grid 120 has a series of vertical ribs 120, 122, 123, 124, and a matrix of square apertures 126, 127, 128, 129. The separator grid 120 is made of an electrically insulating material. For example, the separator grid 120 is molded from a thermoplastic material such as polyvinyldine fluoride or polyvinyl chloride.

As introduced above, a rechargeable zinc battery using an aqueous electrolyte solution of a zinc salt has a problem of hydrogen evolution at the negative electrode during charging. This hydrogen evolution will result in an undesirable increase in pH unless a corresponding amount of hydronium ions are put back into the electrolyte by electrochemical oxidation. There are various ways of putting a corresponding amount of hydronium ions back into the electrolyte by electrochemical oxidation.

Figure 23:
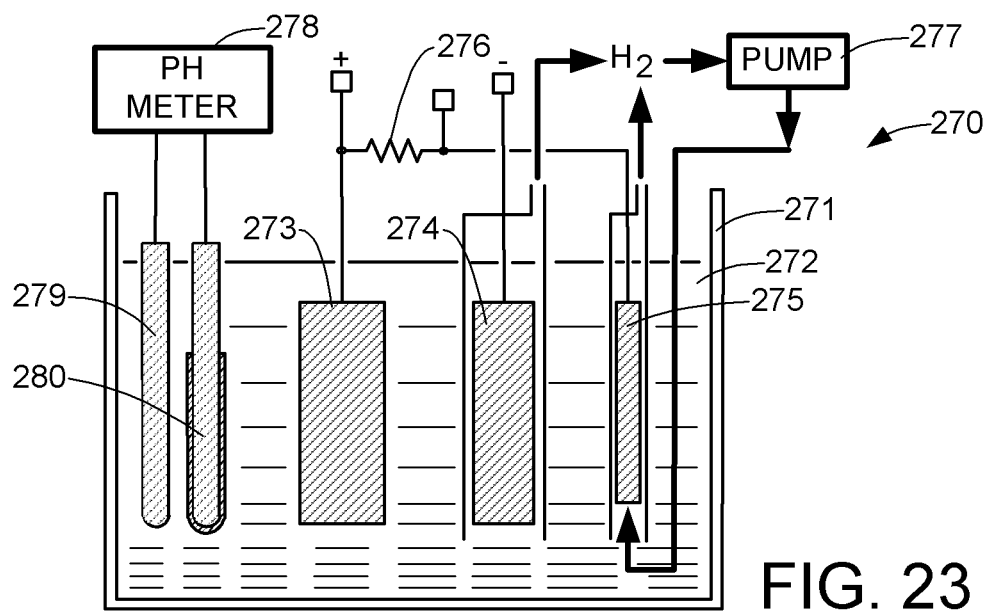
FIG. 23 is a schematic diagram of a zinc storage battery cell having a catalytic hydrogen electrode absorbing and electrochemically oxidizing hydrogen evolved at the zinc negative electrode during charging.

FIG. 23 shows a zinc storage battery cell 270 having a container 271 containing an aqueous zinc salt electrolyte 272, a positive electrode 273 having electro-conductive redox polymer electrode-active material, a negative electrode 274 having zinc electrode-active material, and an auxiliary electrode 275 having hydrogen oxidation catalyst. For example, the zinc salt in the electrolyte 272 is zinc sulfate and the hydrogen oxidation catalyst is palladium black, or the zinc salt in the electrolyte is zinc chloride and the hydrogen oxidation catalyst is ruthenium black. A current sensing resistor 276 electrically connects the auxiliary electrode 275 to the positive electrode 273. A pump 277 circulates hydrogen gas evolved at the negative electrode 274 over the auxiliary electrode 275. The hydrogen gas becomes oxidized at the auxiliary electrode 275 to produce hydronium ions in the electrolyte and to produce a current flowing through the current sensing resistor 276.

The zinc storage battery cell 270 has the disadvantage of the cost of using a precious metal hydrogen oxidation catalyst in the auxiliary electrode 275. There may also be a long-term reliability problem of the hydrogen oxidation catalyst becoming deactivated due to poisoning of the catalyst by impurities that slowly leach out of the positive electrode 273 and the negative electrode 274. Deactivation of the hydrogen oxidation catalyst may be indicated by an increase in hydrogen gas pressure in the cell, a decrease in voltage across the current sensing resistor 275, and by an increase in pH of the electrolyte.

In the zinc storage battery cell 270, a pH meter 278 indicates pH of the electrolyte by measuring voltage between a reference electrode 279 and a pH sensing electrode 280. For example, the reference electrode 279 is a zinc electrode similar to the electrode 121 in FIGS. 12 and 13, and the pH sensing electrode 280 is an electro-conductive redox thin-film electrode similar to the electrode 81 in FIG. 8. The pH meter 278 may charge and discharge the pH sensing electrode at constant current between high and low voltage limits, and convert the period of the resulting charge/discharge cycle to pH by accessing a lookup table of the period as a function of pH. For example, the pH meter 278 may use the circuit of FIG. 33, as further described below. A specific example of the charging and discharging of such a pH sensing electrode at constant current between high and low voltage limits to obtain the period as a function of pH is further described below with reference to FIGS. 38 to 41.

Figure 24:
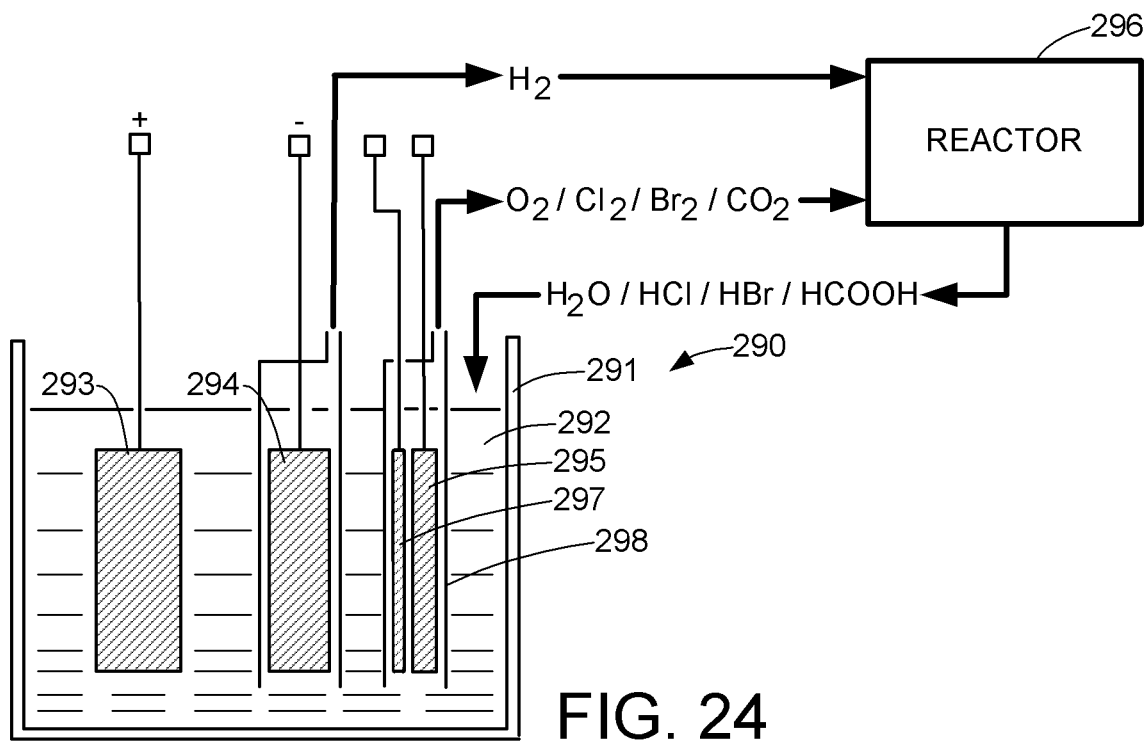
FIG. 24 is a schematic diagram of a zinc storage battery cell having an auxiliary electrode evolving an electrochemical oxidation product that is combined with hydrogen evolved at the zinc negative electrode during charging.

FIG. 24 shows a zinc storage battery cell 290 having a container 291 containing an aqueous zinc salt electrolyte 292, a positive electrode 293 having electro-conductive redox polymer electrode-active material, a zinc negative electrode 294, and an auxiliary electrode 295 for controlled oxidation of a component of the electrolyte to produce an oxidation product that is fed to a reactor 296 for combination with the hydrogen gas liberated at the negative electrode during charging. The combination from the reactor 296 is fed back to the electrolyte. For example, the component of the electrolyte is water, chloride, bromide, or formate, and the oxidation product is oxygen, chlorine, bromine, or carbon dioxide, and the reactor 296 produces water, hydrogen chloride, hydrogen bromine, or formic acid. For example, the zinc salt includes sulfate or borate to produce oxygen at the auxiliary electrode 295, and the auxiliary electrode is platinum plated titanium or lead-silver alloy. For example, the zinc salt includes chloride to produce chlorine at the auxiliary electrode 295, and the auxiliary electrode is ruthenium plated titanium. For example, the zinc salt includes bromide to produce bromine at the auxiliary electrode 295, or the zinc salt includes bromide and formate to produce carbon dioxide at the auxiliary electrode, and the auxiliary electrode 295 is graphite or graphite powder in a polyvinyldine fluoride binder.

A sensing electrode 297 can be placed close to the auxiliary electrode 295 and within a diaphragm chamber 298 surrounding the auxiliary electrode in order to detect the presence of chlorine or bromine in the chamber from oxidation of chloride or bromide at the auxiliary electrode. For example, the sensing electrode 297 is a graphite rod, which becomes positively charged upon absorbing chlorine or bromine. In an electrolyte including bromine and formate, the voltage of the sensing electrode 297 will also be responsive to the formate concentration, because an increased formate concentration will reduce the concentration of bromine that diffuses from the auxiliary electrode 295 to the sensing electrode.

The reactor 296 may operate at a high temperature and can be a combustion chamber or fuel cell for the case of combining hydrogen with oxygen, chlorine, or bromine, so that precious metal catalyst is not needed. Platinum may be used for combining hydrogen with bromine at a moderate temperature of about 200 degrees Celsius. Hydrogenation of carbon dioxide to formic acid may use a transition metal catalyst such as a pincer type iridium(III) catalyst or a ruthenium organo-metal complex catalyst. For example, the pincer type iridium(III) catalyst is a PNP-ligated chloroiridium(III) dihydride complex synthesized by reacting an iridium(I) source $Ir(coe)_2Cl)_2$ (i.e., chlorobis(cyclooctene)iridium(I)dimer) with an excess amount of alkyl-substituted PNP pincer ligands (e.g., 2,6-bis(phospho-dibutadienemethyl)pyridine) in THF (i.e., tetrahydrofuran) solvent under a hydrogen pressure of 2.5 MPa at 90 degrees Celsius. See, for example, Tanaka, et al., Catalytic Hydrogenation of Carbon Dioxide Using Ir(III)-Pincer Complexes, J. Am. Chem. Soc. (September 2009), Vol. 131, pp. 14168-14169, and Moret, et al. U.S. Pat. No. 9,399,613 issued Jul. 26, 2016.

The hydrogenation of carbon dioxide to formic acid may use a continuous process of flowing supercritical carbon dioxide over a catalyst immobilized in an ionic liquid and stabilizing base with integrated product separation to produce pure formic acid. For example, a metal complex $Ru(cod)(methallyl)_2$ (i.e., bis(2-methylallyl)(1.5-cyclooctadiene)ruthenium(II)) and $PBu_4TPPMS$ (i.e., phospho-tetrabutadiene-triphenylphosphane monosulfonate) in a ratio of 1:3.5 and two to three equivalents of EMIMC (e.g., 1-ethyl-3-methyl-imidazoliun bis(trifluromethylsulfonyl)imide) are added to an ionic liquid EAMMIM-BTA (i.e., 1-(N,N-diethylamionethyl)-2,3-dimethylimidazolium bis(triflurom-ethylsofonyl)imide) in a reactor in a ratio of about 22 micro-mole of the $Ru(cod)(methallyl)_2$ to one milliliter of the ionic liquid. The formic acid is produced in the reactor with a hydrogen pressure between 20 bar and 60 bar and a carbon dioxide pressure between 20 bar and 500 bar and a temperature of about fifty degrees Celsius. The formic acid is separated from a carbon dioxide stream exiting the reactor by depressurization and condensation in a cold trap, and the depleted carbon dioxide stream is re-pressurized and fed back to the reactor stage. See Leitner et al. U.S. Pat. No. 9,073,842 issued Jul. 7, 2015.

Figure 25:
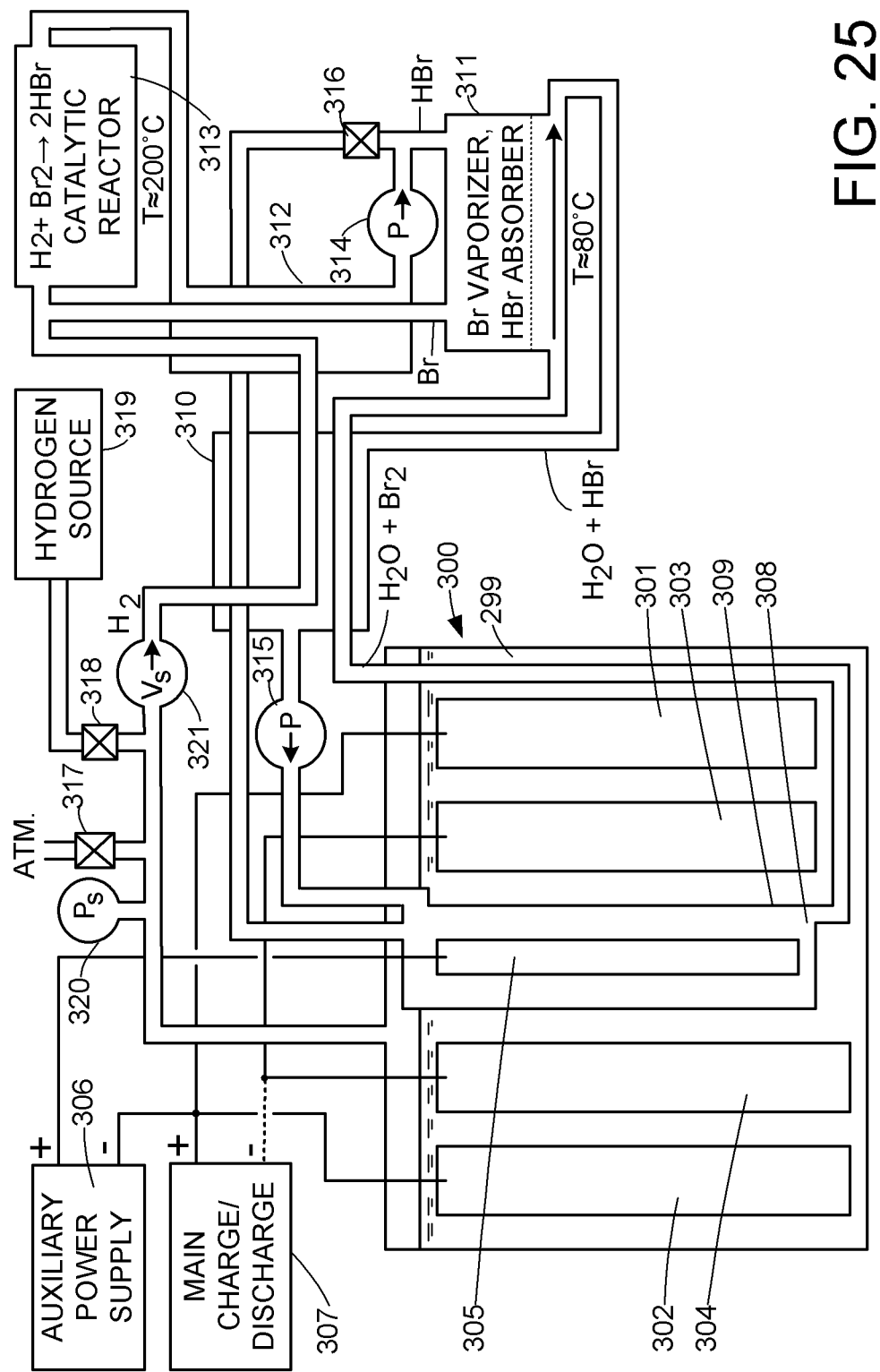
FIG. 25 is a schematic diagram of a zinc storage battery cell having an auxiliary electrode evolving bromine that is combined with hydrogen evolved at zinc negative electrodes during charging.

FIG. 25 shows a zinc storage battery cell 300 using an auxiliary electrode 305 evolving bromine during charging to compensate for hydrogen evolution at zinc negative electrodes 301, 304 during charging. The cell 300 includes positive electrodes 302, 303 having electro-conductive redox polymer active material. For example, the positive and negative electrodes are configured as described above with respect to FIG. 16 or FIG. 17. The cell 300 is filled with an electrolyte 299 that is an aqueous solution of zinc bromine. To lower the cost of the electrolyte, a majority of the electrolyte salt can be zinc chloride. For example, the solution is nearly saturated with zinc salt and has a ratio of about 1 mole of bromide to about 2 mole of chloride. The electrolyte may also include buffers and brighteners such as aluminum cations and borate anions.

During charging of the cell 300, a main charge/discharge circuit 307 supplies current to the negative electrodes 301, 302 and the positive electrodes 303, 304, and a certain fraction of this main current is supplied by the auxiliary power supply 306 to the auxiliary electrode 305 in proportion to the ratio of hydrogen to zinc reduction at the negative electrodes 301, 302. Bromine produced at the surface of the auxiliary electrode 305 is collected at the base 308 of the auxiliary electrode 305 within an ion-conductive or microporous tube 309 surrounding the auxiliary electrode. The bromine, dissolved in or together with acidic zinc-bromide aqueous electrolyte solution, flows through a low-temperature heat exchanger 310 to a bromine vaporizer and hydrogen-bromide absorber 311 maintained at a temperature of about eighty degrees Celsius. Bromine vapor from the vaporizer 311 passes through a high-temperature heat exchanger 312 to a catalytic reactor 313. The catalytic reactor 313 includes a catalyst for reacting hydrogen gas with bromine vapor to produce hydrogen bromide gas. For example, the catalyst is a platinum wire heated to a temperature of about two-hundred degrees Celsius.

A pump 314 circulates the hydrogen bromide gas through the high temperature heat exchanger 312 back to the bromine vaporizer and hydrogen bromide absorber 311. Most of the hydrogen bromide gas is absorbed in the zinc-bromide aqueous electrolyte in the absorber 311 to acidify the electrolyte, and a pump 315 circulates the acidified electrolyte from the absorber 311 through the low-temperature heat exchanger 310 back to the auxiliary positive electrode 305 in the cell 300. A throttle valve 316 also circulates a fraction of the gas from the catalytic reactor 313 back to the cell 300 so that there is not a build-up of any relatively inert gas components, such as carbon dioxide and nitrogen, in the catalytic reactor 313, and the hydrogen gas generated in the cell 300 is circulated through the catalytic reactor 312. On a periodic basis, or as needed to avoid a build-up of gas pressure in the cell 300, a purge valve 317 is temporarily opened to release gas from the cell 300 to the atmosphere, and a valve 318 is temporarily opened to restore the released gas with hydrogen from a hydrogen source 319. The hydrogen source 319, for example, is a pressurized tank of hydrogen gas, or an electrolytic cell electrolyzing an aqueous solution of purified common salt buffered to a pH of about 8 to produce hydrogen gas and sodium hypochlorite. For example, the aqueous solution includes about 95 percent sodium chloride and about five percent sodium bicarbonate.

FIG. 25 further shows a pressure sensor 320 for measuring gas pressure in the cell 300, and a flow sensor 321 for measuring the rate of flow of gas from the cell 300 to the catalytic reactor 313. For example, the gas pressure in the cell 300 is measured to check that the bromine generation rate at the auxiliary electrode 305 matches the hydrogen generation rate so that the pressure in the cell 300 does not continually increase due to the hydrogen generation rate and instead the pressure is limited by the production of hydrogen bromide in the catalytic reactor 313. The flow sensor 321 provides an independent measure of gas flow from the cell 300 to the catalytic reactor 313, in order to provide a way of diagnosing problems with operation of the catalytic reactor 313 or the circulation pump 314 and throttle valve 316. The pressure sensor 320, for example, is a Motorola Inc. part number MPX4250A integrated silicon pressure sensor. The flow sensor 311, for example, is a mass flow sensor having a heating element cooled by the flow of gas, and a silicon diode for sensing the reduction in temperature of the sensing element in proportion to the mass flow of the gas through the sensor.

Figure 26:
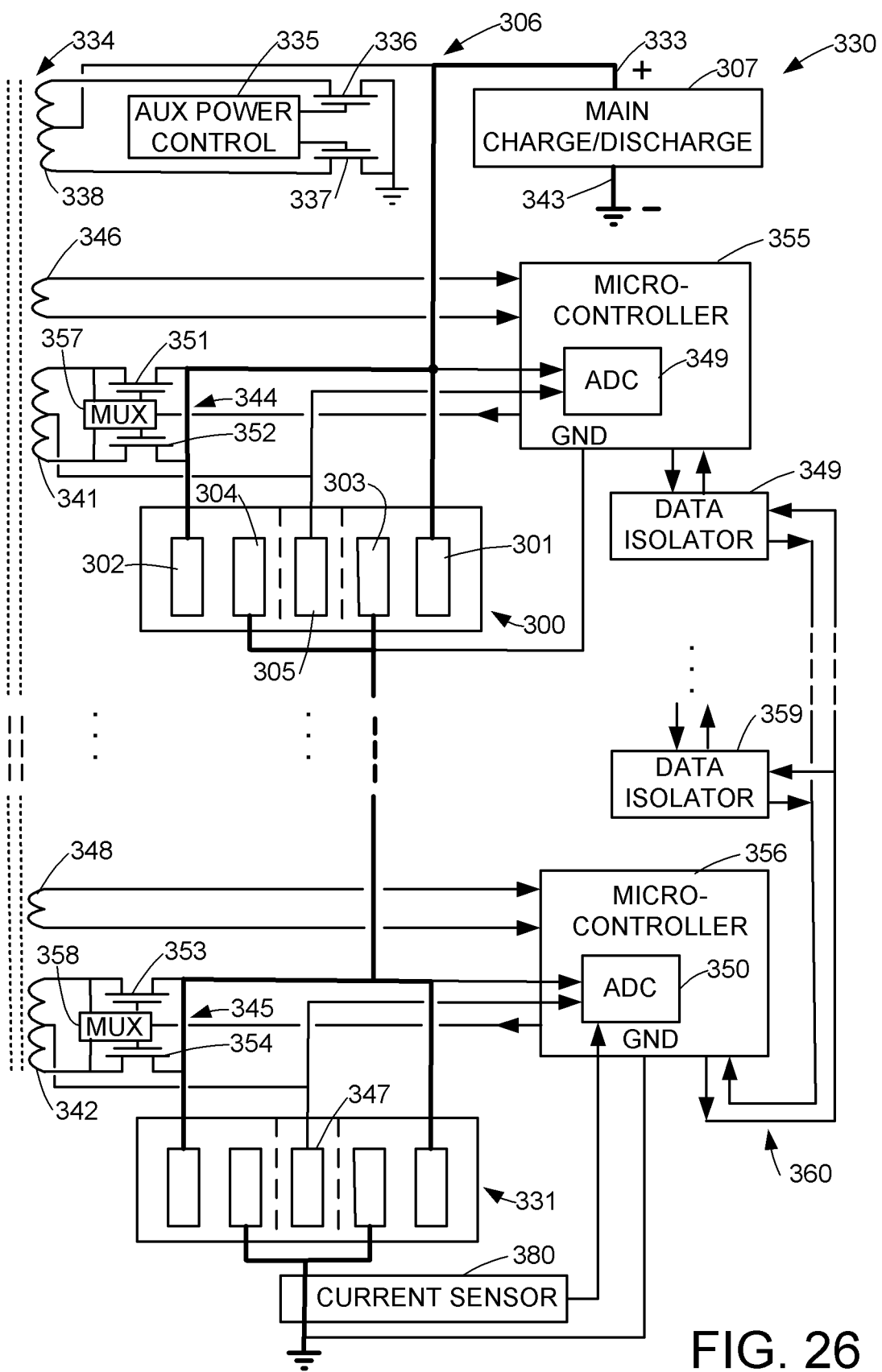
FIG. 26 is a schematic diagram of a storage battery bank including electrochemical cells connected in series.

FIG. 26 shows a zinc storage battery bank 330 including electrochemical cells 300, 331 connected in series to a common main charge/discharge unit 307 having a positive terminal 333 and a negative ground terminal 343. A current sensor 380 senses current charging the cells 301, 331 or discharged from the cells. The electrochemical cells 300, 331 are also connected via a transformer 334 to an auxiliary power control unit 335 controlling switching transistors 336, 337 feeding power to a primary winding 338 of the transformer 334. The transformer 334 has a separate respective secondary winding 341, 342 and active rectifier circuit 344, 345 for independently controlling current to each auxiliary electrode 305, 347 in each of the cells 300, 331. Each active rectifier circuit 344, 345 has a respective pair of switching transistors 351, 352, 353, 354, and a respective multiplexer 357, 358 for selectively enabling or disabling the transistors to rectify current from the respective secondary winding 341, 342.

The storage battery bank 300 further includes a respective microcontroller 355, 356 for controlling each of the cells 300, 331. Each microcontroller is 355, 356 is powered by a respective secondary winding 346, 348 on the transformer 334. Each microcontroller has a respective analog-to-digital converter (ADC) 349, 350 for measuring the voltages of the electrodes in the cell 300, 331 controlled by the microcontroller 355, 356. Each microcontroller, for example, is a part no. ATmega48/88/168/326 from Atmel Corporation of San Jose, Calif. The microcontrollers 355, 356 are connected by a bi-directional data link 360 for data communication among the microcontrollers. Data isolators 349, 359 permit data to be transmitted over the data link 360 between microcontrollers operating over different voltage ranges. The data isolators 349, 359, for example, include optical isolators or signal transformers.

Figure 27:
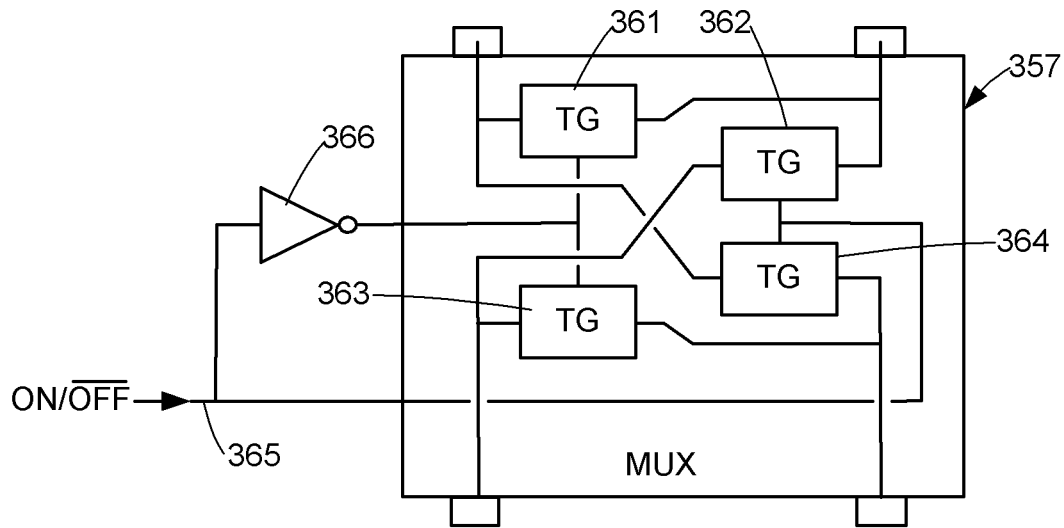
FIG. 27 is a schematic diagram of a multiplexer introduced in FIG. 26 for turning on or off current to an associated auxiliary electrode in the storage battery bank of FIG. 25.

FIG. 27 shows details of the multiplexer 357 introduced in FIG. 26. The multiplexer 357 includes four transmission gates 361, 362, 363, 364. The transmission gates 362 and 364 are enabled by a control signal on a control line 365 to enable their respective transistors (351 and 352) to rectify current. Otherwise an inverter 366 enables the transmission gates 361, 363 to disable their respective transistors (351 and 352 in FIG. 26). For example, the multiplexer 357 is constructed from a CMOS integrated circuit part no. CD4016.

Figure 28:
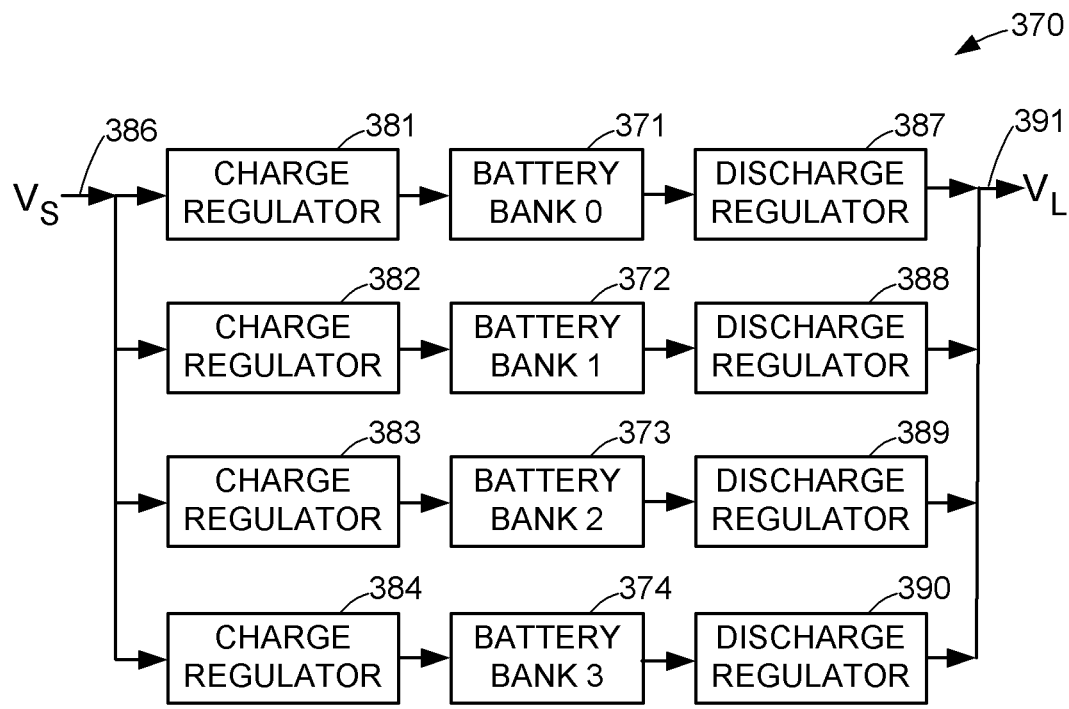
FIG. 28 is a schematic diagram of a storage battery system having four battery banks.

FIG. 28 shows a storage battery system 370 having four battery banks 371, 372, 373, 374. Each battery bank has a separate respective charge regulator 381, 382, 383, 384 delivering current to the battery bank from a common source line 386 at a source voltage ($V_S$). Each battery bank also has a separate respective discharge regulator 387, 388, 389, 390 delivering current from the battery bank to a common load line 391 at a load voltage ($V_L$). The charge regulators 381, 382, 383, 384 are capable of selectively charging their respective battery banks at a specified constant current despite variations in the source voltage ($V_S$) and variations in battery bank voltage within certain limits. The discharge regulators 381, 382, 383, 384 are capable of selectively discharging their respective battery banks 371, 372, 373, 374 to maintain a constant load voltage ($V_L$) despite variations in current drawn from the common load line 391 and variations in the battery bank voltage within certain limits.

Figure 29:
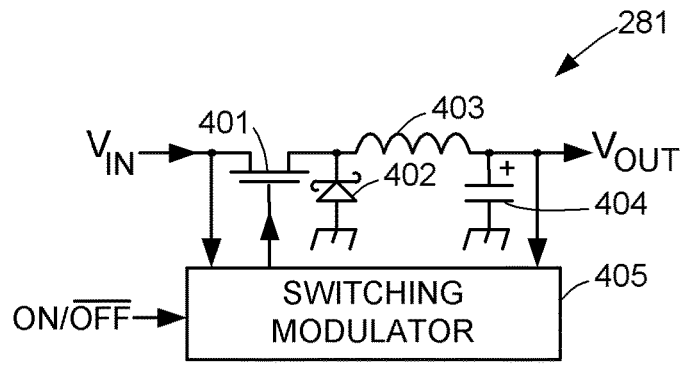
FIG. 29 is a schematic diagram of a charge or discharge regulator introduced in FIG. 28.

FIG. 29 shows a charge regulator 281 introduced in FIG. 27. In this example the output voltage (VOUT) is less that the input voltage (VIN), and the charge regulator is a step-down switching regulator having a switching transistor 401, a Schottky diode 402, an inductor 402, an output capacitor 404, and a switching modulator 405. The switching modulator 406 periodically turns the transistor 401 on and off and modulates the duty cycle of conduction of the transistor 401 to regulate the current delivered to the output capacitor 404. The duty cycle can be adjusted in response to the input voltage and the output voltage in order to deliver a specified current to the output capacitor 404 or to obtain a specified value for the output voltage. The switching modulator 405 may use an integrated circuit such as a part no. LM2575.

Figure 30:
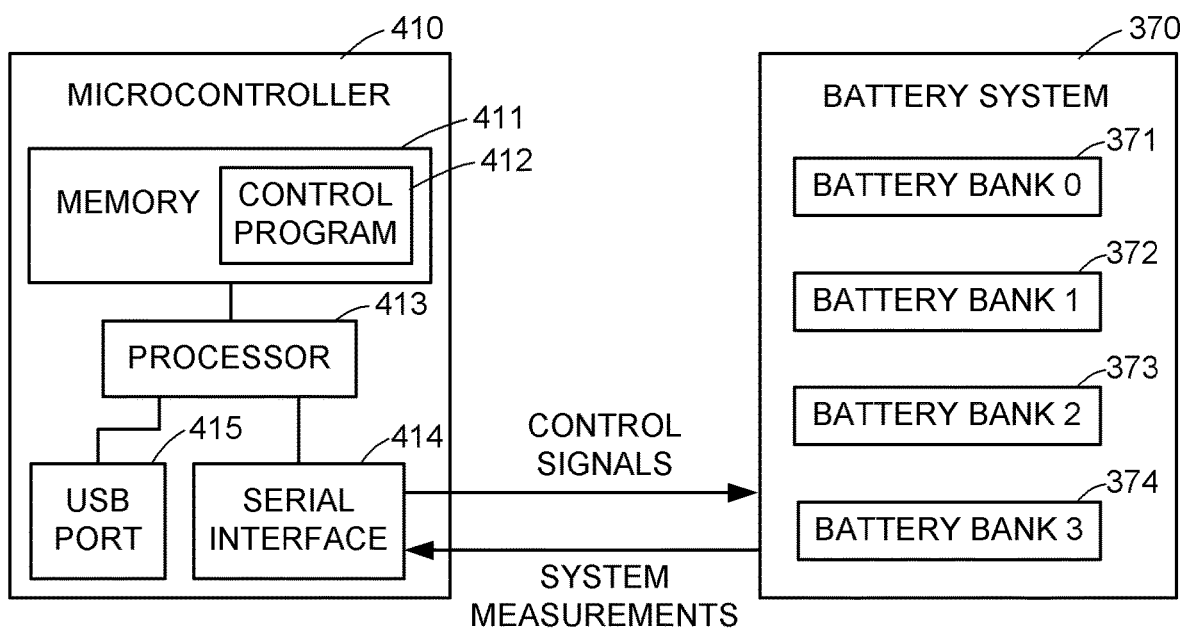
FIG. 30 is a block diagram of a microcontroller controlling the storage battery system of FIG. 28.

FIG. 30 shows a microcontroller 410 controlling the storage battery system 370 introduced in FIG. 28. The microcontroller 410 includes memory 411 containing a control program 412, a data processor 413 for executing the control program 412, a serial data interface 414 providing data transfer between the microcontroller 410 and microcontrollers (e.g. 355, 356 in FIG. 26) in the battery system 370, and a Universal Serial Bus (USB) port 415. The microcontroller 410, for example, is a part no. ATmega48/88/168/326 A from Atmel Corporation of San Jose, Calif.

The microcontroller 410 provides a number of control signals to each battery bank in the storage battery system 370. For example, these control signals include a signal to the main charge/discharge circuit (307 in FIG. 26) to enable or disable charging of the battery bank, a signal to the main charge/discharge circuit (307 in FIG. 26) to enable or disable discharging of the battery bank, a signal to enable or disable current to the auxiliary electrode in a specified cell, a signal to enable or disable the circulation pump (315 in FIG. 25) for a specified cell, a signal to enable or disable heating of the bromine vaporizer (311 in FIG. 25) for a specified cell, a signal to enable or disable heating of the catalytic reactor (313 in FIG. 25) for a specified cell, a signal to enable or disable heating of the mass flow sensor (321 in FIG. 25) for a specified cell, a signal for opening or closing the purge valve (317 in FIG. 25) for a specified cell, and a signal for activating or deactivating the hydrogen source valve (318 in FIG. 25) for a specified cell.

The microcontroller 410 receives a number of measurements from each of the battery banks. For example, these measurements include the current into or out of the bank, the voltages across the electrodes in a specified cell in the bank, the ambient temperature of each cell in the bank, the temperature of the bromine vaporizer for each cell in the bank, the temperature of the catalytic reactor for each cell in the bank, the gas pressure in each cell in the bank, and the flow rate of gas to the catalytic reactor for each cell for the bank.

Figure 31:
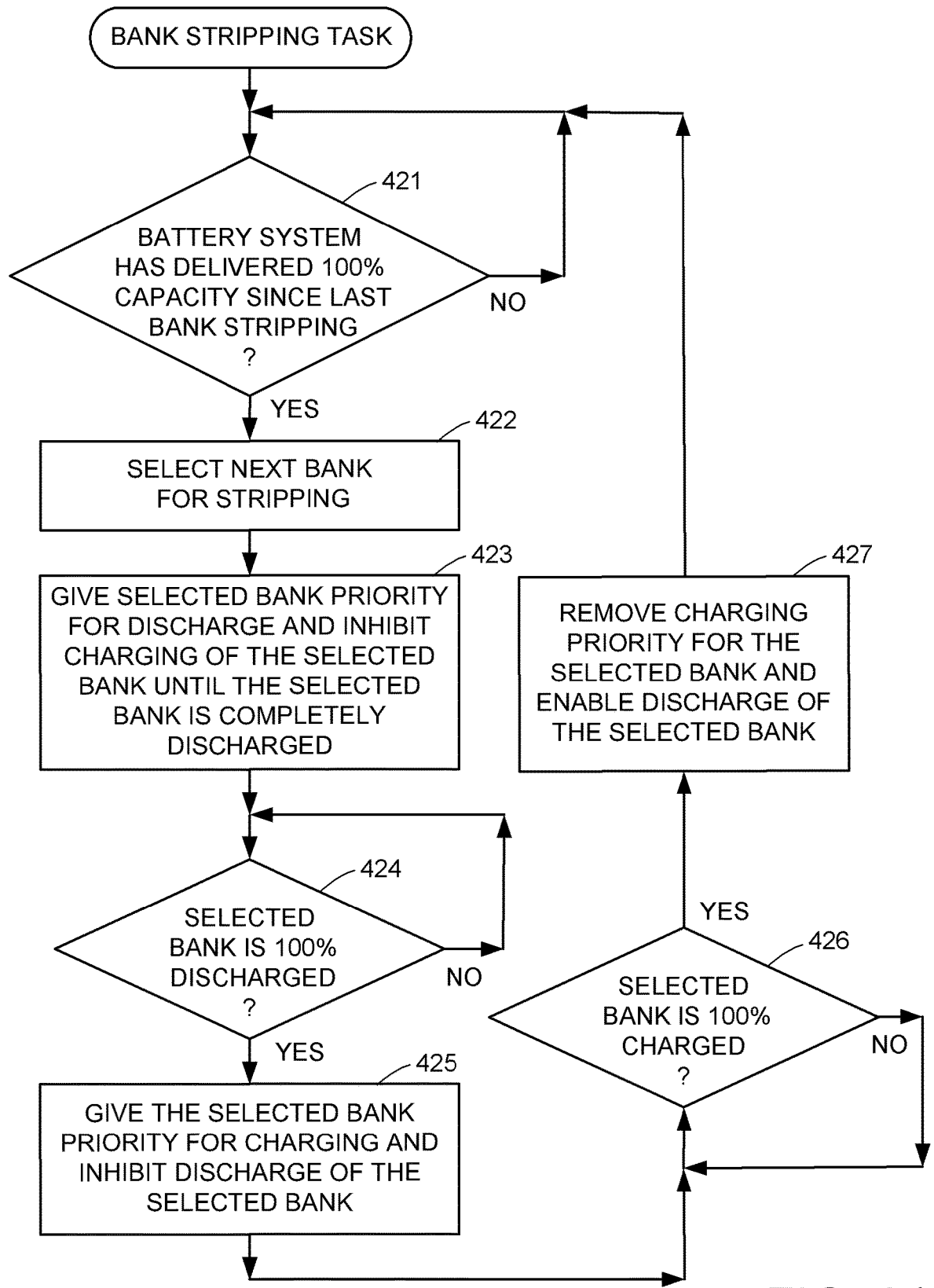
FIG. 31 is a flowchart of a bank stripping task performed by the microcontroller in FIG. 30.

FIG. 31 shows a bank stripping task executed by the microcontroller in FIG. 29. For example, a bank is stripped of zinc at the negative electrodes of the cells in the bank when the charged delivered from the bank since the last stripping is about four times the capacity of the bank. The charge delivered from the bank since the last stripping is the time integral of the current delivered from the bank. For example, the charge delivered from the bank since the last stripping is calculated as a running sum of periodic measurements of the discharge current delivered by the bank. (For example, for bank 0, the microcontroller 256 in FIG. 26 keeps a running sum of current measurements received from the current sensor 380 at 10 millisecond intervals.) In the example of FIG. 30, the storage battery system has four banks. Therefore, in a first box 421, execution continues to box 422 to begin a stripping cycle upon a selected bank when the battery system has delivered 100% of system capacity since the last time a stripping cycle was initiated.

In box 422, a next bank is selected for stripping. For example, the four banks are assigned respective bank identification numbers 0, 1, 2, and 3, and the next bank is selected in a round-robin fashion from a sequence 0, 1, 2, 3, 0, 1, 2, 3, 0, 1, 2, 3 etc. For example, in box 422, the bank stripping task has an integer variable that is incremented, moduo-4, to obtain the bank identification number of the next bank to select for stripping. In other words, the integer variable is incremented, and if the sum has a value greater or equal to four, then the integer variable is set equal to zero.

Next, in box 423, the selected bank is given priority for discharge, and charging of the selected bank is inhibited until the selected bank is completely discharged. For example, the bank stripping task maintains a state variable for each bank, and updates this state variable in box 423. The state variable for each bank has three values; namely, either a value zero indicating that the bank is not selected for stripping, or a value one indicating that the bank has been selected for stripping and has priority for discharge and charging is inhibited, or a value two indicating that the bank has been selected for stripping and the bank has priority for charging and discharging is inhibited. This state variable is read on a periodic basis by a background routine that selectively enables and disables the switching modulators (e.g., 405 in FIG. 29) in the charge regulators (381, 382, 383, 384 in FIG. 28) during charging and in the discharge regulators (387, 388, 389, 390 in FIG. 28) during discharging. For example, in step 423, the background routine inspects the current measurements from the banks, and if the battery system is delivering discharge current, then if the selected bank is not being discharged at 100% of its current delivery capacity and other banks are delivering discharge current, then the background routine shifts the current delivery to the selected bank from other banks by disabling the switching modulators of the charging regulators of the other banks.

Next, in box 424, execution continues to box 425 when the selected bank is 100% discharged, so that the negative electrodes in the bank have been stripped of zinc. For example, the selected bank is 100% discharged when its voltage is 0.8 volts times the number of cells connected in series in the bank. In box 425, the selected bank is given priority for charging, and discharging of the selected bank is inhibited, until the selected bank has been fully charged. For example, in box 425, the bank stripping task changes the value of the state variable for the selected task from the value one to the value two indicating that the bank has been selected for stripping and the bank has priority for charging and discharging is inhibited.

Next, in box 426, execution continues to box 427 when the selected bank becomes fully charged. For example, the bank becomes fully charged when its voltage reaches a certain voltage, such as 1.4 volts times the number of cells connected in series in the bank. In box 427, the charging priority for the selected bank is removed, and discharge of the selected bank is enabled. For example, the state variable for the selected bank is reset to a value of zero. Execution loops back from box 427 to box 421.

Figure 32:
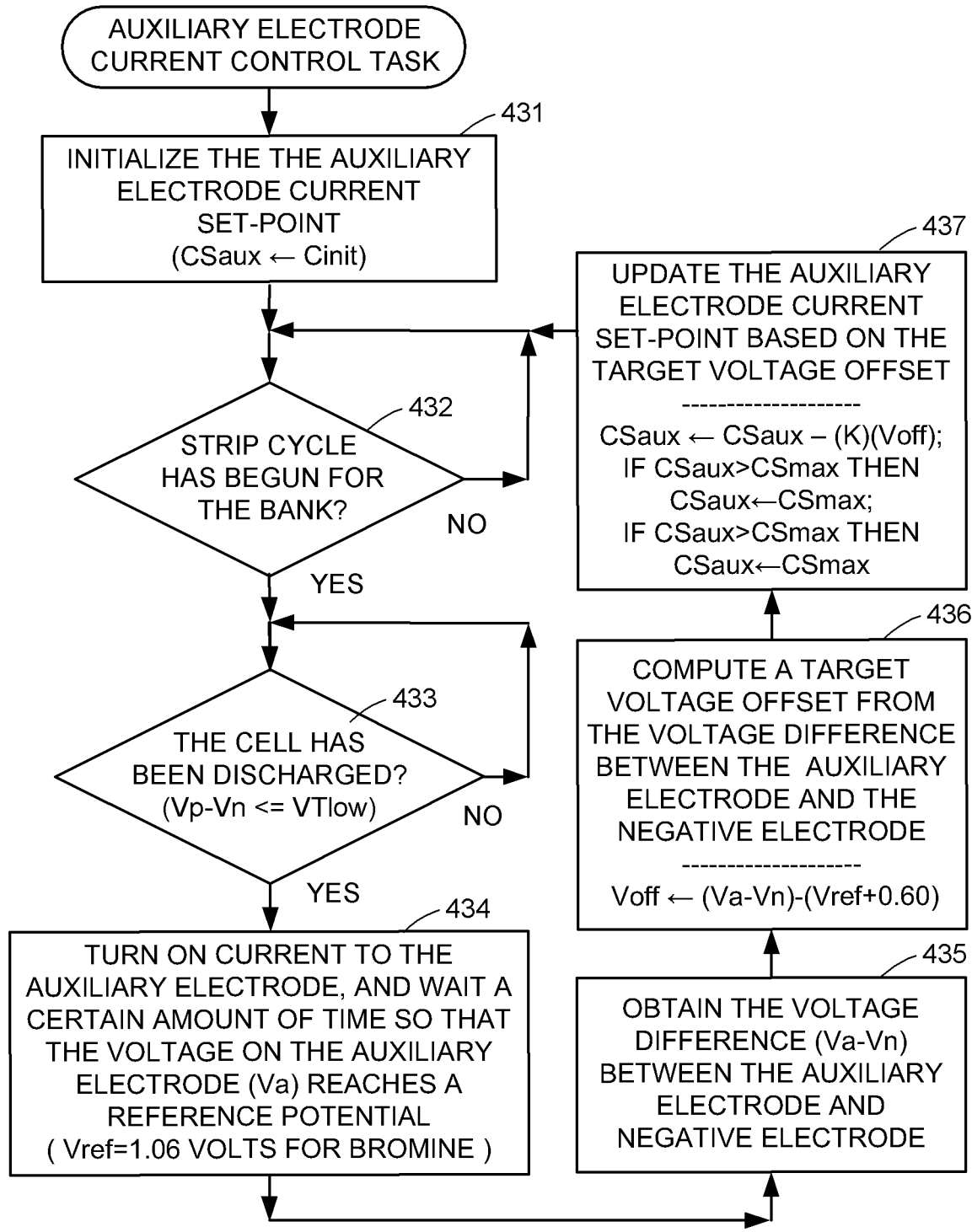
FIG. 32 is a is a flowchart of an auxiliary electrode current control task performed by the microcontroller in FIG. 30.

FIG. 32 shows an auxiliary electrode current control task. For example, an instance of this task is executed by each microcontroller controlling a cell in each bank in order to control current to the auxiliary electrode in the cell. In general, the auxiliary electrode current control task adjusts the current to the auxiliary electrode so that the percentage of stored charge capacity of the negative zinc electrode balances the percentage of stored charge capacity of the positive electro-conductive redox polymer electrode during the charge-discharge cycle. In theory, the percentage of stored charge capacity of either the positive electrode or the negative electrode at any phase in the charge-discharge cycle is a function of the electrochemical potential of the electrode, and therefore could be determined by measuring the voltage of the electrode with respect to a reference electrode. If the electrolyte includes a substantial fraction of bromide anions and the cell includes a bromine evolving auxiliary electrode, then the auxiliary electrode may function as a rather precise reference electrode having a standard reduction potential of about 1.06 volts.

In practice, the voltage of the electro-conductive positive electrode (relative to a reference electrode potential) is a good indication of the stored charge capacity at any phase of the charge-discharge cycle because, as the positive electrode is discharged, the voltage is a monotonically decreasing function of the remaining percentage of stored charge, and the slope of this function is substantial at any phase of the charge-discharge cycle. In contrast to the voltage of the positive electrode, the voltage of the negative zinc electrode (relative to a reference electrode potential) decreases rather slowly as a function of the remaining percentage of stored charge during discharge until areas of the surface of the negative electrode become free of zinc. When more than half of the surface area of the negative electrode has become free of zinc, the voltage of the zinc negative electrode decreases rapidly as a function of the remaining percentage of stored charge of the zinc negative electrode. Therefore, in practice, the balance between the percentage of stored charge capacity of the negative zinc electrode relative to the percentage of stored charge capacity of the positive electro-conductive redox polymer electrode during the charge-discharge cycle is most reliably indicated by the voltage of the negative electrode (relative to a reference electrode) during discharge when the negative electrode becomes partially stripped of zinc. For this reason, the auxiliary electrode current control task of FIG. 32 is based on the electrode voltages of a cell measured during the strip cycles for the storage battery bank including the cell.

In a first step 431, a current set-point (CSaux) for an auxiliary electrode is set to a certain initial value (CSinit) estimated to be the rate at which hydrogen is generated at the negative electrode during charging. For example, the current set-point is ten percent of the charging current to the cell. Next, in step 432, the auxiliary electrode control task waits for a strip cycle to begin upon the storage battery bank including the cell. Then, in step 433, the auxiliary electrode current control task waits for the cell to be discharged such that the voltage measured between the positive and negative electrodes (Vp−Vn) drops to a certain low threshold value (VTlow). This low threshold value is selected so that it is normally reached for every cell in a storage battery bank during each strip cycle for the bank. For example, if there are "N" cells in series in a bank, and the strip cycle discharge ends at a voltage of Vbank, the low threshold value is set to 110% of Vbank/N. The value of Vbank/N, for example, is 0.8 volts. The microcontroller for the cell (e.g., 355 in FIG. 26 for the cell 300 in FIG. 26) operates its analog-to-digital converter (e.g., 349 in FIG. 26) to read the voltage between the positive and negative electrodes of the cell. This analog-to-digital converter has its ground input (GND) connected directly to the negative electrodes (e.g., 303, 304 in FIG. 26) of the cell, and therefore this analog-to-digital converter converts an analog value of the voltage difference (Vp-Vn) to a corresponding digital value.

Next, in step 434, the current to the auxiliary electrode is turned on, and the auxiliary electrode current control task waits a certain amount of time so that the voltage on the auxiliary electrode reaches a reference potential. For example, the control task waits ten seconds, so that an auxiliary electrode evolving bromine from bromide in the electrolyte reaches a standard reduction reference potential (Vref) of about 1.06 volts. Then, in step 435, the auxiliary electrode current control task obtains the voltage difference (Va−Vn). For example, the microcontroller for the cell (e.g., 355 in FIG. 26) operates its analog-to digital converter (e.g., 359 in FIG. 26) to read the voltage (Va−Vn) of the auxiliary electrode in the cell. This analog-to-digital converter has its ground input (GND) connected directly to the negative electrodes (e.g., 303, 304 in FIG. 26) of the cell, and therefore this analog-to-digital converter converts an analog value of the voltage difference (Va−Vn) to a corresponding digital value.

Next, in step 436, the auxiliary electrode control task computes a target voltage offset from the voltage difference between the auxiliary electrode and the negative electrode. For example, the target voltage is −0.60 volts verses a standard hydrogen electrode (SHE), and it represents a desired condition of the negative electrodes in the cell becoming stripped of zinc when the cell has just been discharged to a voltage of VT low. The target voltage of −0.60 volts is substantially greater than the standard reduction potential of −0.763 for zinc, so that the target voltage of −0.60 volts provides a reliable indication of the negative electrodes in the cell being stripped of zinc.

The target voltage offset indicates a difference in volts that the negative electrode voltage is from the desired target voltage, and this target voltage difference is also proportional (by a factor of K) to the amount that the auxiliary electrode current set-point should be changed to achieve the desired target voltage. Such a value of the proportionality factor (K) can be estimated from the experimental discharge characteristic of the negative electrodes of the cell in terms of charge vs. voltage over the sloping tail from −0.763 volts to −0.60 volts. For example, the sloping tail is about six percent of the entire discharge characteristic, so that the value of the proportionality factor (K) is estimated as (Cinit)(0.06)/(0.163 volts)=0.37 Cinit per volt, and normally in step 436, the percentage change in the auxiliary electrode current set-point (CSaux) is about 37 percent per volt times the target voltage offset (Voff).

Finally, in step 437, the auxiliary electrode current set-point is updated based on the target voltage offset. For example, the target offset is changed by subtracting an amount of current that is the product of the proportionality factor (K) and the target voltage offset (Voff). In addition, the result is limited to a certain range (between CSmax and CSmin) expected during normal operation. In addition, an operator can be notified if the result is found to have fallen outside the range, in order to check for electrical disconnections and faulty components. Execution loop back from box 437 to step 432 to continue the auxiliary current control task in the next strip cycle for the storage battery bank.

Figure 49:
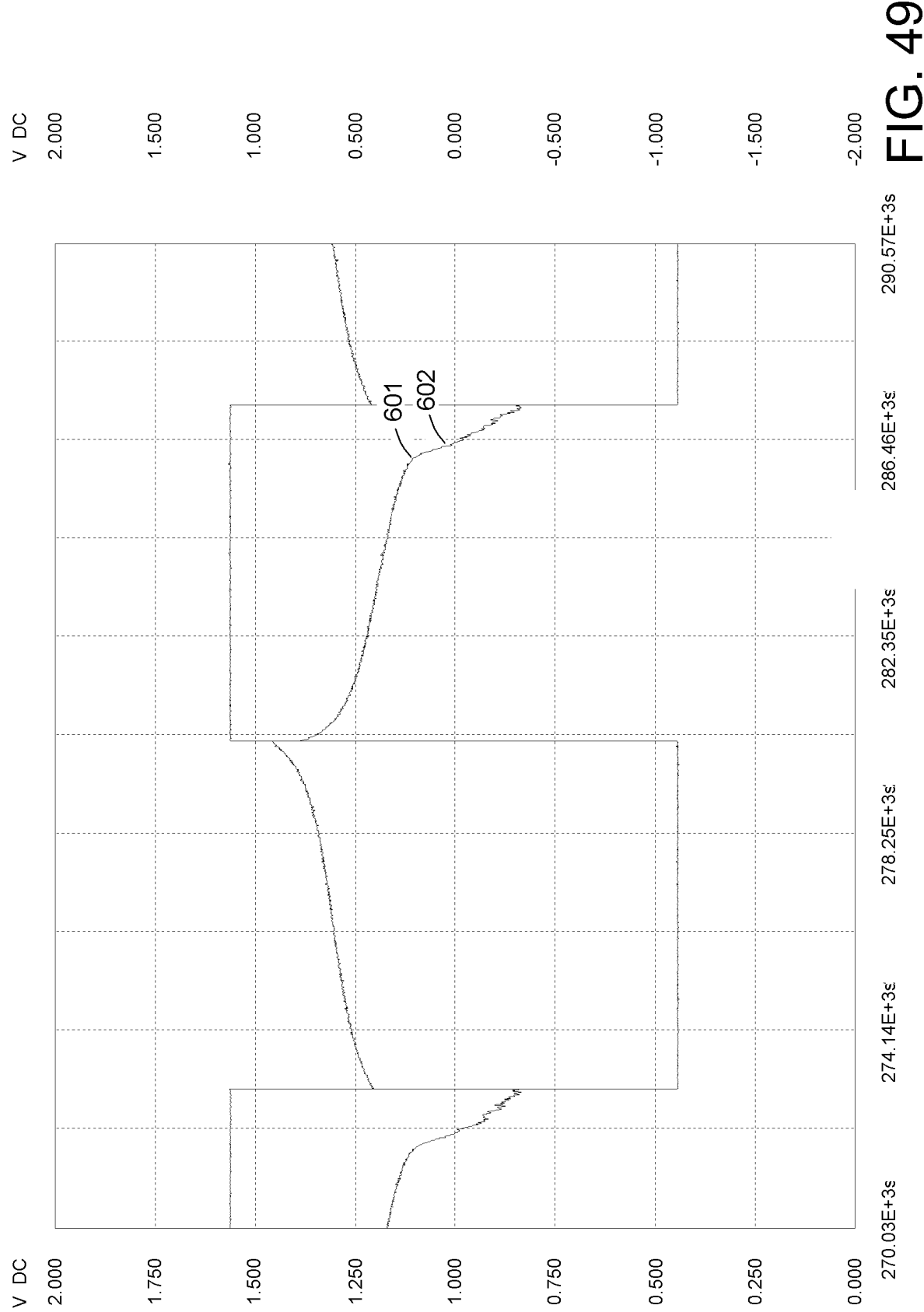
FIG. 49 is an expanded view of the last full charge-discharge cycle in FIG. 48.

It is possible to modify the control task in FIG. 32 in order to control the current to the auxiliary electrode without performing steps 424 and 435, which use the auxiliary electrode as a reference electrode for computing the target voltage offset in step 435. This can be done by recording the discharge characteristic of the cell, in terms of the difference in voltage (Vp−Vn) between the positive and negative electrodes as a function of the charge discharged from the cell, and using a curve fitting technique to identify the presence of a steeply sloping tail indicative of zinc becoming stripped off of the negative electrodes at the end of the discharge, and to determine the height (i.e., voltage difference DV) of this tail. (For example, FIG. 49 shows such a tail 602.) If no such tail is found, then DV is set to zero. The beginning of this steeply sloping tail (e.g., 601 in FIG. 49) occurs when the negative electrode potential (Vn) is at about the standard reduction potential of −0.763 volts for zinc. Therefore the target voltage offset (Voff) is calculated as Voff=DV−(0.763−0.60)=DV−0.163.

Figure 33:
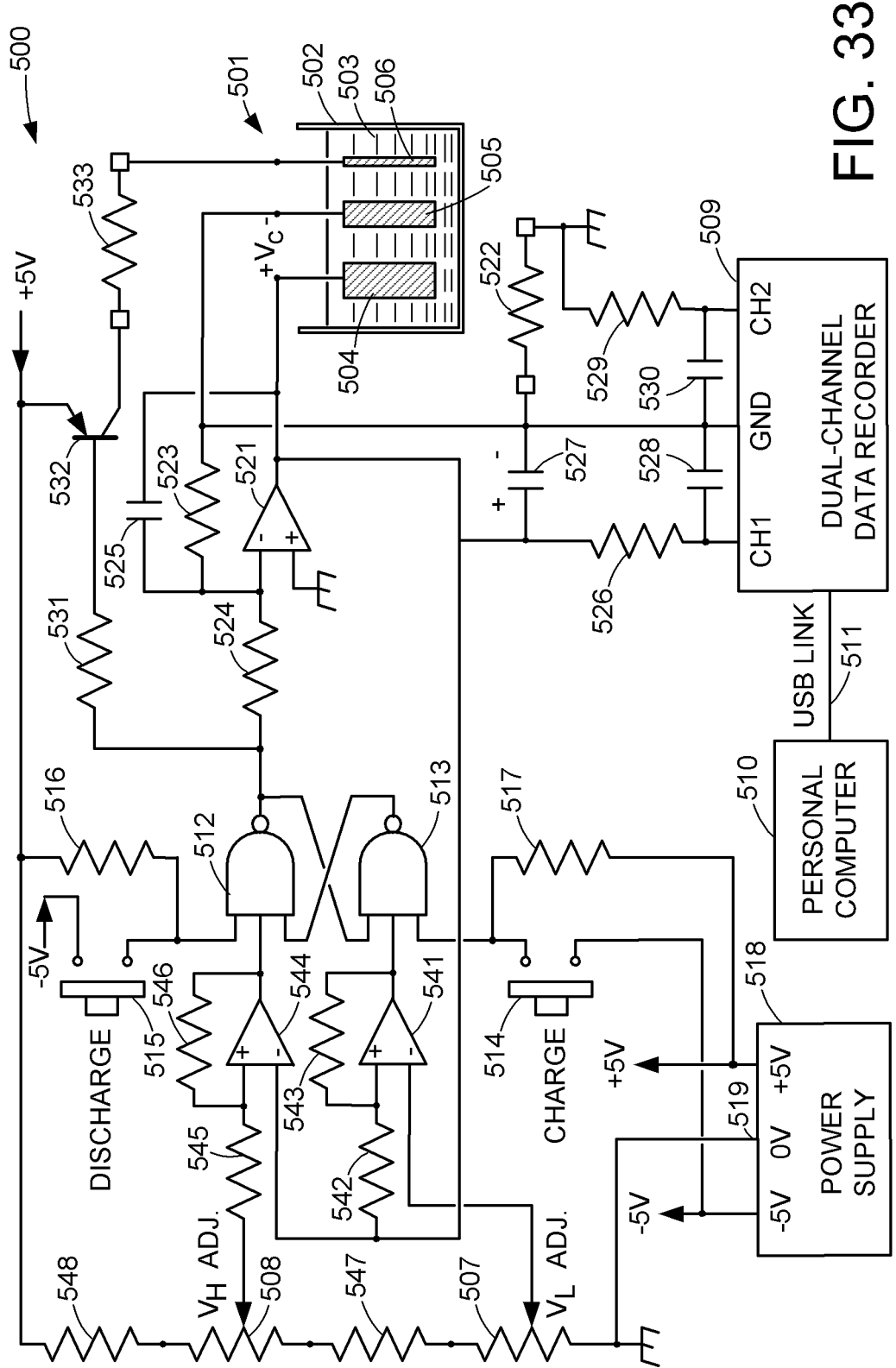
FIG. 33 is a schematic diagram of a system for testing an electrochemical cell.

FIG. 33 shows a storage battery testing system 500 for periodically charging and discharging an electrochemical cell 501. The electrochemical cell 501 has a cell container 502 containing electrolyte 503, a positive electrode 504, a negative electrode 505, and an auxiliary electrode 506. The system 500 keeps the cell voltage ($V_C$) between the positive electrode 504 and the negative electrode 505 within a range extending from a lower threshold voltage ($V_L$) to an upper threshold voltage ($V_H$). A potentiometer 507 (10 K ohm) sets the lower threshold voltage ($V_L$), and another potentiometer 508 sets the upper threshold voltage ($V_H$). The system 500 charges the electrochemical cell 501 with a constant current until the cell voltage ($V_C$) rises to the upper threshold voltage ($V_H$), and then system discharges the electrochemical cell with the same constant current until the cell voltage drops to the lower threshold voltage ($V_L$).

A dual-channel data recorder 509 periodically records the cell voltage (Vc) from a first input channel (CH1) and the corresponding cell current from a second input channel (CH2). A personal computer 510 receives the recorded data over a Universal Serial Bus (USB) link 511 from the data recorder 509. The personal computer 510 displays the recorded data as a graph and stores the recorded data in a file. For example, the data recorder 509 is a DI-770 with WINDAQ® Scope-100 version 2.55 programming from DATAQ Instruments, Inc. of Akron, Ohio, and the personal computer 504 is a Dell Latitude™ D600 computer programmed with a WINDOWS® XP operating system and sold by Dell Inc. of Austin, Tex.

At any given time, the battery testing system 500 is either in a charging state or a discharging state, as determined by a set-reset flip-flop comprised of cross-coupled NAND gates 506, 507. An operator may close a push-button switch 514 to set the state to charging, or the operator may close another push-button switch 515 to set the state to discharging. The push-button switches operate in connection with respective pull-up resistors 516 and 517 (22 K ohms). The NAND gates 512, 513 are Complementary Metal Oxide Semiconductor (CMOS) circuits (part no. CD4023A) powered with ten volts from a regulated power supply 518 providing plus and minus five volts with respect to a zero volt output 519. The zero volt output 519 is independent of the ground input (GND) of data recorder 500.

An operational amplifier 521 (part no. LM324) compares the voltage across a current sensing resistor 522 to a constant voltage of about 1.1 volts to provide the constant current charge or discharge to the cell 503. The constant voltage of about 1.1 volts is set by a resistor 523 (22 K ohms) and a resistor 524 (100 K ohm). Power to the operational amplifier 521 is provided by the plus and minus five volt outputs of the regulated power supply 518. The operational amplifier 521 operates in a negative feedback mode so that the voltage across its positive and negative input terminals is approximately zero. A negative feedback capacitor 525 (0.015 microfarads) ensures stability.

The first input channel (CH1) of the data recorder 509 is electrically connected to the positive electrode 504 through a low-pass filter including a series resistor 526 (4.7 K ohms) and shunt capacitors 527 (470 microfarads) and 528 (10 microfarads). The second input channel (CH2) of the data recorder is electrically connected to the current sensing resistor 522 through a low-pass filter including a series resistor 529 (4.7 K ohms) and a shunt capacitor 520 (10 microfarads). Because the cell 501 is charged and discharged at constant current, the second input channel (CH2) records a square waveform as a function of time.

When the cell 601 is being charged, the output of the NAND gate 513 is at approximately minus five volts, and current flows through a resistor 531 to the base of a PNP transistor 532 (part no. 2N3906) and turns on the transistor.

Then current flows from the plus five volt supply through the transistor 532 and through a resistor 533 to the auxiliary electrode 506.

A second operational amplifier 541 (part no. LM324) functions as a Schmitt trigger to terminate discharge of the cell 301 when the cell voltage drops to the low threshold voltage ($V_L$). The output of the operational amplifier 541 is connected directly to an input of the NAND gate 513. The negative input of the operational amplifier 541 is connected directly to the center tap of the potentiometer 507. The bottom terminal of the potentiometer 507 is connected directly to zero voltage output of the power supply 518. The positive input of the operational amplifier 541 is connected though a resistor 542 (22 K ohms) to the positive electrode 504 of the cell 501. A positive feedback resistor 543 (470 K ohms) is connected between the output of the operational amplifier 541 and the positive input of the operational amplifier 541.

A third operational amplifier 544 (part no. LM324) functions as a Schmitt trigger to terminate charging of the cell 301 when the cell voltage reaches an upper threshold voltage ($V_H$). The output of the operational amplifier 544 is connected directly to an input of the NAND gate 512. The negative input of the operational amplifier 544 is connected directly to the positive electrode 504 of the cell 501. The positive input of the operational amplifier 544 is connected though a resistor 545 (22 K ohms) to the center tap of the potentiometer 508. The bottom terminal of the potentiometer 508 is connected through a resistor 547 (10 K ohms) to a top terminal of the potentiometer 507, and the top terminal of the potentiometer 508 is connected through a resistor 548 (10 K ohms) to the plus five volt supply from the power supply 518. A positive feedback resistor 546 (470 K ohms) is connected between the output of the operational amplifier 544 and the positive input of the operational amplifier 544.

WORKING EXAMPLES

Example I. Poly-2-chloro-4-aminophenol

Para-aminophenol was produced from three grams of acetaminophen. Six 500-mg tablets of acetaminophen (pain reliever from Walgreens of Houston, Tex.) were crushed and ground to a powder in a mortar with a pestle. 17 milliliters of sulfuric acid (PRO LIQUID brand drain cleaner from Scotch Corporation of Dallas, Tex.) were added to and mixed with 100 milliliters of distilled water (from Randals supermarket in Houston, Tex.) in a MR. COFFEE™ brand 4-cup carafe, and then the acetaminophen powder was added to and dissolved in the sulfuric acid solution. The carafe was placed on an AROMA® brand electric adjustable single cooking plate (from Wallmart in Houston, Tex.) and the carafe was covered with a one liter Florence flask filled with 250 milliliters of tap water. The cooking plate was adjusted to high heat, and when boiling of the solution in the carafe began, the cooking plate was adjusted to low heat. The cooking plate was later readjusted to keep the solution boiling for two hours. Then the cooking plate was shut off to cool down for forty-five minutes. Then the solution was filtered through coffee filter paper (SIGNATURE brand basket style coffee filter from a Randals supermarket in Houston, Tex.). The filtered solution was then neutralized to a pH of about seven by slowly adding and stirring in sodium hydroxide (100% Lye Drain Cleaner from Rooto Corp, Howell, Mich., purchased from ACE Hardware in Houston, Tex.), resulting in a precipitate. The filtered solution and precipitate was then placed in a refrigerator and cooled for about four hours to about five degrees Celsius. Then the solution and precipitate was filtered using coffee filter paper to separate the precipitate. The precipitate was washed in the filter paper with one hundred milliliters of cold distilled water from the refrigerator, resulting in a damp presumptive para-aminophenol product.

2-chloro-4-aminophenol was then produced by chlorination of the washed precipitate in an aqueous solution of hydrochloric acid. Twenty milliliters of hydrochloric acid (20 Baume hydrochloric swimming-pool acid from Sunbelt Chemicals of Palm Coast, Fla.) were added to and mixed with fifty milliliters of distilled water, and then the washed precipitate was added to and dissolved in the hydrochloric acid solution. Then thirty-nine milliliters of 8.25% sodium hypochlorite solution (CHLOROX® brand Regular-Bleach from Randals supermarket in Houston, Tex.) were added drop-wise and stirred into the hydrochloric acid solution out-of-doors, resulting in the evolution of chlorine gas and the formation of a floating orange-yellow froth. The mixture was left alone for one hour, and then stirred and mixed. The mixture was left alone for about fifteen minutes, and then the froth was skimmed off the top of the solution and placed on filter paper. The filter paper carrying the froth was placed on a paper towel to soak up solution from the filter paper. After about four hours, the still damp froth was scraped off the filter paper, and placed in a mortar. An equal volume of ball milled coconut shell activated carbon was added to the mortar, and mixed with the damp froth in the mortar, and then the mixture was manually ground in the mortar with a pestle, resulting in presumptive 2-chloro-4-aminophenol positive electrode-active material. The coconut shell activated carbon was extracted from a Pentek CC-10 Coconut Carbon water filter from Waterfilters.net of Plymouth, Minn.

A filter paper tube, having an internal size of about 3.2 mm internal diameter by 20 millimeters in length, was packed with the positive electrode-active material, and a 0.9 mm automatic pencil lead (PENTEL HI-POLYMER HB 0.9 mm) was inserted into the positive electrode-active material to form a positive electrode as shown in FIG. 11, and placed into an electrolytic cell as shown in FIG. 13 together with a zinc negative electrode (using so-called "laboratory grade" zinc from ScienceStuff.com of Austin, Tex.) as shown in FIG. 12. The electrolyte was about seven milliliters of a zinc chloride solution made by adding some of the 20 Baume hydrochloric swimming pool acid to an excess amount of the "laboratory grade" zinc. The electrolytic cell, without any auxiliary electrode, was connected to the storage battery testing circuit of FIG. 33 with a 2.2 K ohm current sensing resistor (522 in FIG. 33), producing the test results shown in FIGS. 34 and 35. The short circuit discharge current of the cell was about forty milliamperes.

Figure 34:
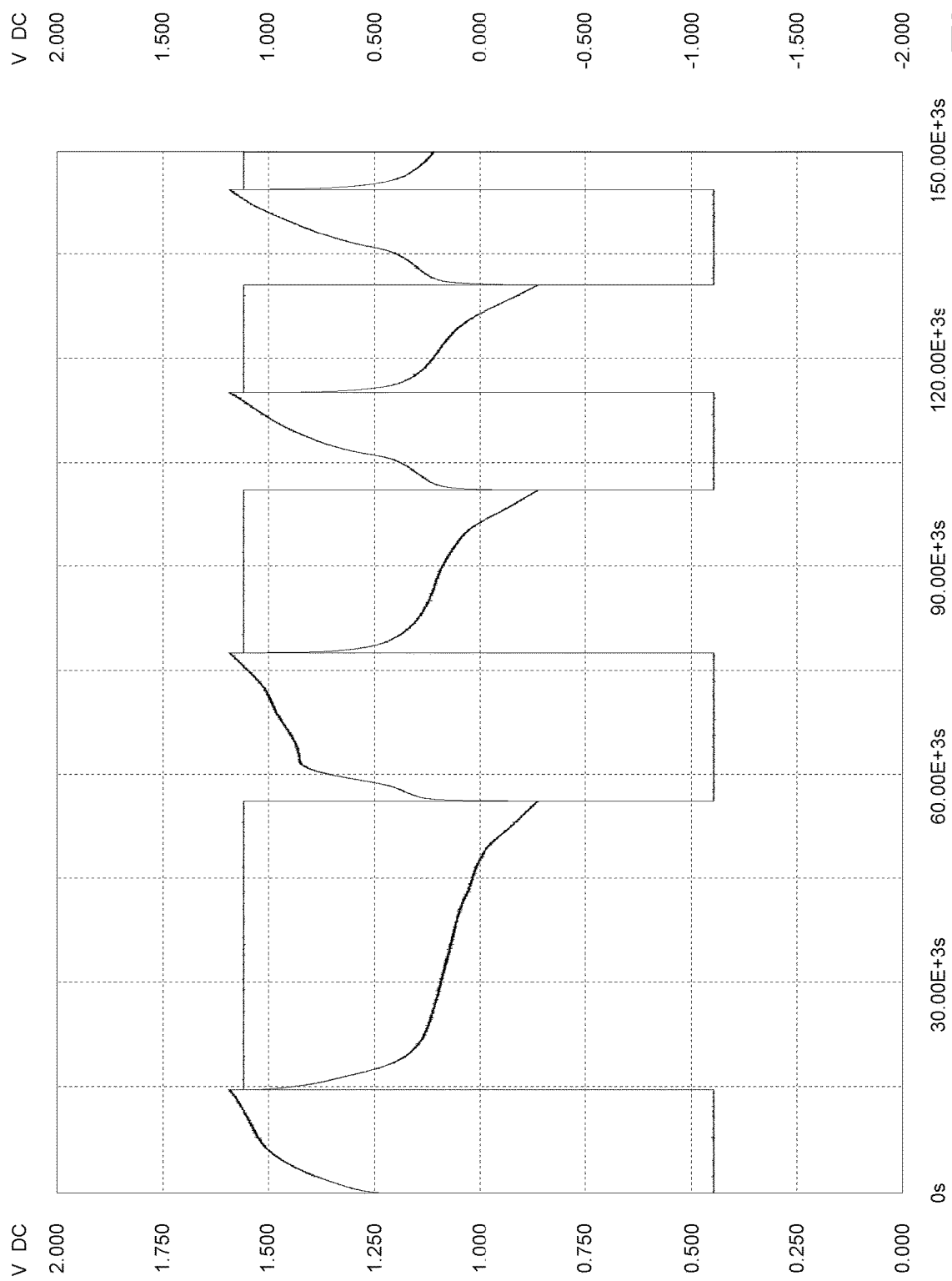
FIG. 34 is a first graph of cell voltage and cell current as a function of time during start-up of a cell having a zinc negative electrode and a positive electrode including electrode-active material made from chlorinated para-aminophenol.
Figure 35:
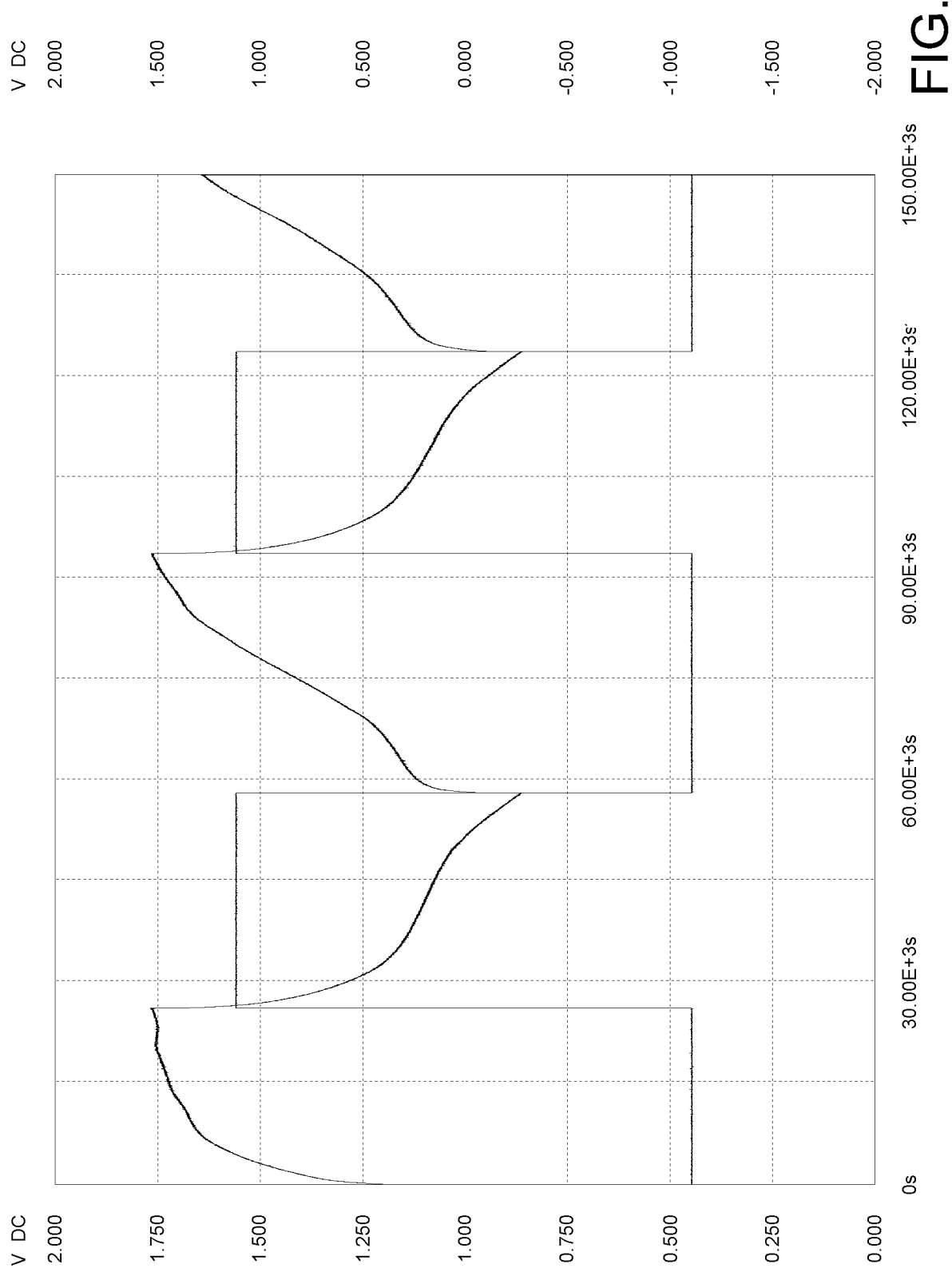
FIG. 35 is a second graph of cell voltage and cell current as a function of time during continued charging and discharging begun in FIG. 34 for the cell having a zinc negative electrode and a positive electrode including electrode-active material made from chlorinated para-aminophenol.

In FIGS. 33-35, and in the following figures, the cell voltage is a triangular or saw-tooth wave graph of voltage as a function of time (recorded from the CH1 input of the data recorder 509 in FIG. 33). The voltage scale for the cell voltage is the left-hand scale ranging from zero volts to two volts. The time scale is the bottom scale, in which an exponential notation "E+3s" indicates thousands of seconds. The cell current is indicated by a square wave graph of voltage as a function of time (recorded from the CH2 input of the data recorder 509 in FIG. 33). The voltage scale for the cell current is the right-hand scale ranging from minus two volts to plus two volts. The cell current is related to the right-hand voltage scale by a resistance that is the parallel combination of the resistance of the current sensing resistor (522 in FIG. 33) and the resistance of the feedback resistor (523 of in FIG. 33, of 22 K ohms). For the 2.2 K ohm current sensing resistor, this combination resistance is 2.0 K ohms. In addition, the input resistance of each of the CH1 and CH2 inputs of the dual-channel data recorder (509 in FIG. 33) is one megohm, so that low-pass filter resistors (525 and 529 in FIG. 33, of 4.7 K ohm each) cause the indicated voltages at the CH1 and CH2 inputs to be reduced by about one-half of a percent from the actual cell voltage (Vc) and the actual voltage across the current sensing resistor (522 in FIG. 33). For a 2.2 K ohm current sensing resistor, the cell current was about plus or minus five hundred and fifty microamperes. The outer area of the positive electrode was about 2.0 square centimeters, so that the current density was about 275 microamperes per square centimeter.

Figure 36:
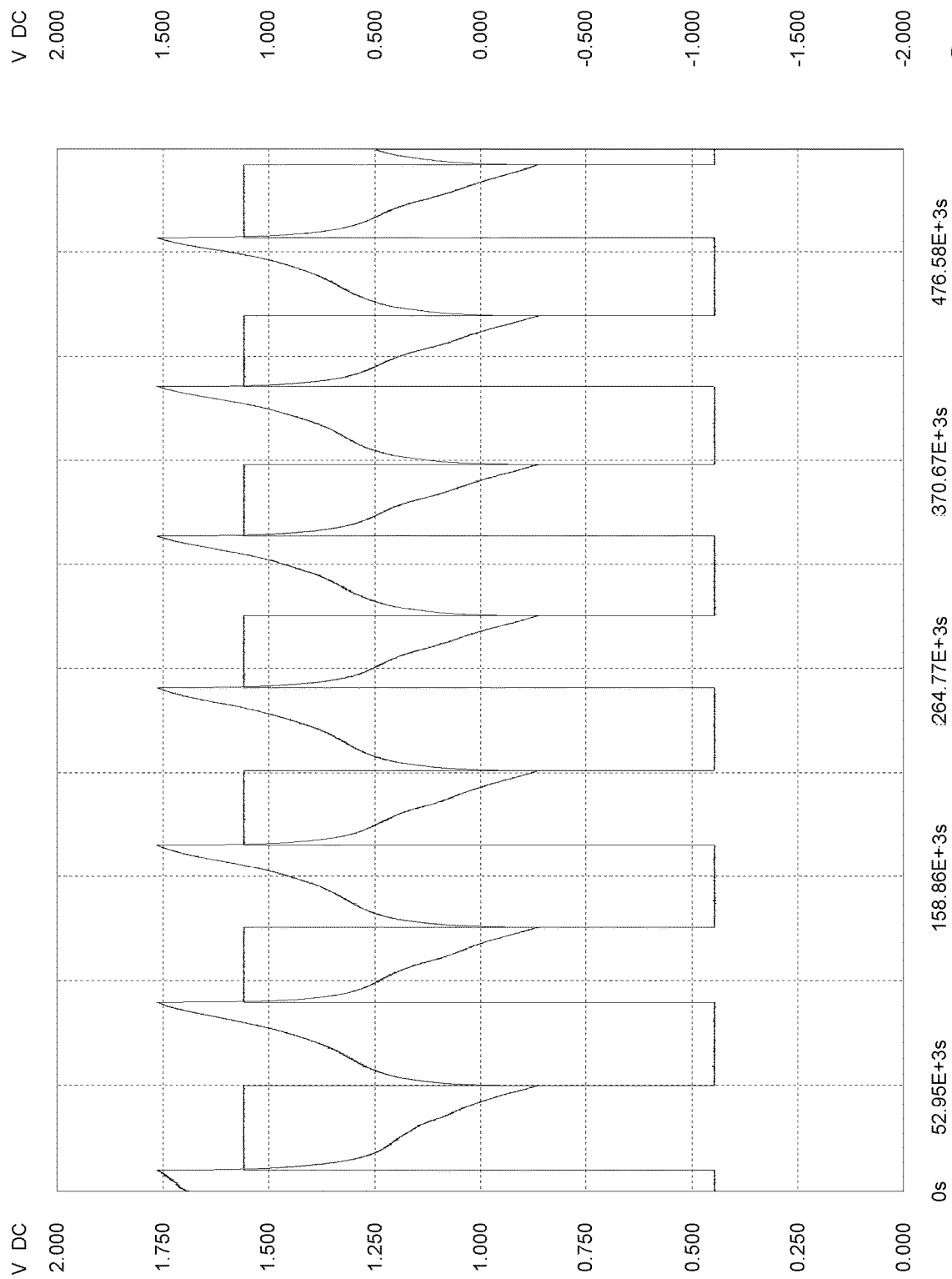
FIG. 36 is a third graph of cell voltage and cell current as a function of time during continued charging and discharging begun in FIG. 34 for the cell having a zinc negative electrode and a positive electrode including electrode-active material made from chlorinated para-aminophenol.
Figure 37:
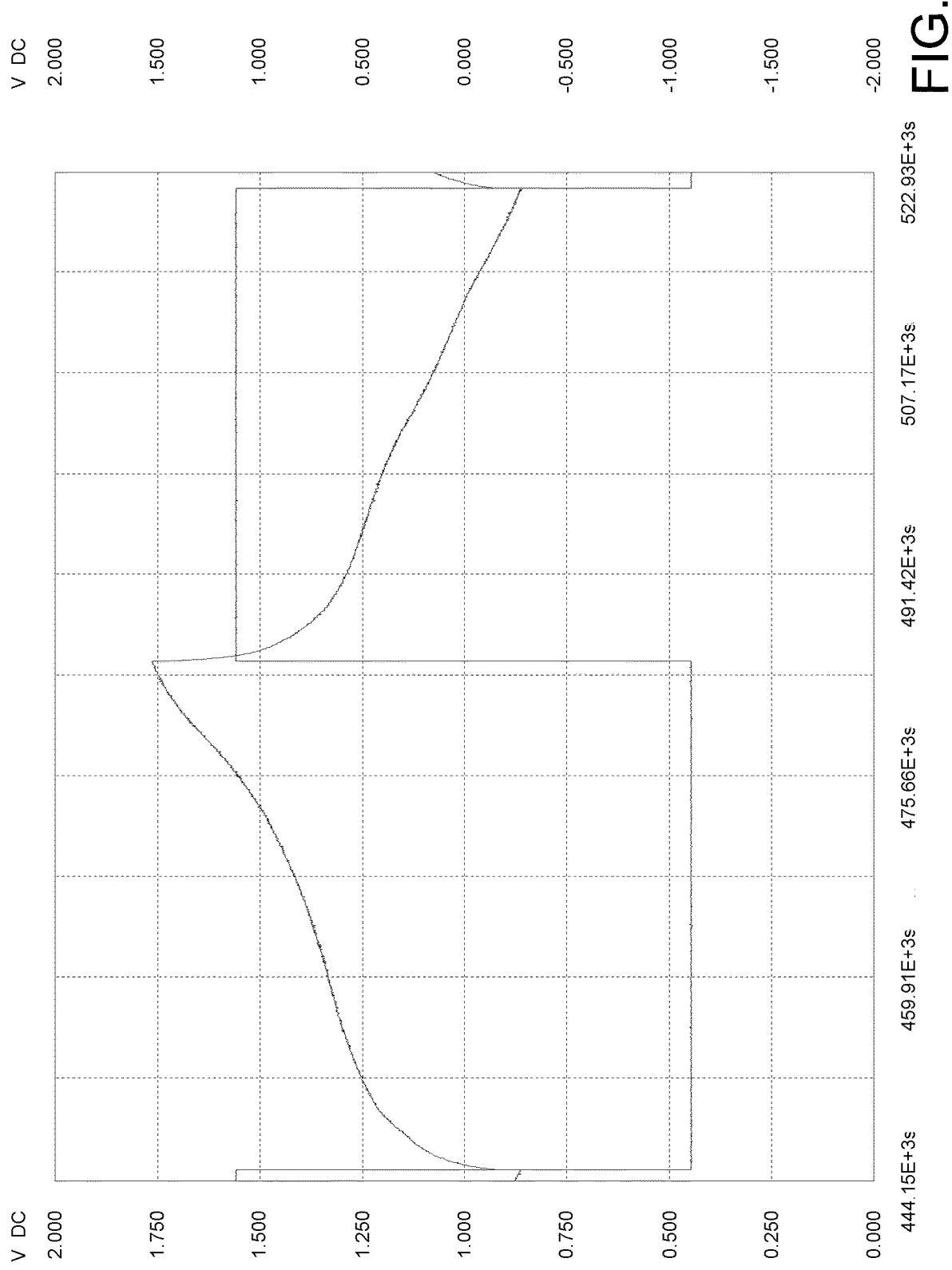
FIG. 37 is an expanded view of the last full charge-discharge cycle in FIG. 36.

After the charging and discharging in FIGS. 33-35, an aluminum chloride solution was added to the electrolyte (about one part by volume of aluminum chloride solution to three parts of the zinc chloride solution) and then the testing was continued, producing the test results show in FIGS. 36 and 37. The aluminum chloride solution was made by adding some of the 20 Baume hydrochloric acid to an excess of clippings of aluminum electrical wire.

Figure 38:
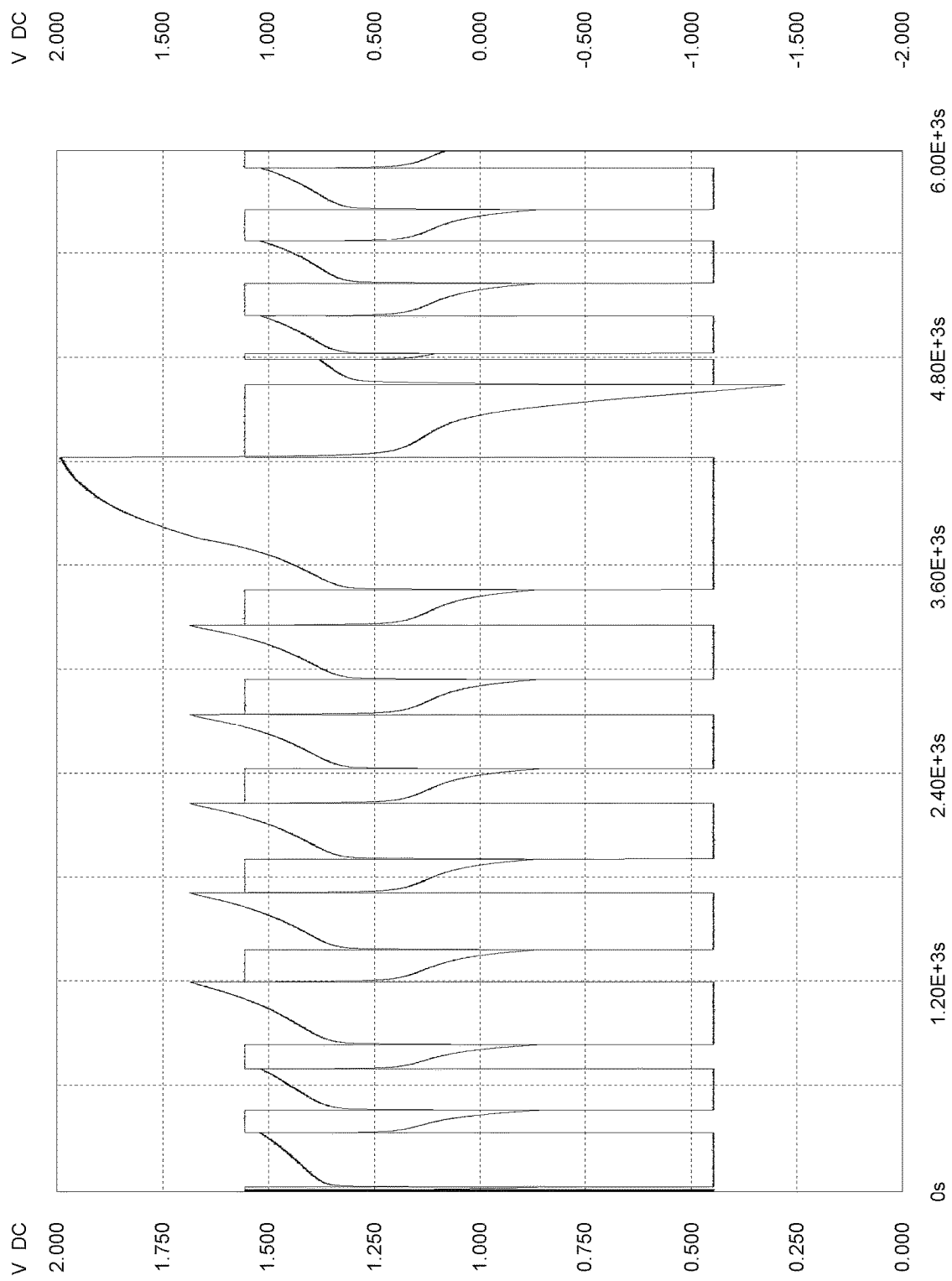
FIG. 38 is a graph of cell voltage and cell current as a function of time during electro-deposition of a thin film of poly-chloro-para-aminophenol on a graphite anode from a zinc chloride solution in an electrochemical cell having a zinc cathode.

During the charging and discharging in FIGS. 34 to 37, the electrolyte slowly changed from a clear solution to a purple colored solution, indicating that chlorinated para-aminophenol products were slightly soluble in the electrolyte. After the charging and discharging in FIG. 37, the positive electrode was replaced with a 2 mm graphite automatic pencil lead (R-3 4B from Pacific Arc, Inc. of Richmond, Tex.). Then the charging was discharging was continued as shown in FIG. 38 with a 10 K ohm current sensing resistor (522 in FIG. 33). FIG. 38 indicates that the chlorinated para-aminophenol product was electro-deposited on the positive electrode as a thin film of electro-conductive redox polymer.

Figure 39:
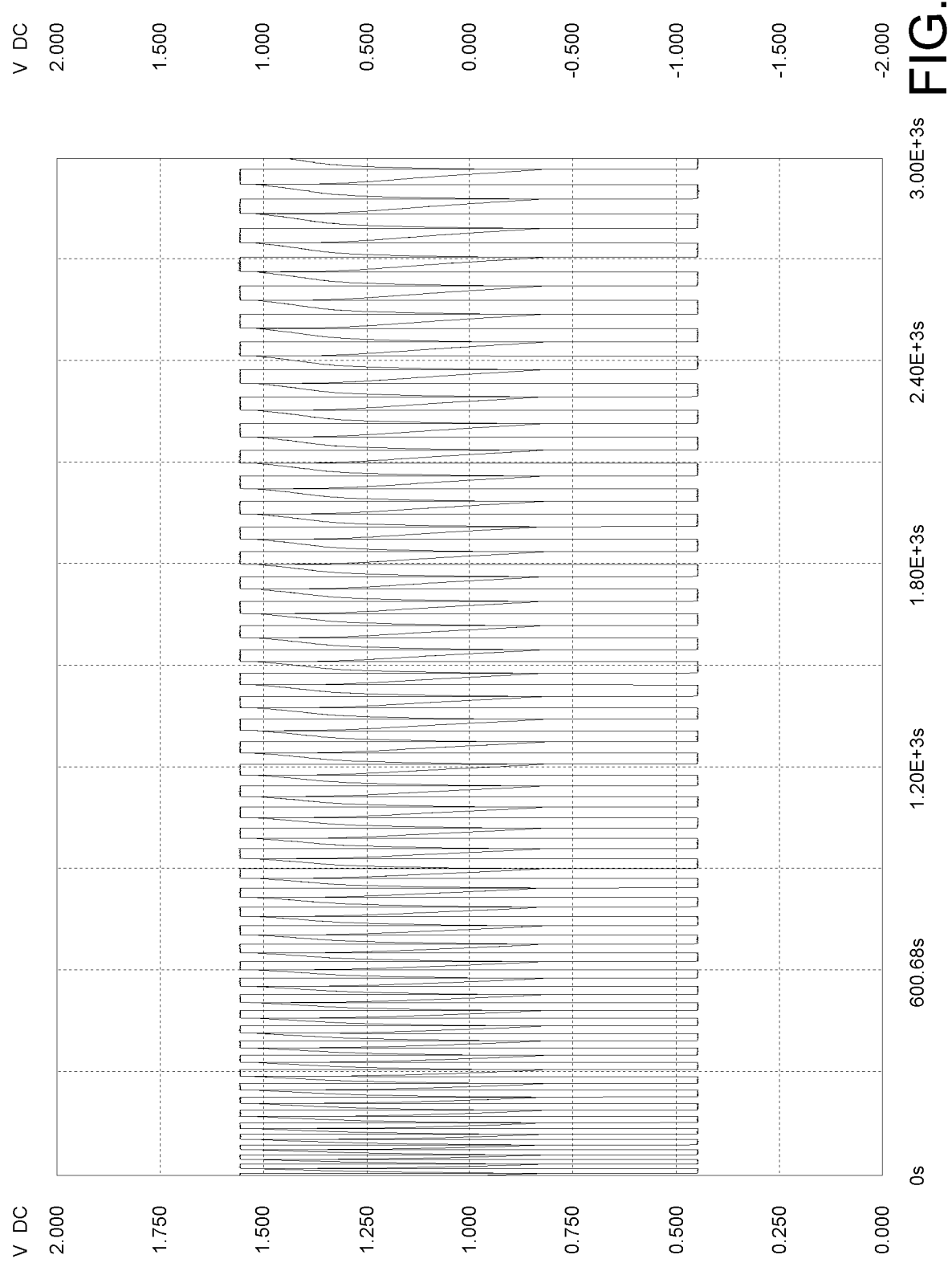
FIG. 39 is a graph of cell voltage and cell current as a function of time as the pH of a zinc chloride electrolyte is decreased from about 5.5 to about 2 during constant-current charging and discharging of an electrochemical cell having a zinc negative electrode and a positive electrode including a thin film of poly-chloro-para-aminophenol.

In order to test the sensitivity of the thin film electrode to pH, the pH of the electrolyte was increased to about 5.5 by slowly adding sodium bicarbonate (ARM & HAMMER® Baking Soda from Arm & Hammer of Spring House Pa.) until the electrolyte became cloudy from the formation of zinc hydroxide precipitate. Then charging and discharging of the thin film electrode was began as shown in FIG. 39 using the circuitry of FIG. 33 with a zinc negative electrode, a current sensing resistor of 10 K ohms, and without any auxiliary electrode. After a couple of cycles, the pH was slowly decreased by adding formic acid at a rate of about one drop per charge/discharge cycle. For many cycles, this had an effect of increasing the period of the charge-discharge cycle. At 3,130 seconds and for subsequent cycles, diluted hydrochloric acid was added instead of formic acid. According to wide range pH indicator paper, the pH at the end of cycling in FIG. 33 was about two.

Figure 40:
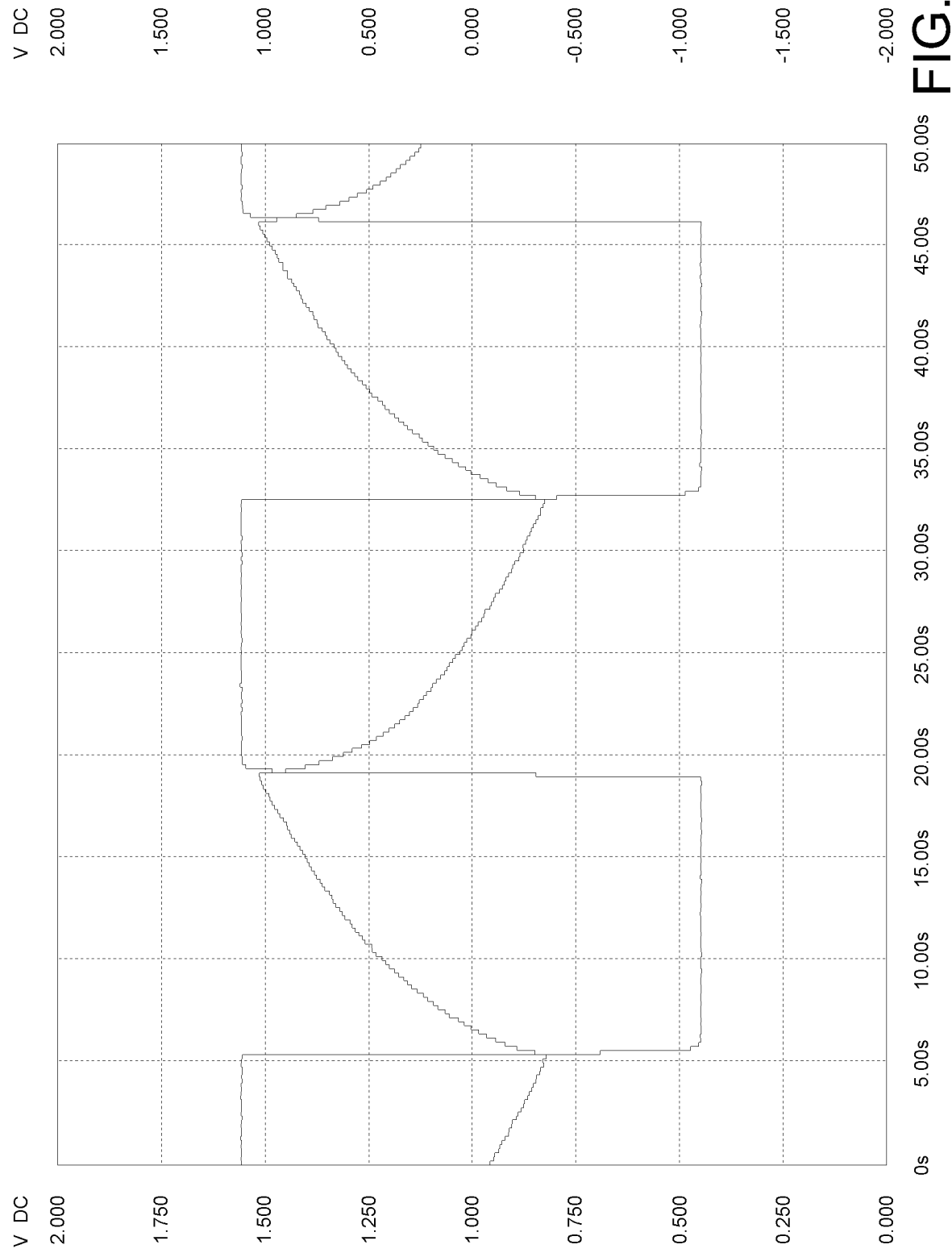
FIG. 40 is an expanded view of the first two charge-discharge cycles in the graph of FIG. 39.
Figure 41:
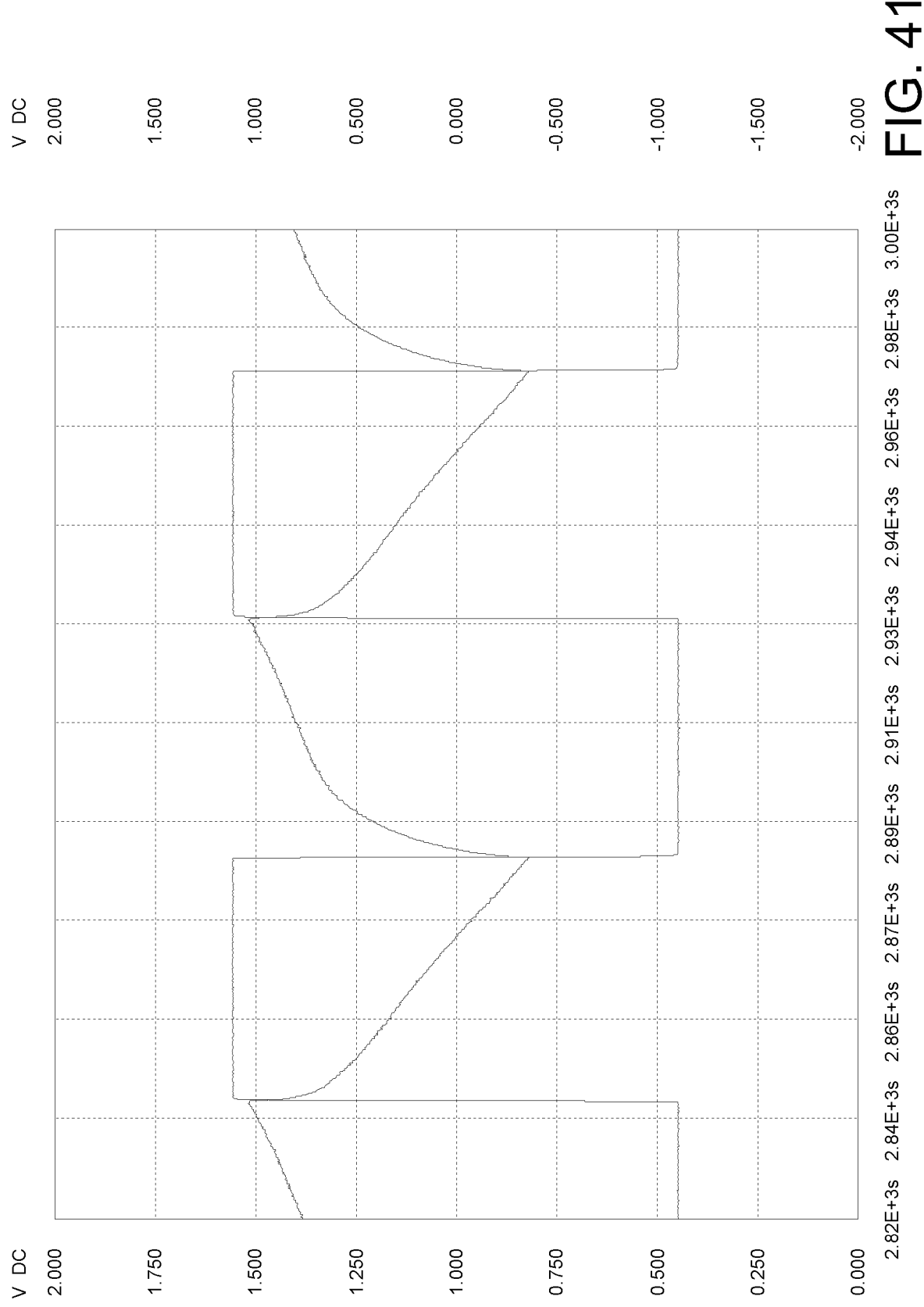
FIG. 41 is an expanded view of the last two charge-discharge cycles in the graph of FIG. 39.

FIG. 40 is an expanded view of the first two charge-discharge cycles in the graph of FIG. 39, and FIG. 41 is an expanded view of the last two charge-discharge cycles in the graph of FIG. 39. The results in FIGS. 39 to 41 indicate that the period of the charge-discharge cycles is inversely proportional to the pH of the electrolyte when charging and discharging at constant current over a cell voltage range of 0.82 volts to 1.51 volts. The increase in the period of the charge-discharge cycles as the pH was lowered correlates with a shift of the charge-discharge voltage characteristic of the positive electrode-active material to higher voltages, as should be caused by an increase in hydronium ion concentration if the reversible electrolytic oxidation of the positive-electrode active material were releasing hydronium ions into the electrolyte, and the reversible electrolytic reduction of the positive-electrode active material were absorbing hydronium ions from the electrolyte.

Example II. Poly-2-bromo-4-aminophenol

A positive electrode including brominated para-aminophenol product was produced using the same procedure as described above to produce the positive electrode including the chlorinated para-aminophenol except that sodium bromide was added to the production procedure. Specifically, a fresh batch of para-aminophenol was produced from three grams of acetaminophen in a boiling sulfuric acid solution. Then 2-bromo-4-aminophenol was produced by bromination of the para-aminophenol in an aqueous solution of hydrochloric acid and sodium bromide. Twenty milliliters of 20 Baume hydrochloric acid were added to and mixed with fifty milliliters of distilled water, and then the para-aminophenol and three grams of sodium bromide ("laboratory grade" from Science Stuff, Inc. of Austin, Tex.) were added to and dissolved in the hydrochloric acid solution. Then thirty-nine milliliters of 8.25% sodium hypochlorite solution were added drop-wise and stirred into the hydrochloric acid solution out-of-doors, resulting in the evolution of bromine and the formation of a floating orange-yellow froth. The froth was separated by filtration, dried on the filter paper, mixed with an equal volume of ball milled coconut shell activated carbon, and then the mixture was manually ground in the mortar with a pestle, resulting in presumptive 2-bromo-4-aminophenol positive electrode-active material.

A filter paper tube, having an internal size of about 3.2 mm internal diameter by 20 mm in length, was packed with the 2-bromo-4-aminophenol positive electrode-active material, and a 0.9 mm automatic pencil lead was inserted into the positive electrode-active material to form a positive electrode as shown in FIG. 11, and placed into an electrolytic cell as shown in FIG. 13 together with a zinc negative electrode and about seven milliliters of zinc salt aqueous electrolyte solution as shown in FIG. 12. The electrolytic cell, without any auxiliary electrode, was connected to the storage battery testing circuit of FIG. 33, producing the test results shown in FIGS. 42 to 52.

Figure 42:
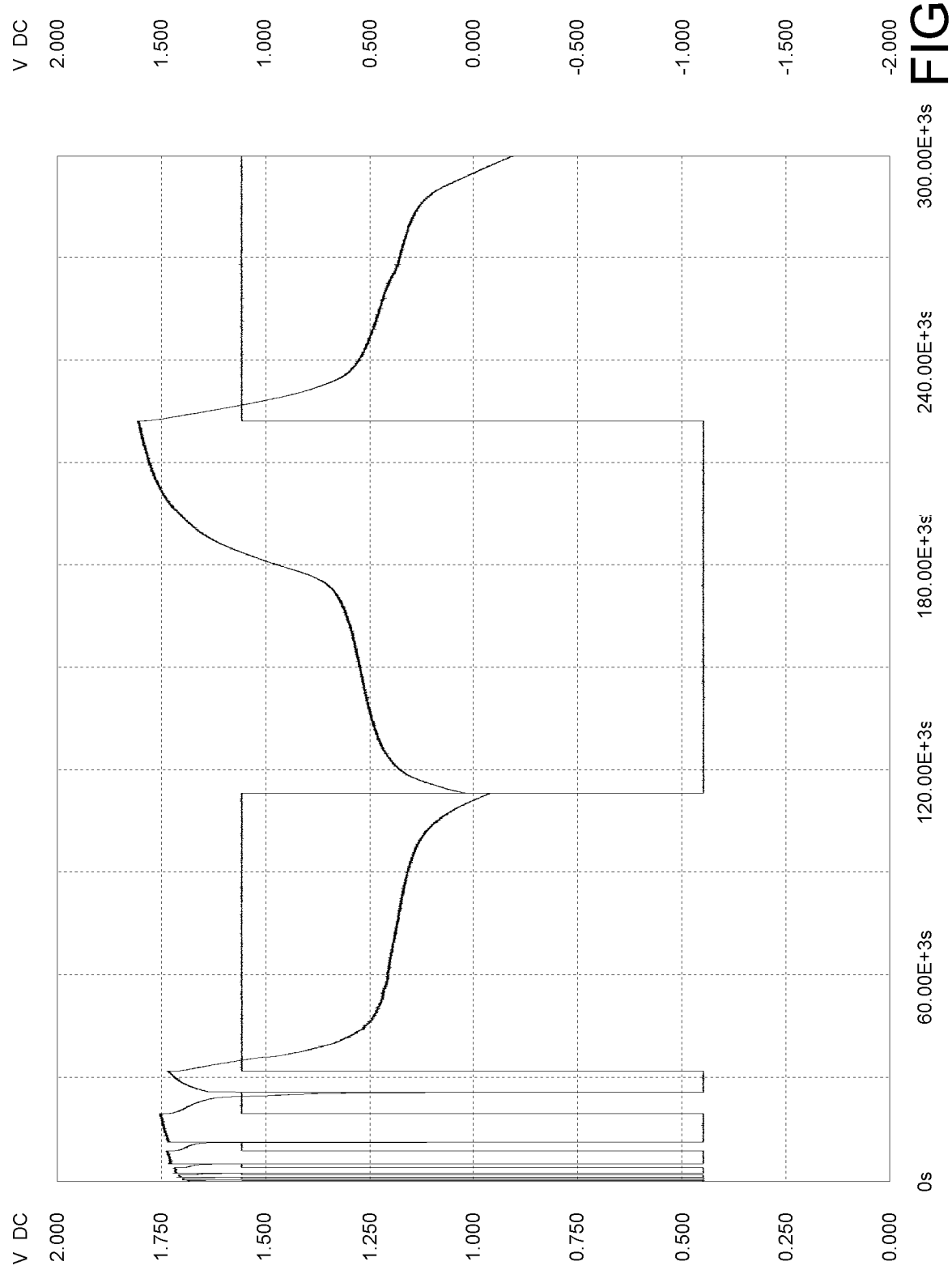
FIG. 42 is a first graph of cell voltage and cell current as a function of time during start-up of a cell having a zinc negative electrode and a positive electrode including electrode-active material made from brominated para-aminophenol.

FIG. 42 shows a first graph of cell voltage and cell current as a function of time during start-up of the cell using a 2.2 K ohm current sensing resistor (522 in FIG. 33) and an electrolyte of three volumes of the zinc chloride solution and one volume of the aluminum chloride solution. In contrast to the start-up of the electrode made from chlorinated para-aminophenol (cf. FIG. 35), the start-up in FIG. 42 of the electrode made from brominated para-aminophenol was very rapid, suggesting that most of the brominated para-aminophenol was already polymerized (by an increase in pH due to immersion in the electrolyte solution since the para-aminophenol was brominated in the hydrochloric acid solution) before the activation by anodic oxidation (from zero to about 32,000 seconds in FIG. 32). The activation by anodic oxidation appears to have formed electrical connections between the positive electrode current collector and the already polymerized brominated para-aminophenol. The anodic oxidation after this activation, i.e., the anodic oxidation from about 180,000 seconds to about 330,000 seconds, appears to have been unnecessary and somewhat destructive to the charge storage capacity of the positive electrode.

Figure 43:
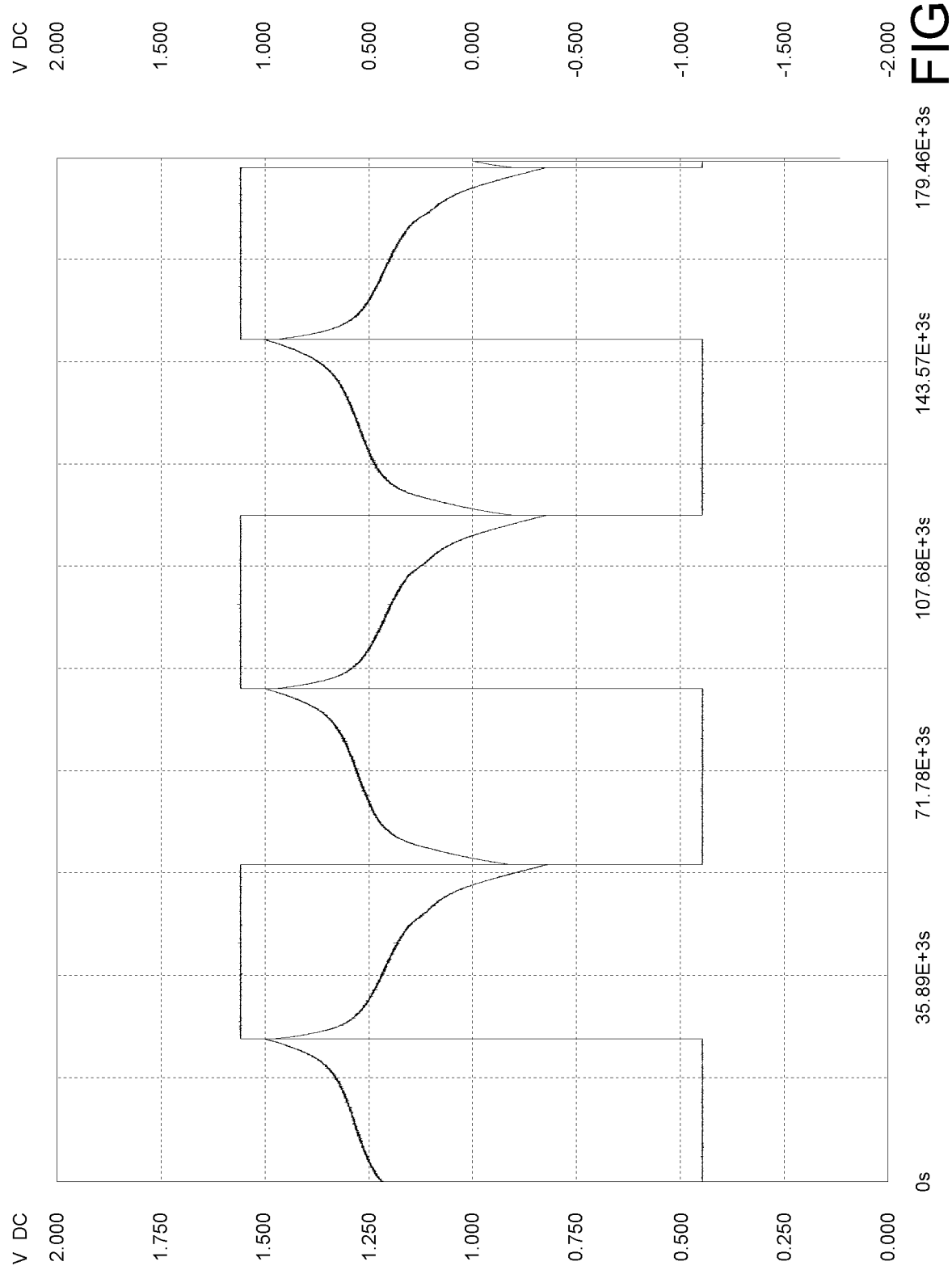
FIG. 43 is a second graph of cell voltage and cell current as a function of time during continued charging and discharging begun in FIG. 42 for the cell having a zinc negative electrode and a positive electrode including electrode-active material made from brominated para-aminophenol.
Figure 44:
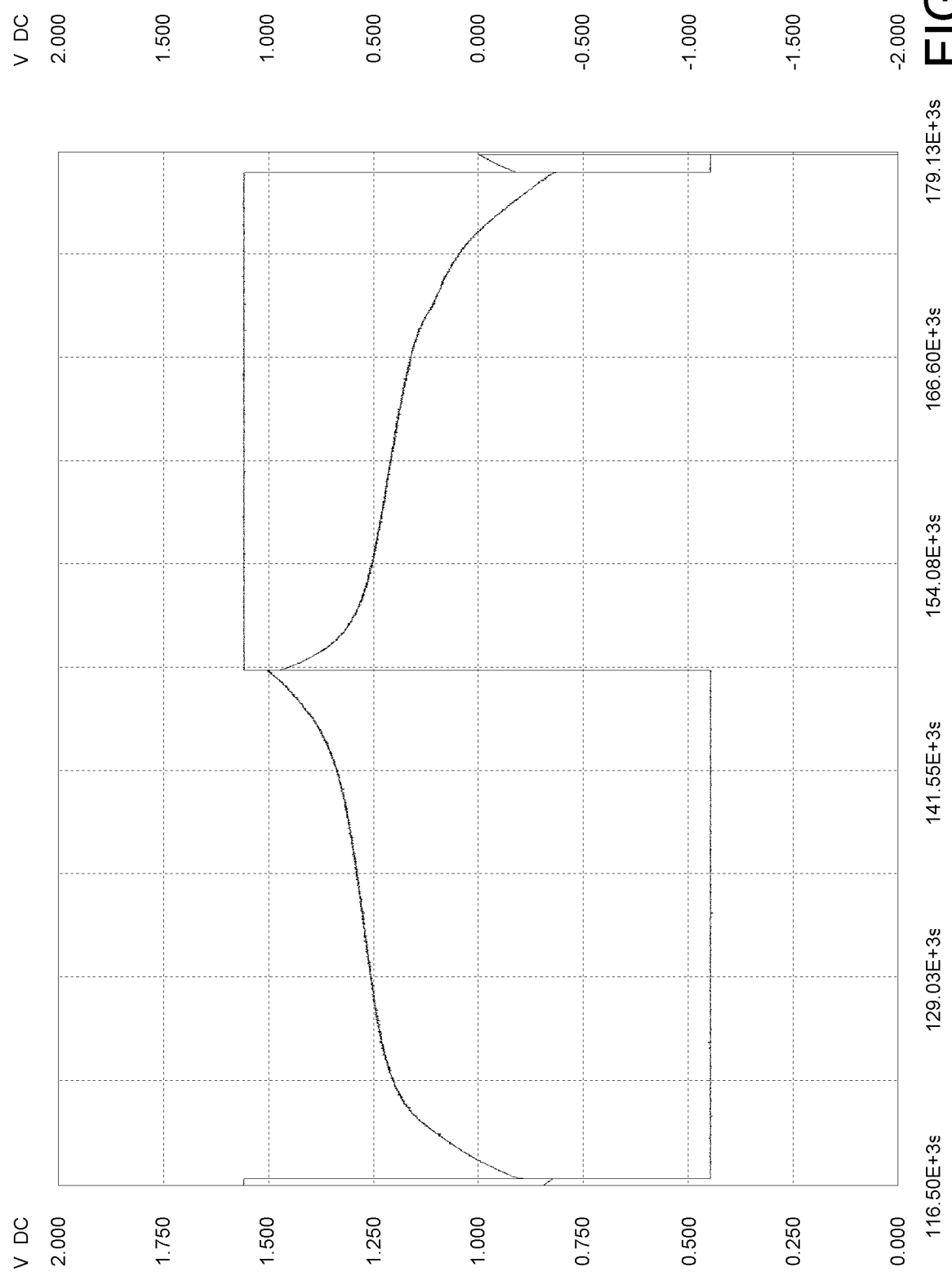
FIG. 44 is an expanded view of the last charge-discharge cycle in FIG. 43.

FIG. 43 shows a second graph of cell voltage and cell current as a function of time using a current sensing resistance of 1.0 K ohm and the electrolyte of zinc chloride and aluminum chloride solution during continued charging and discharging begun in FIG. 42. FIG. 44 shows an expanded view of the last charge-discharge cycle in FIG. 43. In comparison to the positive electrode made from the chlorinated para-aminophenol (cf. FIG. 37), FIG. 44 shows a remarkably low over-potential of the positive electrode made from the brominated para-aminophenol.

Figure 45:
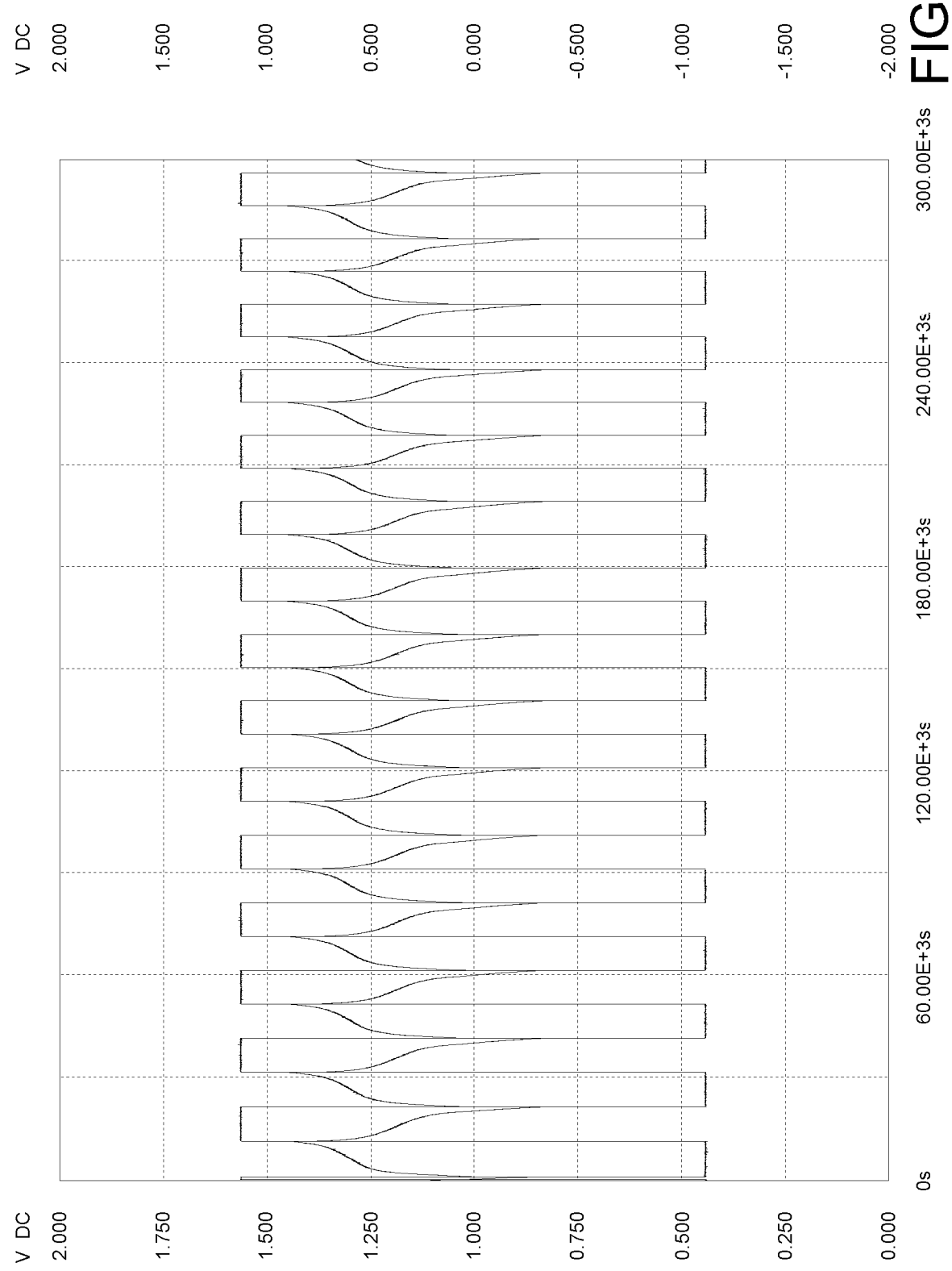
FIG. 45 is a third graph of cell voltage and cell current as a function of time during continued charging and discharging begun in FIG. 42 for the cell having a zinc negative electrode and a positive electrode including electrode-active material made from brominated para-aminophenol.
Figure 46:
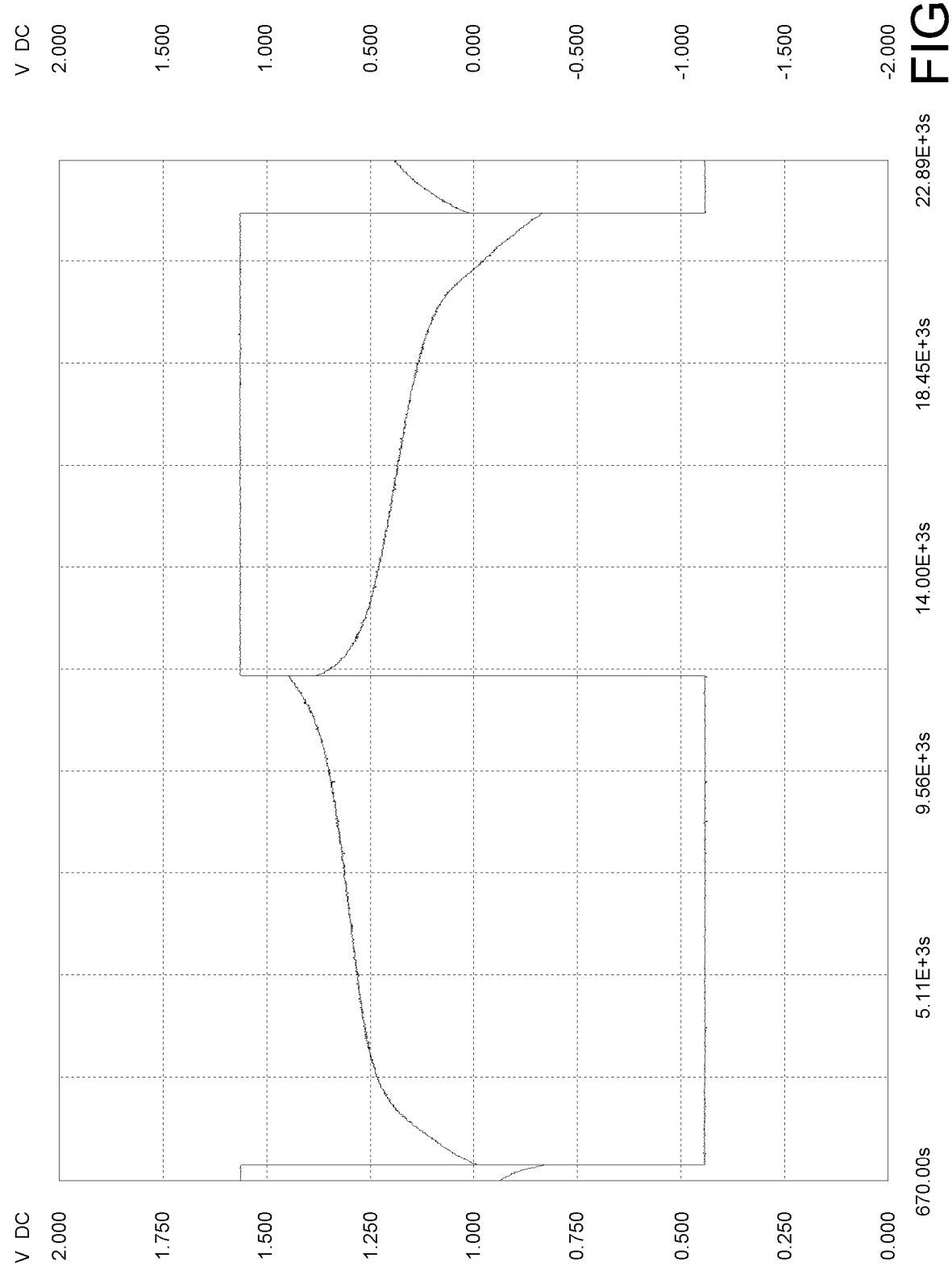
FIG. 46 is an expanded view of the first charge-discharge cycle in FIG. 45.

FIG. 45 shows a third graph of cell voltage and cell current as a function of time using a current sensing resistance of 470 ohms and the electrolyte of zinc chloride and aluminum chloride solution during continued charging and discharging begun in FIG. 42. FIG. 46 shows an expanded view of the first charge-discharge cycle in FIG. 45.

Figure 47:
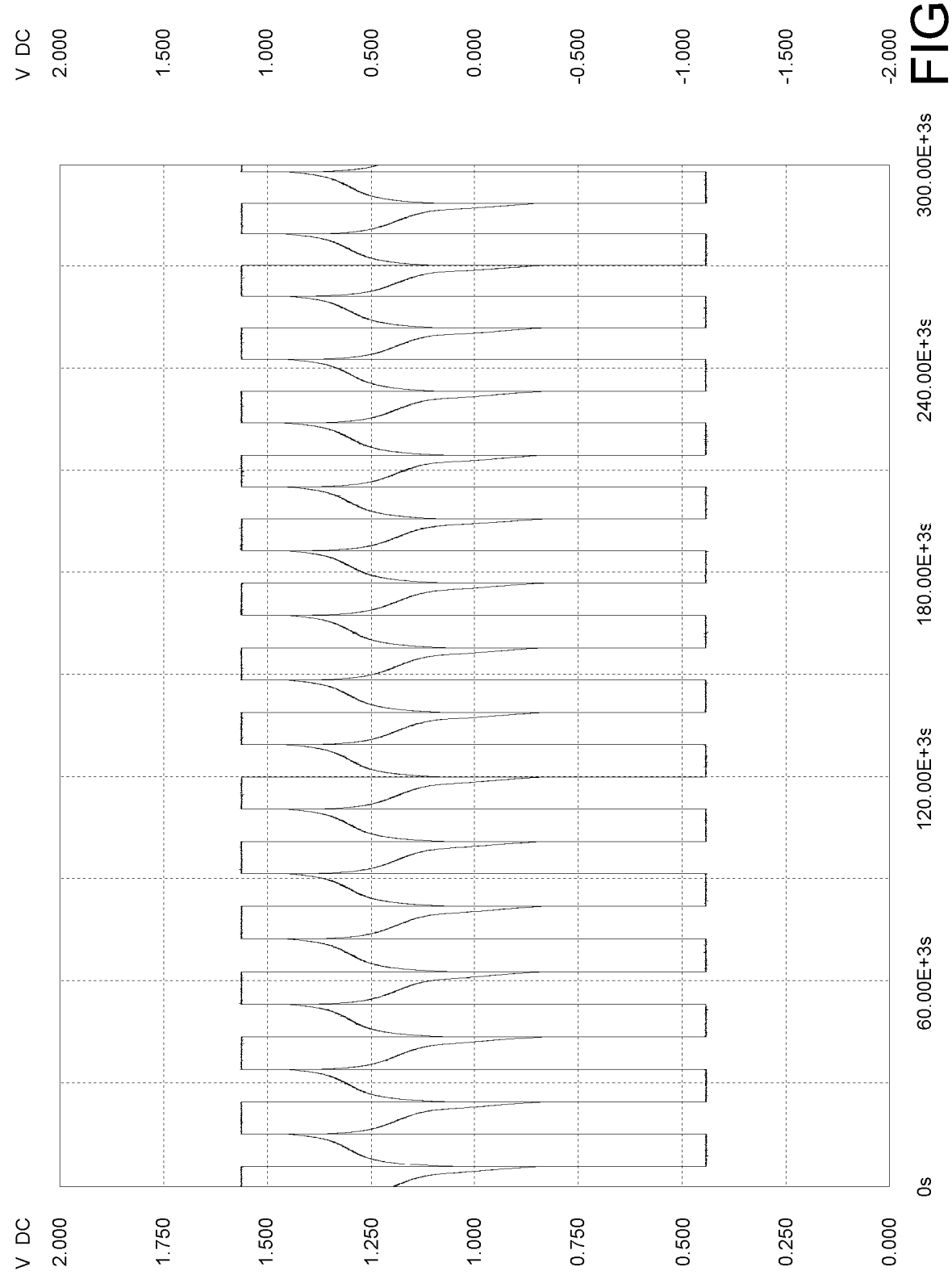
FIG. 47 is a fourth graph of cell voltage and cell current as a function of time during continued charging and discharging begun in FIG. 42 for the cell having a zinc negative electrode and a positive electrode including electrode-active material made from brominated para-aminophenol.

FIG. 47 shows a fourth graph of cell voltage and cell current as a function of time using the current sensing resistance of 470 ohms and the electrolyte of zinc chloride and aluminum chloride solution during continued charging and discharging begun in FIG. 42.

Figure 48:
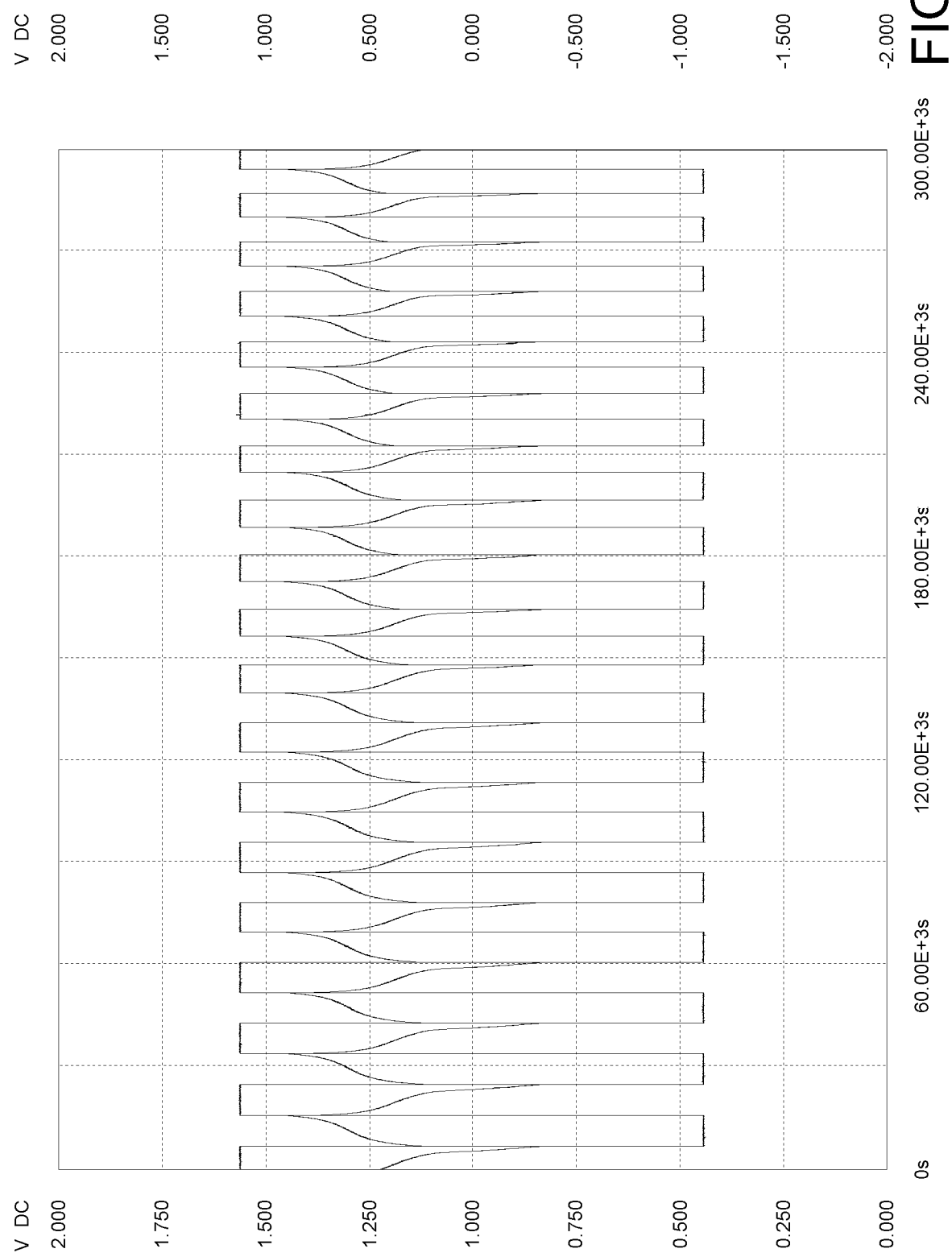
FIG. 48 is a fifth graph of cell voltage and cell current as a function of time during continued charging and discharging begun in FIG. 42 for the cell having a zinc negative electrode and a positive electrode including electrode-active material made from brominated para-aminophenol.

FIG. 48 shows a fifth graph of cell voltage and cell current as a function of time using the current sensing resistance of 470 ohms and the electrolyte of zinc chloride and aluminum chloride solution during continued charging and discharging begun in FIG. 42. FIG. 49 shows an expanded view of the last full charge-discharge cycle in FIG. 48. The discharge phases in FIG. 49 have steeply sloping tails indicative of zinc depletion of the negative electrode.

Figure 50:
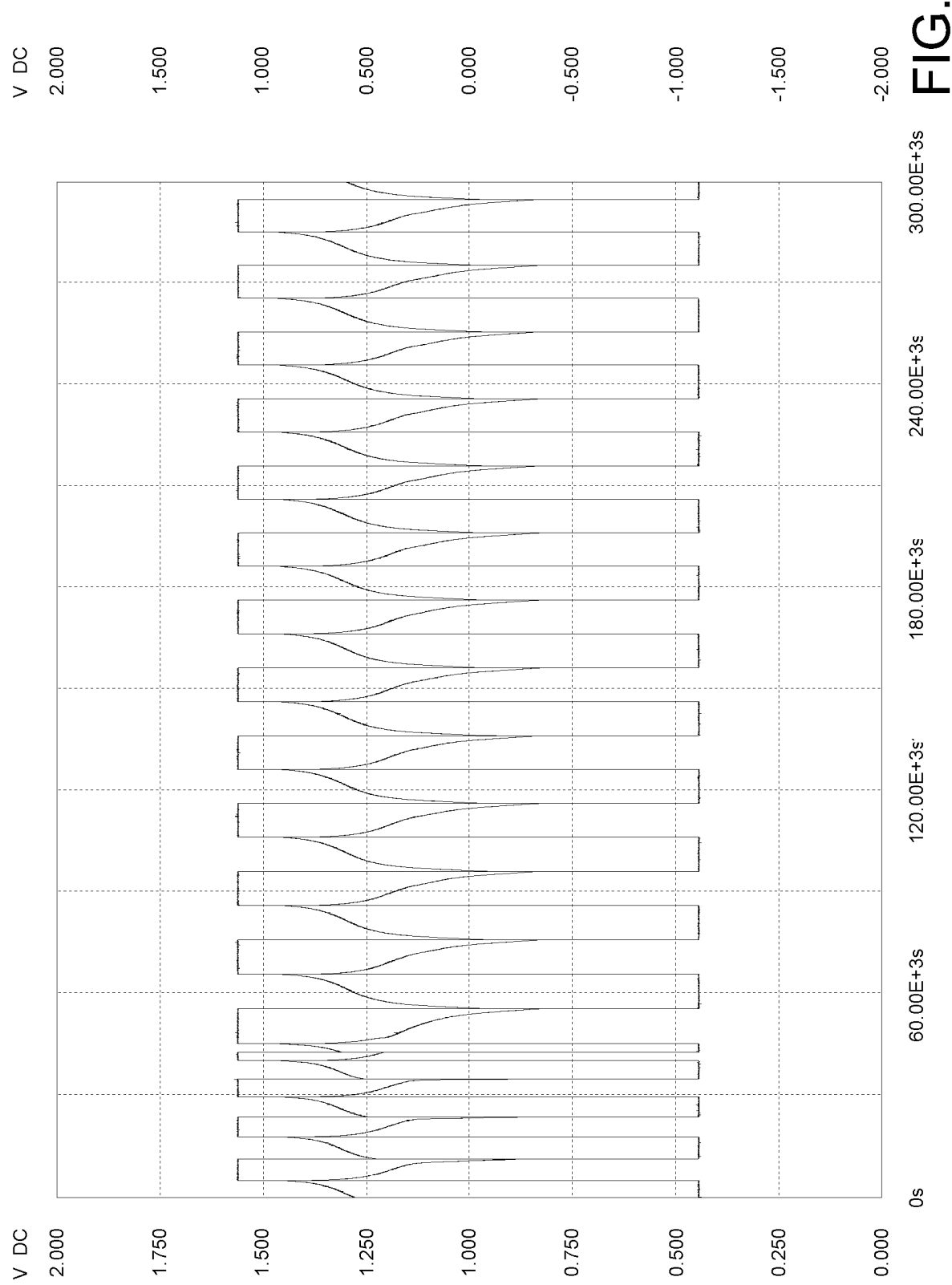
FIG. 50 is a sixth graph of cell voltage and cell current as a function of time during zinc depletion and replacement and continued charging and discharging begun in FIG. 42 for the cell having a zinc negative electrode and a positive electrode including electrode-active material made from brominated para-aminophenol.
Figure 51:
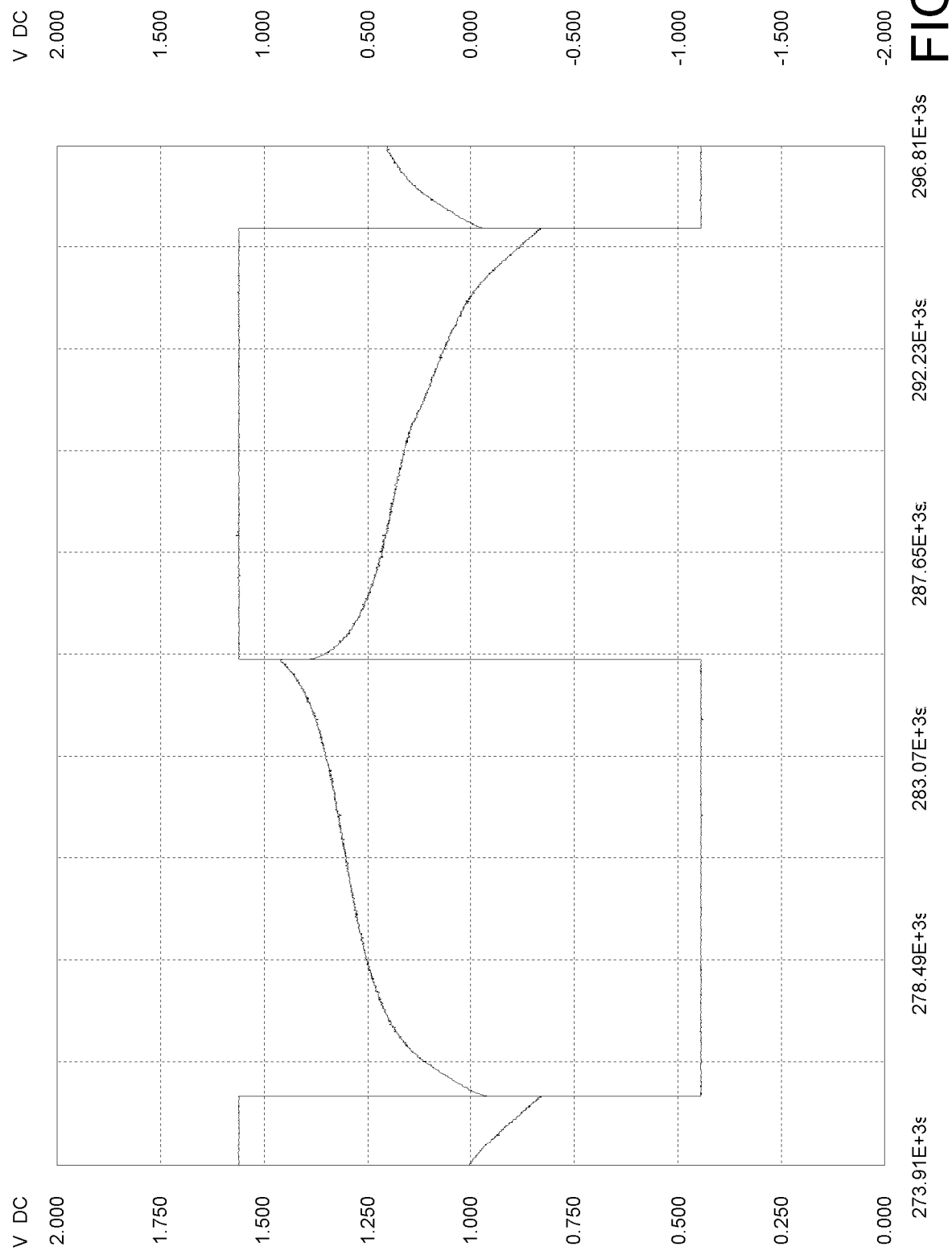
FIG. 51 is an expanded view of the last charge-discharge cycle in FIG. 48.
Figure 52:
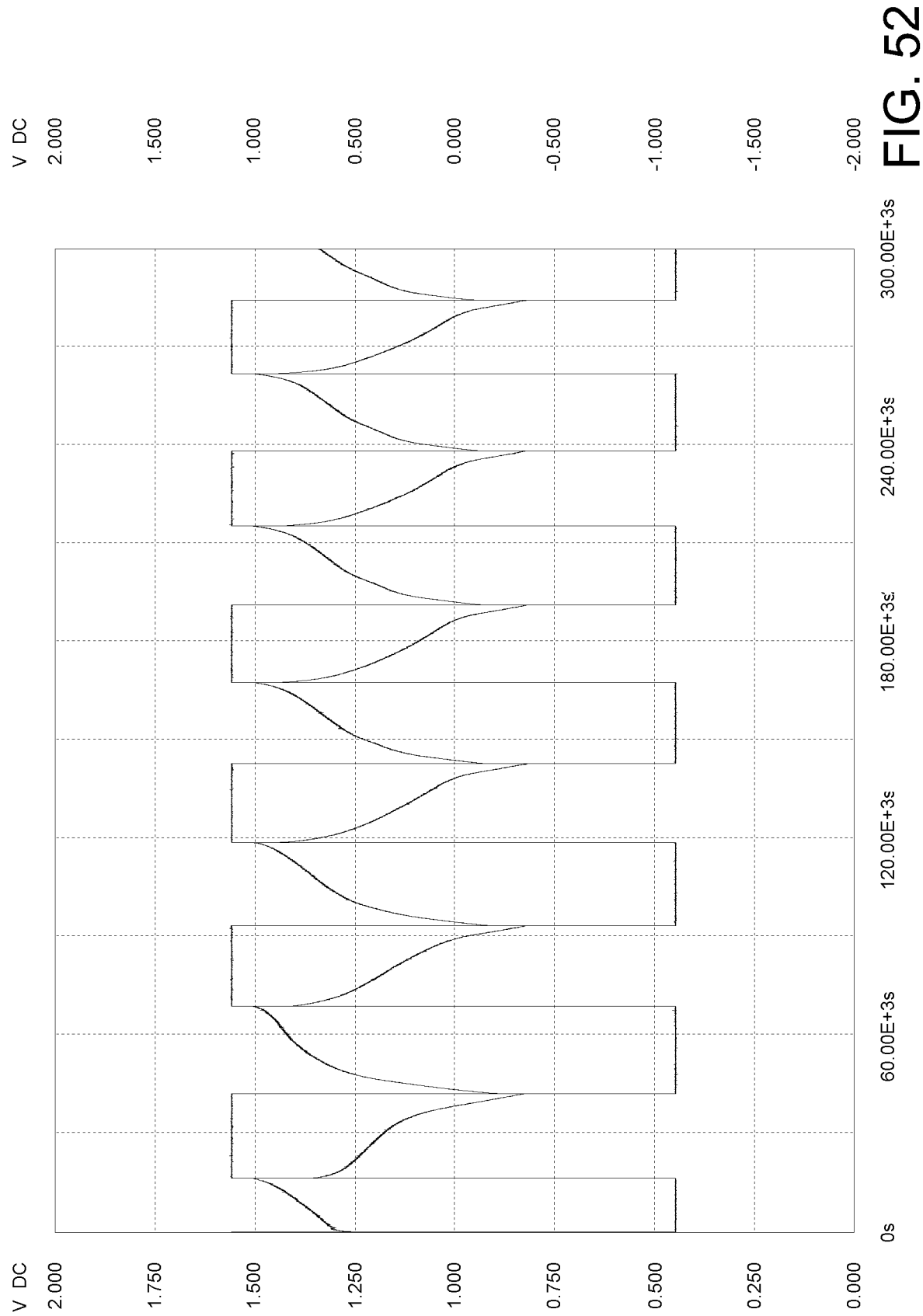
FIG. 52 is a seventh graph of cell voltage and cell current as a function of time after electrolyte replacement during continued charging and discharging begun in FIG. 42 for the cell having a zinc negative electrode and a positive electrode including electrode-active material made from brominated para-aminophenol.

FIG. 50 shows a sixth graph of cell voltage and cell current as a function of time using the current sensing resistance of 470 ohms and the electrolyte of zinc chloride and aluminum chloride solution during continued charging and discharging begun in FIG. 42. The charge storage capacity of the cell decreases substantially in the first four cycles, apparently due to zinc depletion at the negative electrode. At the end of the fourth cycle, the negative electrode was replaced with a fresh zinc electrode, which restored the storage capacity of the cell. FIG. 51 shows an expanded view of the last charge-discharge cycle in FIG. 48; and FIG. 52 is a seventh graph of cell voltage and cell current as a function of time using a current sensing resistance of 1.0 K ohms and after electrolyte replacement during continued charging and discharging begun in FIG. 42. The chloride-based electrolyte was replaced with an electrolyte free of chloride to permit the use of an auxiliary electrode that would evolve oxygen. The electrolyte free of chlorine was one volume of a saturated aqueous solution of zinc sulfate, and one volume of a saturated aqueous solution of approximately equal parts of aluminum sulfate, ammonium sulfate, and boric acid.

What is claimed is:

1. A method comprising:
    (a) halogenating para-aminophenol to produce a para-aminophenol halogenation product; and
    (b) polymerizing the para-aminophenol halogenation product to produce an electro-conductive halogenated poly-aminophenol redox polymer.

2. The method as claimed in claim 1, wherein the para-aminophenol is halogenated by reacting the para-aminophenol with chlorine to produce 2-chloro-4-aminophenol.

3. The method as claimed in claim 1, wherein the para-aminophenol is halogenated by reacting the para-aminophenol with bromine to produce 2-bromo-4-aminophenol.

4. The method as claimed in claim 1, wherein the halogenating of the para-aminophenol reacts the para-aminophenol with halogen when the para-aminophenol is in an acid solution.

5. The method as claimed in claim 1, wherein the polymerizing of the para-aminophenol halogenation product includes increasing pH of a solution in contact with the para-aminophenol halogenation product.

6. The method as claimed in claim 1, wherein the polymerizing of the para-aminophenol halogenation product includes electrochemical oxidation of the para-aminophenol halogenation product in an electrochemical cell.

7. The method as claimed in claim 1, which further comprises dissolving the para-aminophenol halogenation product in an electrolyte, and wherein the electrochemical oxidation includes electro-deposition of a film of the electro-conductive halogenated poly-aminophenol redox polymer on a current collector immersed in the electrolyte.

8. The method as claimed in claim 1, which further comprises mixing the para-aminophenol halogenation product with electrically conductive carbon material, to form a mixture and fabricating an electrode including a current collector in contact with the mixture.

9. The method as claimed in claim 8, which further comprises assembling the electrode into a storage battery cell including the electrode as a positive electrode and further including a cell container, a negative electrode, and an auxiliary electrode for oxidation of a component of an electrolyte solution to compensate for hydrogen evolution at the negative electrode during charging.

10. A product of manufacture comprising an electro-conductive halogenated poly-aminophenol redox polymer, the electro-conductive halogenated poly-aminophenol redox polymer having been produced by halogenating para-aminophenol to produce a para-aminophenol halogenation product, and polymerizing the para-aminophenol halogenation product to produce the electro-conductive halogenated poly-aminophenol redox polymer.

11. The product of manufacture as claimed in claim 10, wherein the para-aminophenol was halogenated by reacting the para-aminophenol with chlorine to produce 2-chloro-4-aminophenol.

12. The product of manufacture as claimed in claim 10, wherein the para-aminophenol was halogenated by reacting the para-aminophenol with bromine to produce 2-bromo-4-aminophenol.

13. The product of manufacture as claimed in claim 10, further comprising a current collector and a film of the electro-conductive halogenated poly-aminophenol redox polymer disposed on the current collector.

14. The product of manufacture as claimed in claim 10, further comprising electrically conductive carbon material mixed with the electro-conductive halogenated poly-aminophenol redox polymer, and a current collector in electrical contact with the electrically conductive carbon material.

15. A product of manufacture comprising an electro-conductive redox polymer, electrically conductive carbon material mixed with the electro-conductive redox polymer, and a current collector in electrical contact with the electrically conductive carbon material,
    wherein the current collector and the electrically conductive carbon material mixed with the electro-conductive redox polymer comprises a positive electrode, and the product of manufacture further comprises a negative electrode, an auxiliary electrode for oxidation of a component of an electrolyte solution to compensate for hydrogen evolution at the negative electrode during charging, and a cell container for containing the electrolyte solution in contact with the positive electrode, the negative electrode, and the auxiliary electrode.

16. The product of manufacture as claimed in claim 15, wherein the negative electrode includes carbon fiber.

17. The product of manufacture as claimed in claim 15, wherein the electrolyte solution is a zinc salt solution.

18. The product of manufacture as claimed in claim 15, further comprising a controller responsive to voltage between the electrodes positive electrode and the negative electrode for controlling current to the auxiliary electrode for oxidation of the component of the electrolyte solution to compensate for hydrogen evolution at the negative electrode during charging.

19. The product of manufacture as claimed in claim 18, wherein the electrolyte solution is a zinc salt solution, and the controller is programmed to periodically strip zinc from the negative electrode and to update an auxiliary electrode current set-point in response to the voltage between the auxiliary electrode and the negative electrode when the negative electrode is partially stripped of the zinc.

20. The product of manufacture as claimed in claim 15, which further comprises a reactor coupled to the cell container for regenerating the component of the electrolyte solution by reacting an oxidation product evolved at the auxiliary electrode with hydrogen evolved at the negative electrode during charging.

21. A product of manufacture comprising an electroconductive poly(2-chloro-4-aminophenol) redox polymer.

22. A product of manufacture comprising an electroconductive poly(2-bromo-4-aminophenol) redox polymer.

* * * * *